(12) United States Patent
Iwamoto et al.

(10) Patent No.: US 8,948,603 B2
(45) Date of Patent: Feb. 3, 2015

(54) OPTICAL MICROPHONE

(71) Applicant: Panasonic Corporation, Osaka (JP)

(72) Inventors: Takuya Iwamoto, Osaka (JP);
Masahiko Hashimoto, Osaka (JP);
Ushio Sangawa, Nara (JP); Yuriko Kaneko, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 209 days.

(21) Appl. No.: 13/752,817

(22) Filed: Jan. 29, 2013

(65) Prior Publication Data

US 2013/0142519 A1    Jun. 6, 2013

Related U.S. Application Data

(63) Continuation of application No. PCT/JP2012/001675, filed on Mar. 12, 2012.

(30) Foreign Application Priority Data

Mar. 22, 2011 (JP) .................. 2011-062965
Mar. 29, 2011 (JP) .................. 2011-072654

(51) Int. Cl.
*H04R 23/00*    (2006.01)
*G01H 9/00*    (2006.01)

(52) U.S. Cl.
CPC ............. *H04R 23/008* (2013.01); *G01H 9/00* (2013.01)
USPC ......................................... 398/133; 398/132

(58) Field of Classification Search
CPC .................................................. H04R 23/008
USPC ................................................. 398/132, 133
See application file for complete search history.

(56) References Cited

U.S. PATENT DOCUMENTS

| | | | | |
|---|---|---|---|---|
| 7,277,642 | B2* | 10/2007 | Shinzou | 398/133 |
| 8,290,316 | B2* | 10/2012 | Molin et al. | 385/12 |
| 2010/0139405 | A1 | 6/2010 | Melikechi et al. | |
| 2011/0194857 | A1* | 8/2011 | Avenson et al. | 398/133 |
| 2014/0050489 | A1* | 2/2014 | Iwamoto et al. | 398/133 |

FOREIGN PATENT DOCUMENTS

| | | |
|---|---|---|
| JP | 03-279812 A | 12/1991 |
| JP | 08-250396 A | 9/1996 |

(Continued)

OTHER PUBLICATIONS

International Search Report for corresponding International Application No. PCT/JP2012/001675 mailed May 1, 2012.

*Primary Examiner* — Nathan Curs
(74) *Attorney, Agent, or Firm* — Renner, Otto, Boisselle & Sklar, LLP

(57) ABSTRACT

An optical microphone includes: a propagation medium portion; a light source to output a light wave passing through the propagation medium portion across the acoustic wave propagating through the propagation medium portion; a reflecting section to retroreflect the light wave having passed through the propagation medium portion; and a photoelectric conversion section to receive the light wave having been reflected by the reflecting section and passed through the propagation medium portion to output an electric signal. $0^{th}$-order, $+1^{st}$-order and $-1^{st}$-order diffracted light waves are respectively produced on outward and return paths, by virtue of a refractive index distribution across the propagation medium portion caused by the propagation of the acoustic wave therethrough. The photoelectric conversion section detects interference light between the $+1^{st}$-order or $-1^{st}$-order diffracted light wave of the outward path and the $-1^{st}$-order or $+1^{st}$-order diffracted light wave of the return path.

20 Claims, 20 Drawing Sheets

(56) References Cited

FOREIGN PATENT DOCUMENTS

| JP | 08-265262 A | 10/1996 |
|---|---|---|
| JP | 2002-311404 A | 10/2002 |
| JP | 2007-194677 A | 8/2007 |
| JP | 2007-263587 A | 10/2007 |
| JP | 2007-295131 A | 11/2007 |
| JP | 2009-085868 A | 4/2009 |
| JP | 2009-253241 A | 10/2009 |

* cited by examiner

OPTICAL MICROPHONE

This is a continuation of International Application No. PCT/JP2012/001675, with an international filing date of Mar. 12, 2012, which claims priorities of Japanese Patent Application No. 2011-062965, filed on Mar. 22, 2011 and Japanese Patent Application No. 2011-072654, filed on Mar. 29, 2011, the contents of which are hereby incorporated by reference.

BACKGROUND

1. Technical Field

The present application relates to an optical microphone for receiving an acoustic wave that propagates through a gas such as the air, and converting the received acoustic wave into an electric signal by utilizing a light wave.

2. Description of the Related Art

Microphones are known in the art as a device for receiving a sound wave and converting the sound wave into an electric signal. Many microphones, such as dynamic microphones and condenser microphones, include a diaphragm. With these microphones, a sound wave is received as the sound wave vibrates the diaphragm, and the vibration is taken out as an electric signal. A microphone of this type includes a mechanical vibrating section, and properties of the mechanical vibrating section may possibly change as the microphone is used many times repeatedly. When detecting a very strong sound wave with a microphone, the vibrating section may possibly break.

In order to solve such problems of a conventional microphone having a mechanical vibrating section, Japanese Laid-Open Patent Publication No. 8-265262 (hereinafter referred to as "Patent Document No. 1") and Japanese Laid-Open Patent Publication No. 2009-085868 (hereinafter referred to as "Patent Document No. 2"), for example, disclose optical microphones that do not have a mechanical vibrating section and that detect an acoustic wave by utilizing a light wave.

For example, Patent Document No. 1 discloses a method for detecting an acoustic wave by modulating light with an acoustic wave and detecting the modulated component of the light. Specifically, as shown in FIG. 29, a laser beam, which has been shaped using a light-outputting optical component 111, is made to act upon an acoustic wave 1 propagating through the air, thereby producing diffracted light. In this process, two diffracted light components in reverse phase are produced. After adjusting the diffracted light by a light-receiving optical component 112, only one of the two diffracted light components is received by an optical diode 113 and converted to an electric signal, thereby detecting the acoustic wave 1.

Patent Document No. 2 discloses a method for detecting an acoustic wave by propagating an acoustic wave through a medium and detecting changes in optical properties of the medium. As shown in FIG. 30, the acoustic wave 1 propagating through the air is taken in through an opening 201, and travels through an acoustic waveguide 202, of which at least a portion of the wall surface is formed by a photoacoustic propagation medium portion 203. The sound wave traveling through the acoustic waveguide 202 is taken in by the photoacoustic propagation medium portion 203 and propagates through the inside thereof. The photoacoustic propagation medium portion 203 undergoes a refractive index change as the sound wave propagates therethrough. The acoustic wave 1 is detected by extracting this refractive index change as an optical modulation by using a laser Doppler vibrometer 204. Patent Document No. 2 discloses that by using a dry silica gel as the photoacoustic propagation medium portion 203, the acoustic wave in the waveguide can be efficiently taken in into the inside of the photoacoustic propagation medium portion 203.

SUMMARY

The related art technique needs further improvement in view of the dependency of the sensitivity on the acoustic wave frequency. One non-limiting and exemplary embodiment provides an optical microphone in which the dependency, of the sensitivity on the acoustic wave frequency is suppressed.

In one general aspect, an optical microphone disclosed herein is an optical microphone for detecting an acoustic wave propagating through an environment fluid by using a light wave, the optical microphone including: a propagation medium portion through which the acoustic wave propagates; a light source for outputting a light wave passing through the propagation medium portion across the acoustic wave propagating through the propagation medium portion; a reflecting section for retroreflecting the light wave having passed through the propagation medium portion; and a photoelectric conversion section for receiving the light wave having been reflected by the reflecting section and passed through the propagation medium portion to output an electric signal, wherein: on an outward path along which the light wave output from the light source passes through the propagation medium portion, a $0^{th}$-order diffracted light wave, a $+1^{st}$-order diffracted light wave and a $-1^{st}$-order diffracted light wave are produced by virtue of a refractive index distribution across the propagation medium portion caused by the propagation of the acoustic wave therethrough; on a return path along which the $0^{th}$-order diffracted light wave having been produced on the outward path passes through the propagation medium portion after being reflected by the reflecting section, a $0^{th}$-order diffracted light wave, a $+1^{st}$-order diffracted light wave and a $-1^{st}$-order diffracted light wave are produced by virtue of a refractive index distribution across the propagation medium portion caused by the propagation of the acoustic wave therethrough; and the photoelectric conversion section detects at least one of interference light between the $+1^{st}$-order diffracted light wave produced on the outward path and the $-1^{st}$-order diffracted light wave produced on the return path, and interference light between the $-1^{st}$-order diffracted light wave produced on the outward path and the $+1^{st}$-order diffracted light wave produced on the return path.

According to the above aspect, a special measuring instrument such as a laser Doppler vibrometer or an optical interferometer is not used, whereby it is possible to realize an optical microphone that is small in size and formed by a simple structure. By retroreflecting a light wave having passed a propagation medium portion, the light wave passes through the propagation medium portion on the outward path and on the return path, whereby the diffraction direction of the $+1^{st}$-order diffracted light wave produced on the outward path can be made equal to that of the $-1^{st}$-order diffracted light wave produced on the return path, or the diffraction direction of the $-1^{st}$-order diffracted light wave produced on the outward path can be made equal to that of the $+1^{st}$-order diffracted light wave produced on the return path. Therefore, the area over which the two diffracted light waves overlap and interfere with each other can be made constant, irrespective of the frequency of the acoustic wave, and it is possible to realize an optical microphone whose sensitivity is unlikely to change with the frequency.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1A:
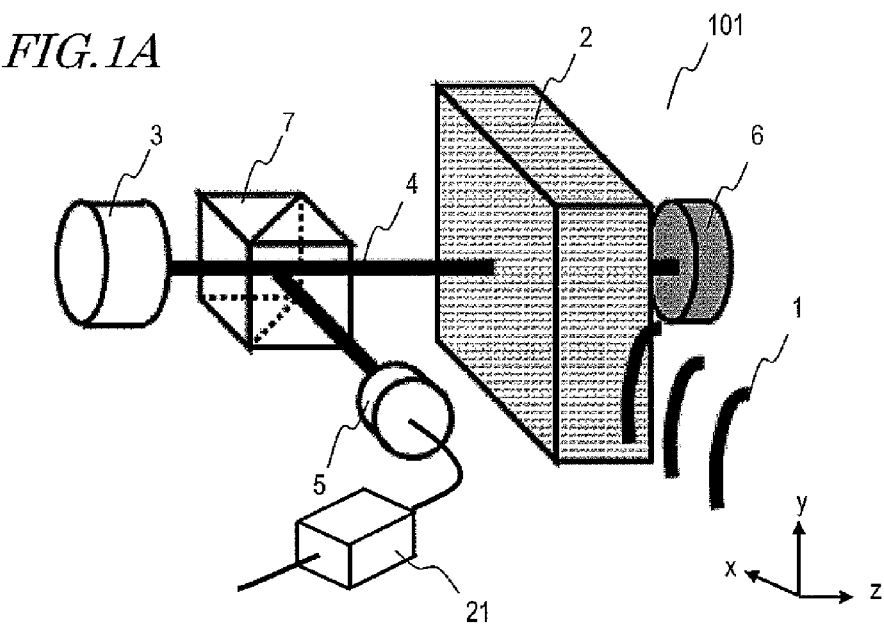
FIG. 1A is a diagram showing a configuration of a first embodiment of an optical microphone according to the present invention.

The Inventors carefully reviewed the techniques disclosed in Patent Documents Nos. 1 and 2 and found the following problems. Specifically, with the optical microphone of Patent Document No. 1, it is necessary to detect diffracted light produced by an acoustic wave. However, since the angle at which diffracted light is produced is dependent on the frequency of the acoustic wave, the sensitivity of the microphone changes depending on the frequency of the acoustic wave to be detected.

The method of Patent Document No. 2 uses a laser Doppler vibrometer. A laser Doppler vibrometer is large in size because it needs a complicated optical system formed by an optical frequency shifter such as an acoustic optical element, and many mirrors, beam splitters and lenses. Therefore, the measurement device disclosed in Patent Document No. 2 as a whole will be large.

An optical microphone disclosed in the present application is an optical microphone for detecting an acoustic wave propagating through an environment fluid by using a light wave, the optical microphone including: a propagation medium portion through which the acoustic wave propagates; a light source for outputting a light wave passing through the propagation medium portion across the acoustic wave propagating through the propagation medium portion; a reflecting section for retroreflecting the light wave having passed through the propagation medium portion; and a photoelectric conversion section for receiving the light wave having been reflected by the reflecting section and passed through the propagation medium portion to output an electric signal, wherein: on an outward path along which the light wave output from the light source passes through the propagation medium portion, a $0^{th}$-order diffracted light wave, a $+1^{st}$-order diffracted light wave and a $-1^{st}$-order diffracted light wave are produced by virtue of a refractive index distribution across the propagation medium portion caused by the propagation of the acoustic wave therethrough; on a return path along which the $0^{th}$-order diffracted light wave having been produced on the outward path passes through the propagation medium portion after being reflected by the reflecting section, a $0^{th}$-order diffracted light wave, a $+1^{st}$-order diffracted light wave and a $-1^{st}$-order diffracted light wave are produced by virtue of a refractive index distribution across the propagation medium portion caused by the propagation of the acoustic wave therethrough; and the photoelectric conversion section detects at least one of interference light between the $+1^{st}$-order diffracted light wave produced on the outward path and the $-1^{st}$-order diffracted light wave produced on the return path, and interference light between the $-1^{st}$-order diffracted light wave produced on the outward path and the $+1^{st}$-order diffracted light wave produced on the return path.

In one embodiment, the optical microphone may further include a beam splitter located between the light source and the propagation medium portion, wherein the beam splitter causes the $+1^{st}$-order diffracted light waves and the $-1^{st}$-order diffracted light waves produced on the outward path and the return path to be output in a direction different from the light source.

In one embodiment, the reflecting section may be retroreflective at least on a plane that contains a propagation direction of the acoustic wave and a propagation direction of the light wave output from the light source in the propagation medium portion.

In one embodiment, the reflecting section may be a reversal mirror; and an axis of symmetry of the reversal mirror is perpendicular to the propagation direction of the acoustic wave and the propagation direction of the light wave.

In one embodiment, the reflecting section may be a corner cube mirror.

In one embodiment, the photoelectric conversion section may have a light-receiving surface; and the photoelectric conversion section is arranged while being shifted in a predetermined direction with respect to the $0^{th}$-order diffracted light wave produced on the return path so that the $0^{th}$-order diffracted light wave produced on the return path does not enter the light-receiving surface.

In one embodiment, the photoelectric conversion section may include a light-receiving surface; and the optical microphone further includes a light-blocking section for blocking the $0^{th}$-order diffracted light wave produced on the return path from entering the light-receiving surface so that the $0^{th}$-order diffracted light wave does not enter the light-receiving surface.

In one embodiment, the optical microphone may further include a light-receiving lens system having a diverging function arranged on one side of the light-blocking section that is closer to the propagation medium along an optical path of the return path.

In one embodiment, the optical microphone may further include a light-receiving lens system arranged on an optical path of the return path and having a distribution such that a magnifying power thereof decreases from a center toward an outer edge thereof.

In one embodiment, the propagation medium portion may be formed by a dry silica gel.

In one embodiment, the light wave may be a laser beam.

In one embodiment, the optical microphone may further include a frequency conversion section for converting a frequency of the electric signal obtained by the photoelectric conversion section to ½ the frequency.

An acoustic wave detection method disclosed in the present application is an acoustic wave detection method for detecting an acoustic wave propagating through an environment fluid using a light wave, the method including the steps of: (A) propagating an acoustic wave through a propagation medium portion; (B) causing a light wave to pass across the acoustic wave propagating through the propagation medium portion, thereby producing a $0^{th}$-order diffracted light wave, a $+1^{st}$-order diffracted light wave and a $-1^{st}$-order diffracted light wave by virtue of a refractive index distribution across the propagation medium portion caused by the propagation of the acoustic wave therethrough; (C) retroreflecting the $0^{th}$-order diffracted light wave, the $+1^{st}$-order diffracted light wave and the $-1^{st}$-order diffracted light wave produced in the step (B); (D) causing the retroreflected $0^{th}$-order diffracted light wave to pass across the acoustic wave propagating through the propagation medium portion, thereby producing a $+1^{st}$-order diffracted light wave and a $-1^{st}$-order diffracted light wave by virtue of a refractive index distribution across the propagation medium portion caused by the propagation of the acoustic wave therethrough; and (E) detecting at least one of interference light between the $+1^{st}$-order diffracted light wave having been produced in the step (B) and retroreflected and the $-1^{st}$-order diffracted light wave produced in the step (D), and interference light between the $-1^{st}$-order diffracted light wave having been produced in the step (B) and retroreflected and the $+1^{st}$-order diffracted light wave produced in the step (D).

An optical microphone disclosed in the present application is an optical microphone for detecting an acoustic wave using a light wave, the optical microphone including: a propagation medium portion through which the acoustic wave propagates; a light source for outputting a light wave passing through the propagation medium portion across the acoustic wave propagating through the propagation medium portion; a reflecting section for retroreflecting the light wave having passed through the propagation medium portion; and a photoelectric conversion element array including a plurality of photoelectric conversion elements for receiving the light wave having been reflected by the reflecting section and passed through the propagation medium portion to output an electric signal, wherein: on an outward path along which the light wave output from the light source passes through the propagation medium portion, a $0^{th}$-order diffracted light wave, a $+1^{st}$-order diffracted light wave and a $-1^{st}$-order diffracted light wave are produced from the light wave by virtue of a refractive index distribution across the propagation medium portion caused by the propagation of the acoustic wave therethrough; on a return path along which the $0^{th}$-order diffracted light wave having been produced on the outward path passes through the propagation medium portion as a result of the reflection by the reflecting section, a $0^{th}$-order diffracted light wave, a $+1^{st}$-order diffracted light wave and a $-1^{st}$-order diffracted light wave are produced from the $0^{th}$-order diffracted light on the outward path by virtue of the refractive index distribution across the propagation medium portion caused by the propagation of the acoustic wave therethrough; and the photoelectric conversion element array detects, using one or more of the plurality of photoelectric conversion elements, at least one of a first interference light wave obtained as a result of interference between the $+1^{st}$-order diffracted light wave produced on the outward path and the $-1^{st}$-order diffracted light wave produced on the return path, and a second interference light wave obtained as a result of interference between the $-1^{st}$-order diffracted light wave produced on the outward path and the $+1^{st}$-order diffracted light wave produced on the return path.

In one embodiment, a propagation direction of the acoustic wave may be identified based on a position or positions, in the photoelectric conversion element array, of the one or more of the photoelectric conversion elements that have detected at least one of the first interference light wave and the second interference light wave.

In one embodiment, the acoustic wave may be isolated based on a frequency thereof by independently detecting at least one of the first interference light wave and the second interference light wave using the plurality of photoelectric conversion elements.

In one embodiment, the plurality of photoelectric conversion elements may each include an arc-shaped light-receiving section, and the light-receiving sections may be arranged in different azimuthal directions in a circle centered about a position on the return path at which the $0^{th}$-order diffracted light wave is incident; a propagation direction of the acoustic wave is identified based on the azimuthal direction or azimuthal directions, in the circle, of the light-receiving section or sections of the one or more of the photoelectric conversion elements that have detected at least one of the first interference light wave and the second interference light wave.

In one embodiment, the propagation medium portion may include a sound blocking section for blocking the acoustic wave from entering the propagation medium portion, in a plane perpendicular to a propagation direction of the light wave, from azimuthal directions that are 180° or more with respect to a center that is a point at which the light wave output from the light source intersects with the plane.

In one embodiment, the plurality of photoelectric conversion elements may include ring-shaped light-receiving sections having different inner diameters and outer diameters; the light-receiving sections of the plurality of photoelectric conversion elements may be arranged in a concentric pattern centered about a position on the return path at which the $0^{th}$-order diffracted light wave is incident; and at least one of the first interference light wave and the second interference light wave may independently detected by the plurality of photoelectric conversion elements.

In one embodiment, the plurality of photoelectric conversion elements may each include a light-receiving section; the light-receiving sections may be arranged in at least one dimension so as to be centered about a position on the return path at which the $0^{th}$-order diffracted light wave is incident; and at least one of the first interference light wave and the second interference light wave may be independently detected by the plurality of photoelectric conversion elements.

In one embodiment, the acoustic wave may be separately detected for each different frequency band based on sizes and distances from the center of the light-receiving sections of the plurality of photoelectric conversion elements.

In one embodiment, the light-receiving sections may be arranged two-dimensionally in the one-dimensional arrangement direction and in a direction non-parallel to the one-dimensional arrangement direction; a propagation direction of the acoustic wave may be further identified based on an azimuthal direction, about the center, of the light-receiving section or sections of the one or more of the photoelectric conversion elements that have detected at least one of the first interference light wave and the second interference light wave.

In one embodiment, the plurality of photoelectric conversion elements may each include a partial-ring-shaped light-receiving section, and the light-receiving sections may be arranged two-dimensionally in a radial direction and in a circumferential direction in a circle centered about a position on the return path at which the $0^{th}$-order diffracted light wave is incident; the acoustic wave may be isolated based on a frequency thereof by independently detecting at least one of the first interference light wave and the second interference light wave using two or more photoelectric conversion elements that are located in a same azimuthal direction of the circumferential direction and at different positions in the radial direction; and a propagation direction of the acoustic wave may be identified based on the circumferential direction azimuthal direction about the center.

In one embodiment, the optical microphone may further include a light-receiving lens system having a diverging function provided on one side the photoelectric conversion element array that is closer to the propagation medium portion.

In one embodiment, the optical microphone may further include a light-receiving lens system arranged on an optical path of the return path on one side of the light-blocking section that is closer to the propagation medium, and having a distribution such that a magnifying power thereof decreases from a center toward an outer edge thereof.

In one embodiment, the propagation medium portion may be formed by a dry silica gel.

In one embodiment, the light wave may be a laser beam.

In one embodiment, the optical microphone may further include a frequency conversion section for converting a frequency of the electric signal obtained by the photoelectric conversion element array to ½ the frequency.

A flaw detection device disclosed in the present application includes: a sound source for generating an acoustic wave in a subject; a light source for outputting a light wave passing through the subject across a reflected wave of the acoustic wave caused by a flaw in the subject; a reflecting section for retroreflecting the light wave having passed through the subject; and a photoelectric conversion element array including a plurality of photoelectric conversion elements for receiving the light wave having been reflected by the reflecting section and passed through the subject to output an electric signal, wherein: on an outward path along which the light wave output from the light source passes through the subject, a $0^{th}$-order diffracted light wave, a $+1^{st}$-order diffracted light wave and a $-1^{st}$-order diffracted light wave are produced from the light wave by virtue of a refractive index distribution across the subject caused by the propagation of the reflected wave therethrough; on a return path along which the $0^{th}$-order diffracted light wave having been produced on the outward path passes through the subject as a result of the reflection by the reflecting section, a $0^{th}$-order diffracted light wave, a $+1^{st}$-order diffracted light wave and a $-1^{st}$-order diffracted light wave are produced from the $0^{th}$-order diffracted light on the outward path by virtue of the refractive index distribution across the subject caused by the propagation of the reflected wave; the photoelectric conversion element array detects, using one or more of the plurality of photoelectric conversion elements, at least one of a first interference light wave obtained as a result of interference between the +1$^{st}$-order diffracted light wave produced on the outward path and the −1$^{st}$-order diffracted light wave produced on the return path, and a second interference light wave obtained as a result of interference between the −1$^{st}$-order diffracted light wave produced on the outward path and the +1$^{st}$-order diffracted light wave produced on the return path; a propagation direction of the reflected wave is identified based on a position or positions, in the photoelectric conversion element array, of the one or more of the photoelectric conversion elements that have detected at least one of the first interference light wave and the second interference light wave; a distance over which the reflected wave propagates through the subject is calculated based on a time when at least one of the first interference light wave and the second interference light wave is detected by the photoelectric conversion element array and a time of generation of the acoustic wave in the subject; and a position of the flaw in the subject is estimated from the identified propagation direction and the calculated distance.

An acoustic wave detection method disclosed in the present application is an acoustic wave detection method for detecting an acoustic wave using a light wave, the method including the steps of: (A) propagating an acoustic wave through a propagation medium portion; (B) causing a light wave to pass across the acoustic wave propagating through the propagation medium portion, thereby producing a 0$^{th}$-order diffracted light wave, a +1$^{st}$-order diffracted light wave and a −1$^{st}$-order diffracted light wave by virtue of a refractive index distribution across the propagation medium portion caused by the propagation of the acoustic wave therethrough; (C) retroreflecting the 0$^{th}$-order diffracted light wave, the +1$^{st}$-order diffracted light wave and the −1$^{st}$-order diffracted light wave produced in the step (B); (D) causing the retroreflected 0$^{th}$-order diffracted light wave to pass across the acoustic wave propagating through the propagation medium portion, thereby producing a +1$^{st}$-order diffracted light wave and a −1$^{st}$-order diffracted light wave by virtue refractive index distribution across the propagation medium portion caused by the propagation of the acoustic wave therethrough; and (E) detecting, using a photoelectric conversion element array including a plurality of photoelectric conversion elements, at least one of a first interference light wave between the +1$^{st}$-order diffracted light wave having been produced in the step (B) and retroreflected and the −1$^{st}$-order diffracted light wave produced in the step (D), and a second interference light wave between the −1$^{St}$-order diffracted light wave having been produced in the step (B) and retroreflected and the +1$^{st}$-order diffracted light wave produced in the step (D), and identifying a propagation direction of the acoustic wave based on a position or positions, in the photoelectric conversion element array, of the one or more of the photoelectric conversion elements that have detected at least one of the first interference light wave and the second interference light wave.

Another acoustic wave detection method disclosed in the present application is an acoustic wave detection method for detecting an acoustic wave using a light wave, the method including: (A) propagating an acoustic wave through a propagation medium portion; (B) causing a light wave to pass across the acoustic wave propagating through the propagation medium portion, thereby producing a 0$^{th}$-order diffracted light wave, a +1$^{st}$-order diffracted light wave and a −1$^{st}$-order diffracted light wave by virtue of a refractive index distribution across the propagation medium portion caused by the propagation of the acoustic wave therethrough; (C) retroreflecting the 0$^{th}$-order diffracted light wave, the +1$^{st}$-order diffracted light wave and the −1$^{st}$-order diffracted light wave produced in the step (B); (D) causing the retroreflected 0$^{th}$-order diffracted light wave to pass across the acoustic wave propagating through the propagation medium portion, thereby producing a +1$^{st}$-order diffracted light wave and a −1$^{st}$-order diffracted light wave by virtue of a refractive index distribution across the propagation medium portion caused by the propagation of the acoustic wave therethrough; and (E) independently detecting, using photoelectric conversion element array including a plurality of photoelectric conversion elements, at least one of a first interference light wave between the +1$^{st}$-order diffracted light wave having been produced in the step (B) and retroreflected and the −1$^{st}$-order diffracted light wave produced in the step (D), and a second interference light wave between the −1$^{st}$-order diffracted light wave having been produced in the step (B) and retroreflected and the +1$^{st}$—order diffracted light wave produced in the step (D), thereby isolating the acoustic wave based on a frequency thereof.

A first embodiment of an optical microphone according to the present invention will now be described with reference to the drawings.

FIG. 1A shows a configuration of a main part of an optical microphone 101 of the present embodiment. The optical microphone 101 is a microphone for detecting, as an electric signal, an acoustic wave 1 propagating through an environment fluid using a light wave 4. Herein, the "environment fluid" denotes a fluid that exists in the outside space around the optical microphone 101. For example, the environment fluid is the air.

The optical microphone 101 includes a propagation medium portion 2, a light source 3, a photoelectric conversion section 5, and a reflecting section 6.

The acoustic wave 1 propagating through the environment fluid enters the propagation medium portion 2. The light wave 4 output from the light source 3 enters the propagation medium portion 2. The light wave 4 having entered the propagation medium portion 2 interacts with the acoustic wave 1 while passing through the propagation medium portion 2 before reaching the reflecting section 6. The light wave 4 is reflected by the reflecting section 6, and enters the propagation medium portion 2 again. The light wave 4 having entered the propagation medium portion 2 again, interacts with the acoustic wave 1 again while passing through the propagation medium portion 2, and travels toward the light source 3.

In order to detect the light wave 4, which has passed through the propagation medium portion 2 twice, with the photoelectric conversion section 5, the optical microphone 101 may include a beam splitter 7 between the light source 3 and the propagation medium portion 2. In such a case, the light wave 4 enters the propagation medium portion 2 from the light source 3 via the beam splitter 7, and is reflected by the reflecting section 6, before it passes through the propagation medium portion 2 again to reach the beam splitter 7. The light wave 4 having reached the beam splitter 7 is reflected by the beam splitter 7 to enter the photoelectric conversion section 5. Using the beam splitter 7, the optical path along which the light wave 4 output from the light source 3 reaches the propagation medium portion 2 and the optical path along which the light wave 4 having reached the beam splitter 7 reaches the photoelectric conversion section 5 can be adjusted to be in different directions. Therefore, the photoelectric conversion section 5 can be arranged in a different direction from the light source 3, thereby making the detection of the light wave 4 easier.

Figure 1B:
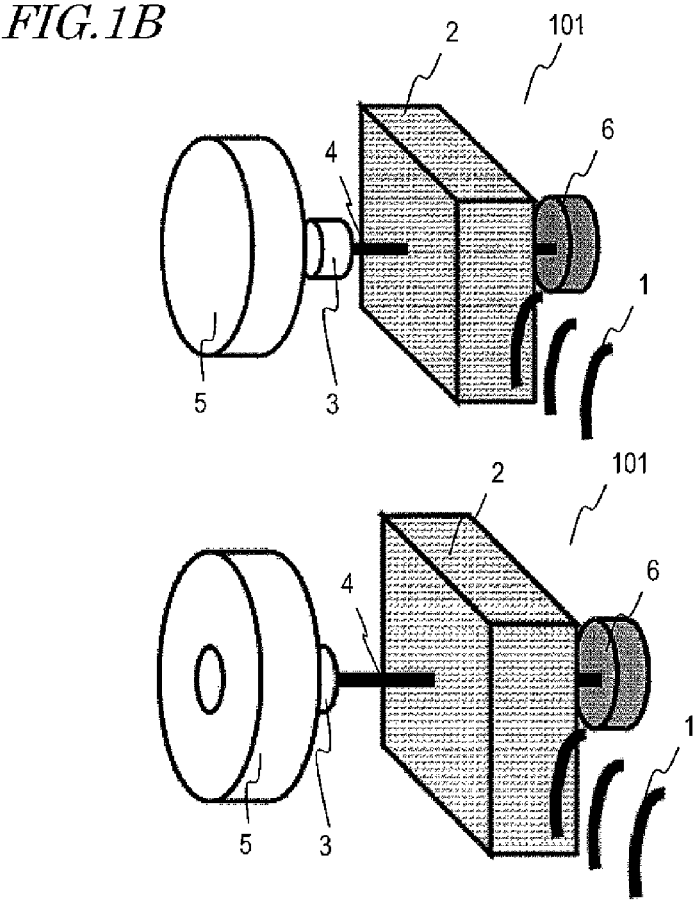
FIG. 1B is a diagram showing another configuration of the first embodiment of the optical microphone according to the present invention.

When the beam splitter 7 is not used, the photoelectric conversion section 5 can be arranged behind or around the light source 3, as shown in FIG. 1B, for example. In such a case, the projected area of the light source 3 onto the light-receiving surface of the photoelectric conversion section 5 may be made small, and the area across which the light wave 4 is blocked may be reduced as much as possible, so that the photoelectric conversion section 5 can receive a sufficient amount of the light wave 4. An isolator may be provided on one side of the light source closer to the propagation medium portion 2 in order to prevent the operation of the light source 3 from becoming instable due to the reflected light entering the light source 3.

The photoelectric conversion section 5 outputs an electric signal that contains a component having a frequency that is twice the acoustic wave 1. Therefore, as shown in FIG. 1A, the photoelectric conversion section 5 is connected to a frequency conversion section 21 so that the frequency of the input signal is converted to ½ through the frequency conversion section 21, thereby obtaining an electric signal containing a component of the acoustic wave 1.

First, components of the optical microphone 101 will now be described in detail, and then the operation of the optical microphone 101 will be described. Hereinafter, the coordinate system is defined as shown in FIG. 1A, for the sake of simplicity. Specifically, the direction in which the acoustic wave 1 propagates is defined as the x axis, and the direction in which the light wave 4 propagates is defined as the z axis. The direction orthogonal to the x axis and to the z axis is defined as the y axis.

(Acoustic Wave 1)

The acoustic wave 1 that can be detected by the optical microphone 101 of the present embodiment is an audible wave or an ultrasonic wave of about 20 Hz or more and about 20 MHz or less. The acoustic wave 1 may be a continuous wave whose frequency changes over time, such as sound or music, or a continuous wave which is a sinusoidal wave of a single frequency. It may also be an acoustic wave that is not continuous over time, such as a single-pulse burst signal.

(Propagation Medium Portion 2)

The acoustic wave 1 propagating through the environment fluid enters the propagation medium portion 2, and propagates through the inside of the propagation medium portion 2 in the x direction as shown in FIGS. 2A to 2D. As the acoustic wave 1 propagates, the density of the substance forming the propagation medium portion 2 changes, thereby causing a change to the refractive index. Since the acoustic wave 1 is a longitudinal wave, the refractive index distribution occurs in the propagation direction (the x axis) of the acoustic wave 1. Substantially no distribution occurs across a plane perpendicular to the propagation direction of the acoustic wave 1. The refractive index distribution of the propagation medium portion 2 produced by the acoustic wave 1 serves as a diffraction grating.

The propagation medium portion 2 is formed by a solid propagation medium, and may have a sonic velocity smaller than that of the air. Moreover, it may be transparent to the light wave 4 output from the light source 3. Specifically, the sonic velocity of the propagation medium portion 2 may be smaller than 340 m/sec, which is the sonic velocity of the air. By using a solid material as the propagation medium, there is produced a large density distribution, i.e., refractive index distribution, of the propagation medium portion 2, and it is possible to obtain a significant diffracting effect. Since a material of a small sonic velocity typically also has a relatively small density, the reflection at the interface between the environment fluid such as the air and the propagation medium portion 2 will be small, and it is possible to take in the acoustic wave into the propagation medium portion 2 with a relatively high efficiency.

Particularly, a dry silica gel may be used as the propagation medium of the propagation medium portion 2. A dry silica gel has a property that it has a small acoustic impedance difference from the air, and the acoustic wave 1 propagating through the air can be efficiently taken in into the inside of the propagation medium portion 2 formed by a dry silica gel. Specifically, the sonic velocity of a dry silica gel is 50 m/sec or more and 150 m/sec or less, smaller than 340 m/sec, the sonic velocity of the air, and the density is also small at about 70 kg/m$^3$ or more and about 280 kg/m$^3$ or less. Therefore, the difference is small from the acoustic impedance of the air, and the reflection at the interface is small, whereby it is possible to efficiently take in the acoustic wave in the air into the inside. For example, when a dry silica gel having a sonic velocity of 50 m/sec and a density of 100 kg/m$^3$ is used, the reflection at the interface with the air will be 70%, and about 30% of the energy of the acoustic wave is taken in into the inside without being reflected at the interface. The dry silica gel also has a property that the amount of change $\Delta n$ in refractive index for light waves is large. The amount of change $\Delta n$ in refractive index of the air is $2.0 \times 10^{-9}$ for a sound pressure change of 1 Pa, the amount of change $\Delta n$ in refractive index of the dry silica gel for a sound pressure change of 1 Pa is as large as about $1.0 \times 10^{-7}$. Therefore, it is possible to obtain a sufficient sensitivity without preparing a large propagation medium that is over 10 cm.

(Light Source 3)

The light source 3 outputs the light wave 4, and the output light wave 4 passes through the propagation medium portion 2 as shown in FIGS. 1A, 1B and 2A to 2D. There is no particular limitation on the wavelength and the intensity of the light wave 4, and a wavelength and an intensity are selected such that the photoelectric conversion section 5 can detect the light wave 4 with a desirable sensitivity. Note however that one may select a wavelength such that it is not so much absorbed by the propagation medium portion 2. Coherent light or incoherent light may be used as the light wave 4. However, if coherent light such as a laser beam is used, diffracted light waves are more likely to interfere, and it is easier to extract a signal. The diameter of the light wave 4 is 0.01 mm or more and 20 mm or less, for example.

(Outward Path of Light Wave 4)

Figure 2A:
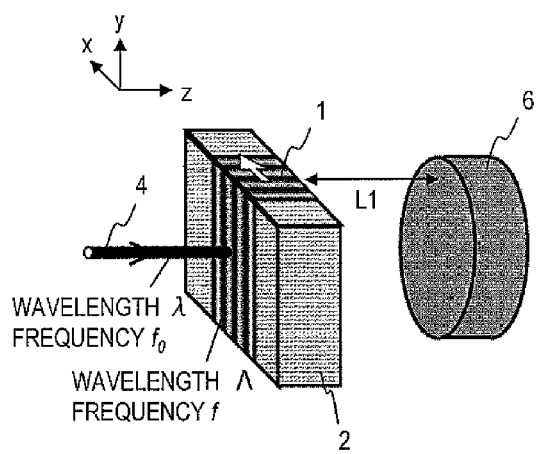
FIGS. 2A to 2D are diagrams showing how diffracted light waves are produced when a light wave passes through a propagation medium portion in the optical microphone shown in FIG. 1A.
Figure 2B:
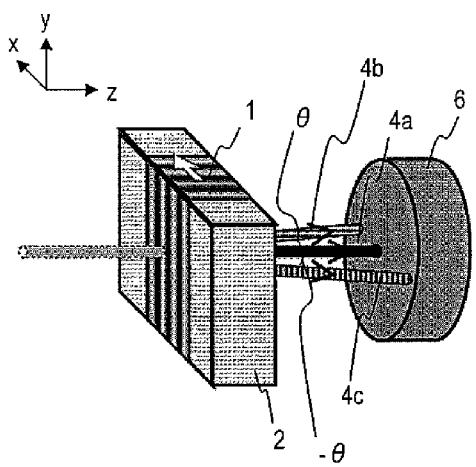

The optical path along which the light wave 4 having been output from the light source 3 passes through the propagation medium portion 2 is referred to as the outward path. The light wave 4 output from the light source 3 enters the propagation medium portion 2, and interacts with the acoustic wave 1 in the propagation medium portion 2 as shown in FIG. 2A. Specifically, as the acoustic wave 1 propagates, a propagation medium density distribution is produced across the propagation medium portion 2, thereby producing a refractive index distribution across the propagation medium. The refractive index distribution across the propagation medium serves as a diffraction grating for the light wave 4, diffracting the light wave 4. Thus, there are produced a +1$^{st}$-order diffracted light wave 4b and a −1$^{st}$-order diffracted light wave 4c of the light wave 4 due to the acoustic wave 1 as shown in FIG. 2B. Moreover, a 0$^{th}$-order diffracted light wave 4a, which has not been diffracted by the acoustic wave 1 and travels straight in the direction of incidence also comes out of the propagation medium portion 2. As will be described below, the refractive index distribution moves as the acoustic wave 1 propagates, the frequency of the diffracted light wave is shifted due to the Doppler effect. The propagation directions of the $+1^{st}$-order diffracted light wave 4b and the $-1^{st}$-order diffracted light wave 4c are located on a plane that contains the propagation direction of the light wave 4 output from the light source 3 and the propagation direction of the acoustic wave 1. The propagation directions of the $+1^{st}$-order diffracted light wave 4b and the $-1^{st}$-order diffracted light wave 4c have angles of $\theta$ and $-\theta$, respectively, on this plane with respect to the $0^{th}$-order diffracted light wave 4a. The phase of the $+1^{st}$-order diffracted light wave 4b and the phase of the $-1^{st}$-order diffracted light wave 4c are reverse from each other. Angles are defined with respect to the propagation direction of the light wave 4 traveling toward the reflecting section 6, with angles toward the X-axis positive direction denoted as being positive.

As shown in FIG. 2B, the $+1^{st}$-order diffracted light wave 4b diffracts in the x-axis positive direction at an angle of $\theta$ with respect to the $0^{th}$-order diffracted light wave 4a, and the $-1^{st}$-order diffracted light wave 4c diffracts in the x-axis negative direction at an angle of $-\theta$ with respect to the $0^{th}$-order diffracted light wave 4a. If the sound pressure of the acoustic wave 1 propagating through the environment fluid is of such a level that it can be measured with a normal microphone, the produced diffracted light waves will dominantly be the $+1^{st}$-order diffracted light wave 4b and the $-1^{st}$-order diffracted light wave 4c, and diffracted light waves of the second or higher order can be ignored. However, if the sound pressure of the acoustic wave 1 is high, it is possible that diffracted light components of the second or higher order are generated. In such a case, the diffracted light components of the second or higher order can be optically or electrically removed.

In order to obtain a diffracted light wave of the light wave 4, the propagation direction of the light wave 4 and the propagation direction of the acoustic wave 1 may be arranged non-parallel to each other, i.e., the acoustic wave 1 may propagate across the light wave 4. Particularly, where the propagation direction of the acoustic wave 1 and the propagation direction of the light wave 4 are perpendicular on the xz plane, the highest diffraction efficiency is obtained, and the sensitivity as a microphone will be high.

(Reflecting Section 6)

The light wave 4, including the $0^{th}$-order diffracted light wave 4a, the $+1^{st}$-order diffracted light wave 4b and the $-1^{st}$-order diffracted light wave 4c, having passed through the propagation medium portion 2 reaches the reflecting section 6. The reflecting section 6 retroreflects the light wave 4. Retroreflection refers to reflection of incident light in the same direction as the direction of incidence. That is, the direction of incidence of the light wave 4 entering the reflecting section 6 is parallel to the exiting direction of the exiting light wave 4 after being reflected by the reflecting section 6. Using the reflecting section 6 capable of retroreflection, it is possible to reflect the light wave 4 so that the light wave 4 passes through the propagation medium portion 2 twice. Moreover, with retroreflection, the $+1^{st}$-order diffracted light wave (or the $-1^{st}$-order diffracted light wave) which has been produced when passing through the propagation medium portion 2 for the first time (on the outward path) can be reflected in the same direction as the direction of incidence. Therefore, the diffraction direction of the $+1^{st}$-order diffracted light wave (or the $-1^{st}$-order diffracted light wave) produced on the outward path and the diffraction direction of the $-1^{st}$-order diffracted light wave (or the $+1^{st}$-order diffracted light wave) produced when passing through the propagation medium portion 2 for the second time (on the return path) can be made to coincide with each other, and it is possible to obtain an interference light wave of generally a constant intensity from the two diffracted light waves, irrespective of changes of the frequency of the acoustic wave.

The optical axis of the $0^{th}$-order diffracted light wave 4a coming off the reflecting section 6 may coincide with the optical axis of the $0^{th}$-order diffracted light wave 4a passing through the propagation medium portion 2 and entering the reflecting section 6. As will be described below, this makes it possible that the light wave 4 on the outward path and the $0^{th}$-order diffracted light wave 4a on the return path receive interactions at the same position from the acoustic wave 1 in the propagation medium portion 2. Therefore, it is possible to suppress the time gap between contacts with the acoustic wave 1 on the outward path and on the return path, and the light wave 4 and the acoustic wave 1 can be made to contact (interact) with each other twice at substantially the same time.

Figure 2C:
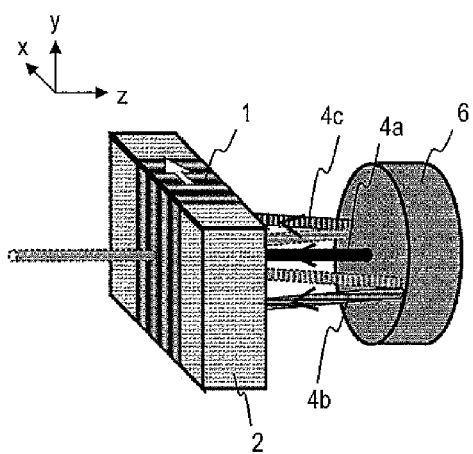

As shown in FIGS. 2B and 2C, the positions of the $+1^{st}$-order diffracted light wave 4b and the $-1^{st}$-order diffracted light wave 4c coming off the reflecting section 6 are reverse from each other with respect to the $0^{th}$-order diffracted light wave 4a coming off the reflecting section 6. Specifically, the $+1^{st}$-order diffracted light wave 4b entering the reflecting section 6 is located on the positive side along the x axis with respect to the light wave 4 entering the reflecting section 6, whereas the $+1^{st}$-order diffracted light wave 4b coming off the reflecting section 6 is located on the negative side along the x axis with respect to the $0^{th}$-order diffracted light wave 4a coming off the reflecting section 6. Similarly, the $-1^{st}$-order diffracted light wave 4c entering the reflecting section 6 is located on the negative side along the x axis with respect to the light wave 4 entering the reflecting section 6, whereas the $-1^{st}$-order diffracted light wave 4c coming off the reflecting section 6 is located on the positive side along the x axis with respect to the $0^{th}$-order diffracted light wave 4a coming off the reflecting section 6.

When the $0^{th}$-order diffracted light wave 4a is incident upon the origin along the x axis, the $+1^{st}$-order diffracted light wave 4b entering the reflecting section 6 propagates through the x-axis positive area, and the $+1^{st}$-order diffracted light wave 4b coming off the reflecting section 6 propagates through the x-axis negative area. The $-1^{st}$-order diffracted light wave 4c entering the reflecting section 6 propagates through the x-axis negative area, and the $-1^{st}$-order diffracted light wave 4c coming off the reflecting section 6 propagates through the x-axis positive area.

When the light wave 4 passes through the propagation medium portion 2, the $+1^{st}$-order diffracted light wave 4b and the $-1^{st}$-order diffracted light wave 4c are propagated while being diffracted by the angle $\theta$ with respect to the $0^{th}$-order diffracted light wave 4a. Where L1 denotes the distance between the propagation medium portion 2 and the reflecting section 6, the $+1^{st}$-order diffracted light wave 4b is located at a distance of $L1 \times \theta$ from the $0^{th}$-order diffracted light wave 4a in the x-axis positive direction and the $-1^{st}$-order diffracted light wave 4c is located at a distance of $L1 \times \theta$ from the $0^{th}$-order diffracted light wave 4a in the x-axis negative direction, on the x-y plane where the reflecting section 6 is located. These distances are in proportion to L1.

In one embodiment of the optical microphone 101, the $+1^{st}$-order diffracted light wave 4b and the $-1^{st}$-order diffracted light wave 4c having been reflected by the reflecting section 6 do not have to be away from the $0^{th}$-order diffracted light wave 4a having been reflected by the reflecting section 6. For this, L1 may be small. More specifically, L1 may be 5 mm or less, for example. Moreover, the propagation medium portion may have a small thickness in the direction in which the light wave 4 passes therethrough.

Figure 3:
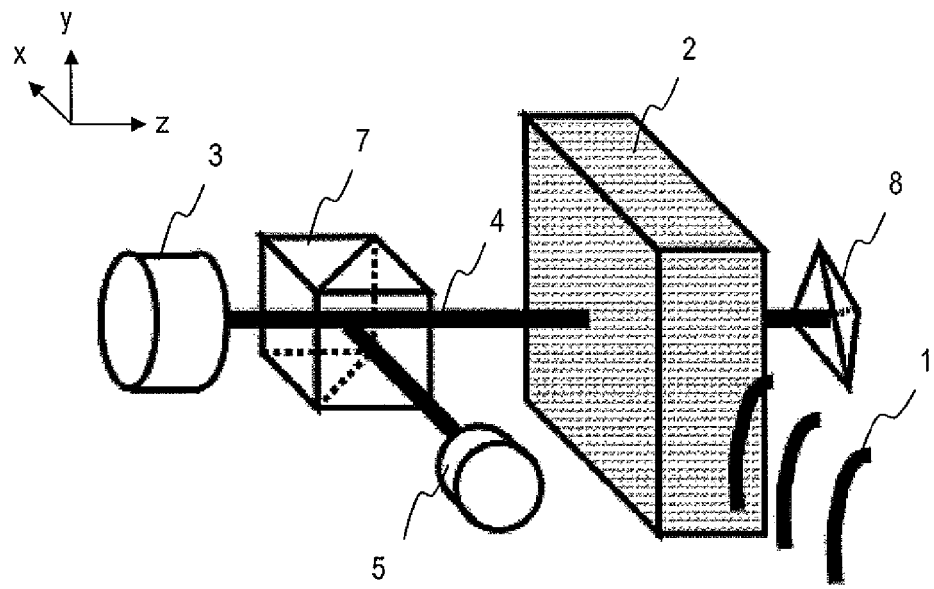
FIG. 3 is a diagram showing an example where a corner cube mirror is used as a reflecting section in the optical microphone shown in FIG. 1A.
Figure 4:
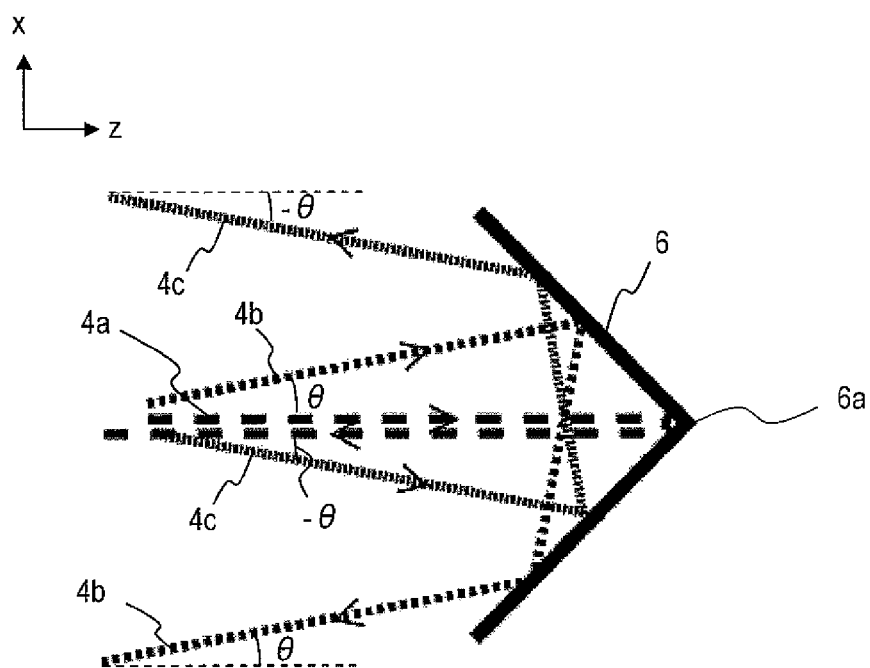
FIG. 4 is a diagram showing how light waves are reflected by a reflecting section formed by a corner cube mirror.

A corner cube mirror 8 shown in FIG. 3, for example, may be used as the reflecting section 6. The corner cube mirror 8 includes three plane mirrors assembled together at right angles, where an incident light wave is reflected by the plane mirrors three times, outputting in a light wave in a direction parallel to the direction of incidence. FIG. 4 shows how the light wave 4 is reflected by the corner cube mirror 8 along the x-z cross section. In FIG. 4, the corner cube mirror 8 is shown to have two orthogonal reflective surfaces at the x-z cross section.

The $0^{th}$-order diffracted light wave 4a, the $+1^{st}$-order diffracted light wave 4b and the $-1^{st}$-order diffracted light wave 4c incident upon the corner cube mirror 8 are each reflected in an exiting direction parallel to the direction of incidence. That is, as shown in FIG. 4, the $+1^{st}$-order diffracted light wave 4b entering the corner cube mirror 8 has an angle of θ with respect to the $0^{th}$-order diffracted light wave (the z axis), and the $+1^{st}$-order diffracted light wave 4b exiting the corner cube mirror 8 also has an angle of with respect to the z axis. The $-1^{st}$-order diffracted light wave 4c entering the corner cube mirror 8 has an angle of −θ with respect to the z axis, and the $-1^{st}$-order diffracted light wave 4c exiting the corner cube mirror 8 also has an angle of −0 with respect to the z axis.

The positional relationship between the $+1^{st}$-order diffracted light wave 4b and the $-1^{St}$-order diffracted light wave 4c with respect to the $0^{th}$-order diffracted light wave 4a is reversed in the x-axis direction; that is, the light wave 4 is reflected while being reversed in the x-axis direction. When the corner cube mirror 8 is used as the reflecting section 6 as shown in FIG. 4, the $0^{th}$-order diffracted light wave 4a may be incident upon a vertex 6a of the three plane mirrors assembled together of the corner cube mirror 8 at an angle of 45° with respect to the three ridges converging to the vertex 6a. Then, the optical axis of the $0^{th}$-order diffracted light wave 4a entering the corner cube mirror 8 and the optical axis of the $0^{th}$-order diffracted light wave 4a exiting the corner cube mirror 8 can be made to coincide with each other.

When the $0^{th}$-order diffracted light wave 4a is incident upon the origin along the x axis, the $+1^{st}$-order diffracted light wave 4b entering the corner cube mirror 8 propagates through the x-axis positive area, and the $+1^{st}$-order diffracted light wave 4b coming off the corner cube mirror 8 propagates through the x-axis negative area. The $-1^{st}$-order diffracted light wave 4c entering the corner cube mirror 8 propagates through the x-axis negative area, and the $-1^{st}$-order diffracted light wave 4c coming off the corner cube mirror 8 propagates through the x-axis positive area.

Figure 5:
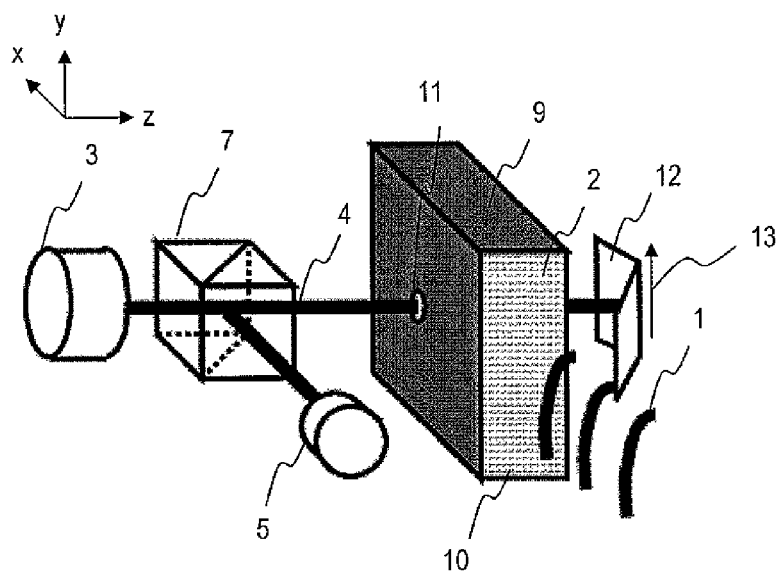
FIG. 5 is a diagram showing an example where a reversal mirror is used as a reflecting section in the optical microphone shown in FIG. 1A.

The corner cube mirror 8 has two orthogonal reflective surfaces at any cross sections, such as the y-z cross section, as it does at the x-z cross section. Thus, the light wave 4 incident upon the corner cube mirror 8 in any direction exits the corner cube mirror 8 in a direction parallel to the direction of incidence. The positional relationship between the $+1^{st}$-order diffracted light wave 4b and the $-1^{st}$-order diffracted light wave 4c with respect to the $0^{th}$-order diffracted light wave 4a is reversed. Therefore, where the corner cube mirror 8 is used as the reflecting section 6, not only when the acoustic wave 1 is propagating in the x direction, but also when it is propagating in any direction on the x-y plane, the $+1^{st}$-order diffracted light wave 4b and the $-1^{st}$-order diffracted light wave 4c can be reflected in such a relationship that they are reversed with respect to the $0^{th}$-order diffracted light wave 4a, on a plane containing the propagation direction of the light wave 4 entering the reflecting section 6 and the propagation direction of the acoustic wave 1. As a result, the optical microphone 101 can detect the acoustic wave 1, irrespective of the propagation direction of the acoustic wave 1.

Where the propagation direction of the acoustic wave 1 through the propagation medium portion 2 is determined in advance, a reversal mirror 12 may be used as the reflecting section 6 as shown in FIG. 5. The reversal mirror 12 has a structure in which two plane mirrors are attached together orthogonal to each other, and reflects incident light in a line-symmetric manner with an axis of symmetry 13 being the line along which the two mirror surfaces intersect with each other.

In this case, the axis of symmetry 13 may be arranged to be perpendicular to the propagation direction of the acoustic wave 1 and the propagation direction of the light wave 4. The $0^{th}$-order diffracted light wave 4a may be incident upon the reversal mirror 12 on the axis of symmetry 13. Then, as in the case described above referring to FIG. 4, the $0^{th}$-order diffracted light wave 4a, the $+1^{st}$-order diffracted light wave 4b and the $-1^{st}$-order diffracted light wave 4c incident upon the reversal mirror 12 are reflected in an exiting direction parallel to the direction of incidence. The positional relationship between the $+1^{st}$-order diffracted light wave 4b and the $-1^{st}$-order diffracted light wave 4c with respect to the $0^{th}$-order diffracted light wave 4a is reversed in the x-axis direction.

In this case, as shown in FIG. 5, a sound blocking section 9 may be provided in areas of the propagation medium portion 2 other than an opening 10 through which the acoustic wave 1 enters. Then, it is possible to reduce the amount of the acoustic wave 1 propagating in directions other than the x direction that enters the propagation medium portion 2. The sound blocking section 9 may be formed by a transparent material such as an acrylic resin or a glass, or where a non-transparent material is used, a light transmitting portion 11 may be provided by making a hole, for example, in an area where the light wave 4 propagates as shown in FIG. 5.

(Return Path of Light Wave 4)

The light wave 4 having been reflected by the reflecting section 6 enters the propagation medium portion 2 again, and interacts with the acoustic wave 1 in the propagation medium portion 2, producing diffracted light waves. The light wave 4 coming off the reflecting section 6 contains the $0^{th}$-order diffracted light wave 4a, the $+1^{st}$-order diffracted light wave 4b and the $-1^{st}$-order diffracted light wave 4c, and these light waves each interact with the acoustic wave 1, producing diffracted light waves. However, since the intensities of the $+1^{st}$-order diffracted light wave 4b and the $-1^{st}$-order diffracted light wave 4c are small, diffracted light waves of the $+1^{st}$-order diffracted light wave 4b and the $-1^{st}$-order diffracted light wave 4c will have very small intensities. Thus, the diffracted light waves of the $1^{st}$-order diffracted light wave 4b and the $-1^{st}$-order diffracted light wave 4c can be ignored, taking into account only the diffracted light waves of the $0^{th}$-order diffracted light wave 4a.

Figure 2D:
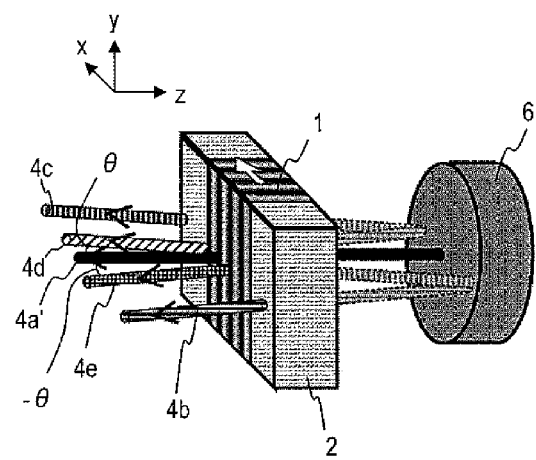

As shown in FIG. 2(d), the $0^{th}$-order diffracted light wave 4a having been reflected by the reflecting section interacts with the acoustic wave 1 in the propagation medium portion 2, thereby producing a $+1^{st}$-order diffracted light wave 4d and a $-1^{st}$-order diffracted light wave 4e. The $+1^{st}$-order diffracted light wave 4d is diffracted in the x-axis positive direction, and the $-1^{st}$-order diffracted light wave 4e is diffracted in the x-axis negative direction. An undiffracted $0^{th}$-order diffracted light wave 4a' also exits the propagation medium portion 2.

(Photoelectric Conversion Section 5)

Figure 6:
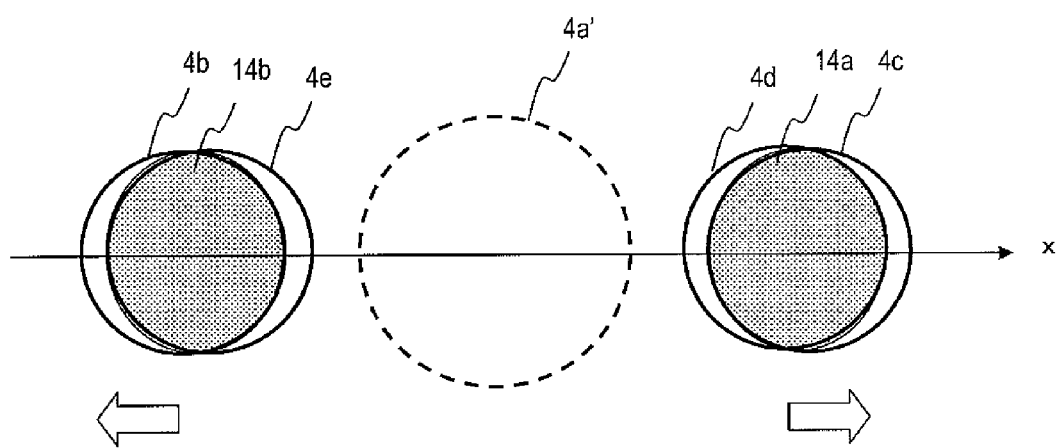
FIG. 6 is a diagram showing the positional relationship between diffracted light waves in the optical microphone shown in FIG. 1A.

The photoelectric conversion section 5 detects the light wave 4, which has been output from the light source 3 and passed through the propagation medium portion 2 twice. FIG. 6 is a cross-sectional view showing the light wave 4 immediately before entering the beam splitter 7 after passing through the propagation medium portion 2 again, as seen on the x-y cross section from the positive-to-negative direction along the z axis. With respect to the $0^{th}$-order diffracted light wave $4a'$, the $-1^{st}$-order diffracted light wave $4c$ on the outward path and the $+1^{st}$-order diffracted light wave $4d$ on the return path are located in the x-axis positive direction overlapping each other, and the $+1^{st}$-order diffracted light wave $4b$ on the outward path and the $-1^{st}$-order diffracted light wave $4e$ on the return path are located in the x-axis negative direction overlapping each other. In overlapping areas $14a$ and $14b$, the light waves interfere with each other, thereby causing a change in light intensity in accordance with the signal of the acoustic wave 1. By receiving the interference light wave with the photoelectric conversion section 5, there is obtained an electric signal in accordance with the change in light intensity, thus detecting the acoustic wave 1.

Generally, a $+1^{st}$-order diffracted light wave and a $-1^{st}$-order diffracted light wave obtained by a diffraction grating are in reverse phase with each other, and therefore even if the $+1^{st}$-order diffracted light wave and the $-1^{st}$-order diffracted light wave overlap with each other, the two light waves are normally canceled out by each other, producing no interference. However, since the $-1^{st}$-order diffracted light wave $4c$ on the outward path entering the photoelectric conversion section 5 has been reflected by the reflecting section 6, the phase thereof has been reversed upon reflection, resulting in the same phase as that of the $+1^{st}$-order diffracted light wave $4d$ on the return path. Therefore, as the $-1^{st}$-order diffracted light wave $4c$ on the outward path and the $+1^{st}$-order diffracted light wave $4d$ on the return path overlap with each other, an interference light wave is produced in the area $14a$. Similarly, the $-1^{st}$-order diffracted light wave $4b$ on the outward path also has its phase reversed at the reflecting section 6, resulting in the same phase as that of the $-1^{st}$-order diffracted light wave $4e$ on the return path; therefore, as the $-1^{st}$-order diffracted light wave $4c$ on the outward path and the $+1^{st}$-order diffracted light wave $4d$ on the return path overlap with each other, an interference light wave is produced in an area $14b$.

It is possible to detect the acoustic wave 1 by receiving, with the photoelectric conversion section 5, one or both of the interference light wave in the area $14a$ and the interference light wave in the area $14b$. Both interference light waves can be detected for the purpose of increasing the amount of light received and enhancing the detection sensitivity, but the acoustic wave 1 can be detected as long as at least one interference light wave is received with the photoelectric conversion section 5.

Note that as the distance L1 between the propagation medium portion 2 and the reflecting section 6 increases, the positions of the $+1^{st}$-order diffracted light wave $4b$ and the $-1^{st}$-order diffracted light wave $4c$ produced on the outward path and reflected by the reflecting section 6 shifts away from the positions of the $+1^{st}$-order diffracted light wave $4d$ and the $-1^{st}$-order diffracted light wave $4e$ produced on the return path. Therefore, the area over which the diffracted light wave on the outward path and the diffracted light waves on the return path overlap with each other decreases, thereby lowering the sensitivity with which the acoustic wave 1 is detected. Conversely, as the distance L1 between the propagation medium portion 2 and the reflecting section 6 decreases, the area over which the diffracted light wave on the outward path and the diffracted light wave on the return path overlap with each other increases, thereby enhancing the sensitivity with which the acoustic wave 1 is detected.

Figure 7:
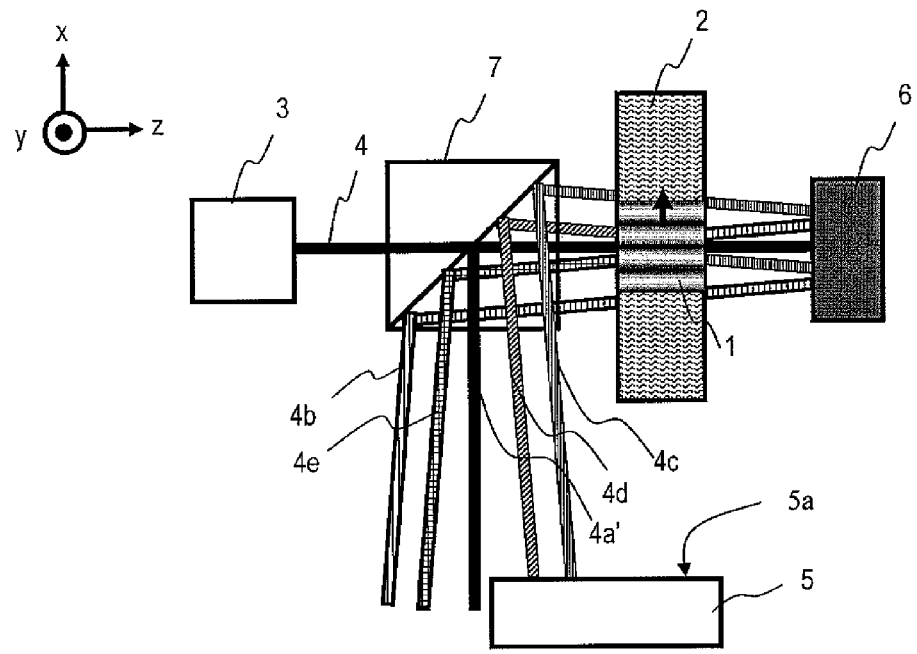
FIG. 7 is a diagram showing an example where a photoelectric conversion section is shifted with respect to the $0^{th}$-order diffracted light in the optical microphone shown in FIG. 1A.

In the optical microphone 101, the $0^{th}$-order diffracted light wave $4a'$ does not contribute to the detection of the acoustic wave 1. Therefore, it does not have to be received by the photoelectric conversion section 5. As a method for not receiving the $0^{th}$-order diffracted light wave $4a'$, the photoelectric conversion section 5 may be arranged while being shifted in the z-axis positive direction past the $0^{th}$-order diffracted light wave $4a'$, as shown in FIG. 7, so that the $0^{th}$-order diffracted light wave $4a'$ is not incident upon a light-receiving surface $5a$, with only the $-1^{st}$-order diffracted light wave $4c$ and the $+1^{st}$-order diffracted light wave $4d$ being incident upon the light-receiving surface $5a$. Alternatively, the photoelectric conversion section 5 may be shifted in the z-axis negative direction past the $0^{th}$-order diffracted light wave $4a'$ so that only the $+1^{st}$-order diffracted light wave $4b$ and the $-1^{st}$-order diffracted light wave $4e$ are incident upon the light-receiving surface $5a$ to be detected.

Figure 8:
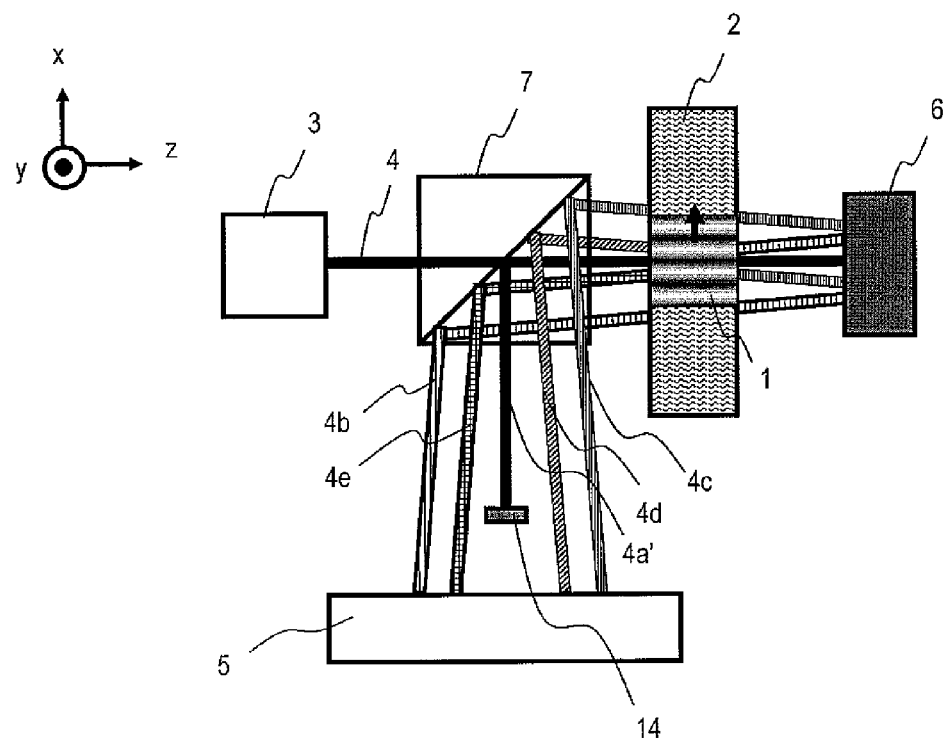
FIG. 8 is a diagram showing an example where diffracted light waves are received by the photoelectric conversion section while blocking the $0^{th}$-order diffracted light wave in the optical microphone shown in FIG. 1A.

As shown in FIG. 8, a light-blocking section 14 may be used to block only the $0^{th}$-order diffracted light wave $4a'$ so that the $0^{th}$-order diffracted light wave $4a'$ is not detected by the photoelectric conversion section 5.

Figure 9:
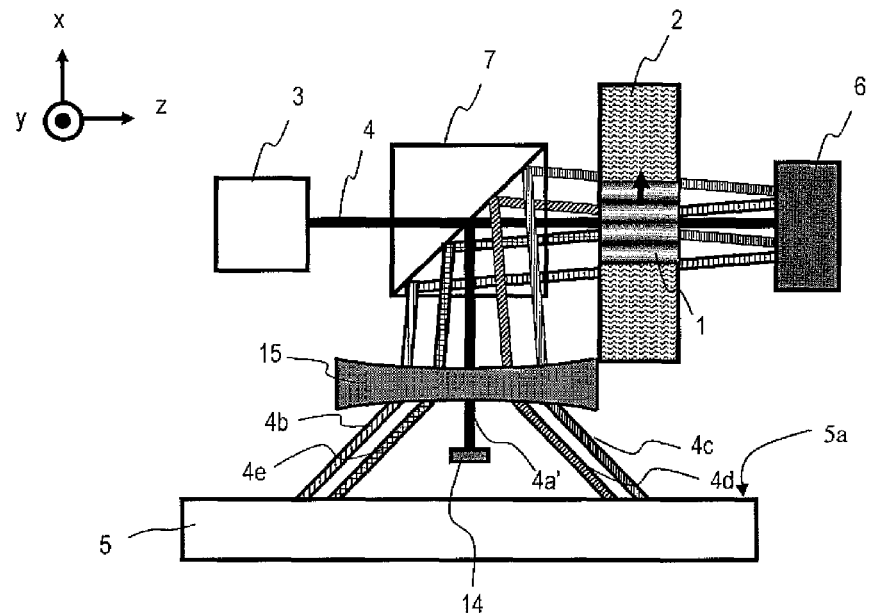
FIG. 9 is a diagram showing an example where a light-receiving lens system having a light-diverging function is arranged on the light-receiving surface of the photoelectric conversion section in the optical microphone shown in FIG. 1A.
Figure 10:
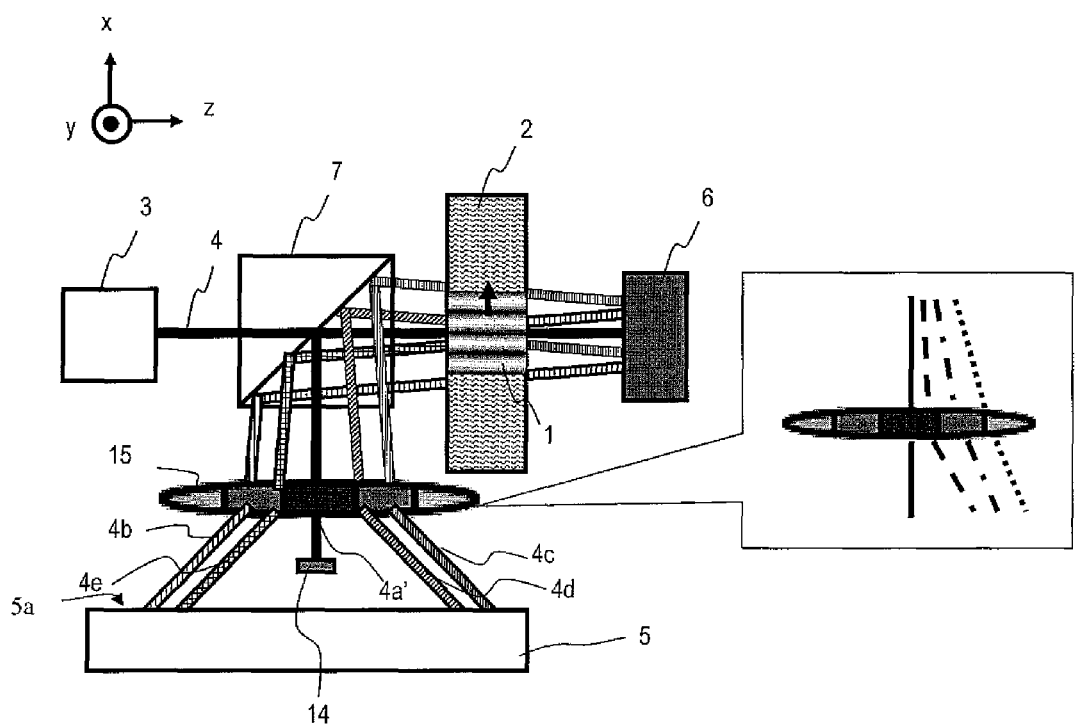
FIG. 10 is a diagram showing an example where a light-receiving lens system having a magnifying power distribution is arranged on the light-receiving surface of the photoelectric conversion section in the optical microphone shown in FIG. 1A.

As shown in FIG. 9, a light-receiving lens system having a light-diverging function, including a concave lens, or the like, may be arranged on the light-receiving surface $5a$ of the photoelectric conversion section 5. Then, the difference in propagation angle between the $0^{th}$-order diffracted light wave $4a'$ and the $+1^{st}$-order diffracted light waves $4b$ and $4d$ and the $-1^{st}$-order diffracted light waves $4c$ and $4e$ can be increased, thereby making it easier to block the $0^{th}$-order diffracted light wave $4a'$ with the light-blocking section 14. Therefore, even if the distance from the propagation medium portion 2 to the photoelectric conversion section 5 is short, it is possible to desirably separate the $0^{th}$-order diffracted light wave $4a'$ from the $1^{st}$-order diffracted light waves $4b$ and $4d$ and the $-1^{st}$-order diffracted light waves $4c$ and $4e$, making it possible to provide a small-sized optical microphone. As shown in FIG. 10, the light-receiving lens system 15 may include a lens having a distribution such that the magnifying power thereof decreases from the center toward the outer edge thereof. Then, only a portion of the light wave 4 in the vicinity of the $0^{th}$-order diffracted light wave $4a'$, which does not contribute to the detection of the acoustic wave 1, is enlarged, making it easier to block the $0^{th}$-order diffracted light wave $4a'$.

Where the difference in diffraction angle is large and the $0^{th}$-order diffracted light wave $4a'$ is sufficiently apart from the $+1^{st}$-order diffracted light waves $4b$ and $4d$ and the $-1^{st}$-order diffracted light waves $4c$ and $4e$, it is not necessary to provide the light-receiving lens system 15. In such a case, the light wave to be detected by the light-receiving lens system does not spared out, and therefore the light-receiving surface of the photoelectric conversion section 5 may be small.

When a dry silica gel is used as the propagation medium portion 2, the velocity Vn of the acoustic wave propagating, through the inside of the propagation medium portion 2 decreases, thereby obtaining a large diffraction angle. Therefore, where the $0^{th}$-order diffracted light wave $4a'$ is to be separated from the $+1^{st}$-order diffracted light waves $4b$ and $4d$ and the $-1^{st}$-order diffracted light waves $4c$ and $4e$, the distance from the propagation medium portion 2 to the photoelectric conversion section 5 can be shortened.

(Frequency Conversion Section 21)

The electric signal produced by the photoelectric conversion section 5 has a frequency that is twice the acoustic wave 1. Therefore, in order to obtain an electric signal of the same frequency as the acoustic wave 1, the frequency of the electric signal output from the photoelectric conversion section 5 is converted to ½ through the frequency conversion section 21.

The frequency conversion section 21 may be, for example, a frequency divider, or the like, formed by an electronic circuit, or the like.

(Operation of Optical Microphone 101)

Next, an operation of the optical microphone 101 will be described.

Figure 11:
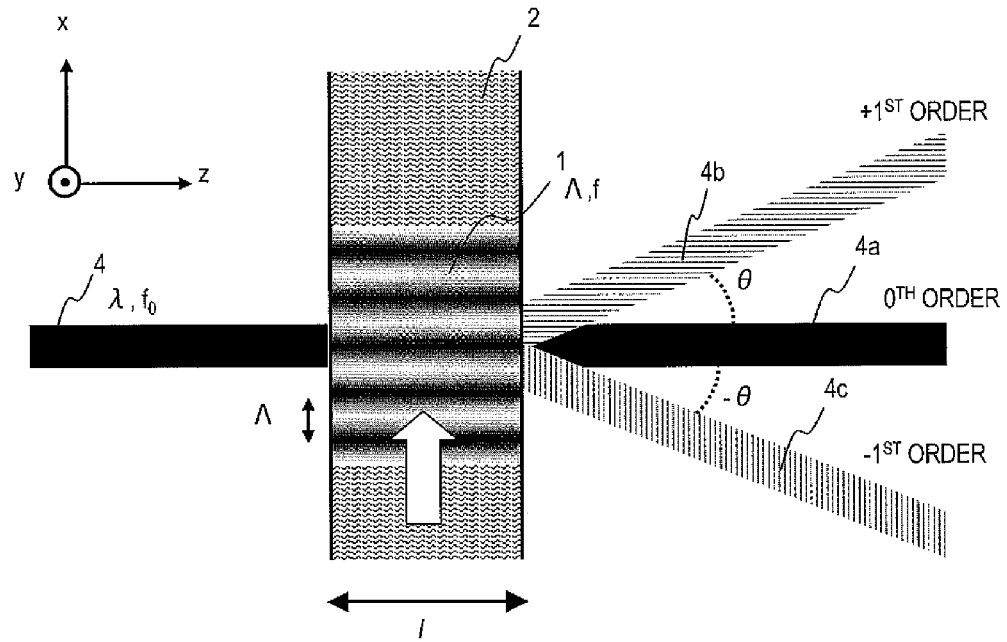
FIG. 11 is a diagram showing diffracted light waves produced on the light wave outward path in the optical microphone shown in FIG. 1A.

FIG. 11 schematically shows how the light wave 4 interacts with the acoustic wave 1 in the propagation medium portion 2 on the outward path. In FIG. 11, the acoustic wave 1 propagates in the direction indicated by an arrow. Black portions representing the acoustic wave 1 indicate those portions where the propagation medium is densified as the propagation medium is displaced by the acoustic wave 1, and white portions indicate those portions where the propagation medium is sparse. In FIG. 11, $\Lambda$ represents the wavelength of the acoustic wave 1 propagating through the propagation medium portion 2, f the frequency of the acoustic wave 1, $\lambda$ the wavelength of the light wave 4, and $f_0$ the frequency of the light wave 4. The light wave 4 propagates in the z axis direction and the acoustic wave 1 propagates in the x-axis direction, and the direction in which the acoustic wave 1 propagates is defined as the x-axis positive direction. The distance over which the light wave 4 propagates through the propagation medium portion 2 is denoted as 1.

As the acoustic wave 1 propagates through the inside of the propagation medium portion 2, the density of the propagation medium portion 2 changes. As a result, the optical refractive index through the propagation medium portion 2 changes. For example, as the acoustic wave 1, which is a planar wave having a wavelength of $\lambda$, propagates, there is formed a pattern of refractive index changes with a period of $\Lambda$. That is, the propagation medium portion 2 becomes a diffraction grating having a pattern of refractive index changes with a period of $\Lambda$.

When the light wave 4 enters the propagation medium portion 2 in such a state, diffracted light waves are produced. For the acoustic wave 1 having a sound pressure within the measurable range, diffracted light components of the second or higher order are small and can therefore be ignored.

As shown in FIG. 11, when the light wave 4 enters the propagation medium portion 2, three diffracted light waves are output, including: the $0^{th}$-order diffracted light wave 4a which propagates in the z axis direction as it is without being diffracted; the $+1^{st}$-order diffracted light wave 4b which is diffracted in the x-axis positive direction, which is the propagation direction of the acoustic wave 1, with respect to the $0^{th}$-order diffracted light wave 4a; and the $-1^{st}$-order diffracted light wave 4c which is diffracted in the x-axis negative direction, which is the opposite direction to the propagation of the acoustic wave 1, with respect to the $0^{th}$-order diffracted light wave 4a.

The frequencies of the $+1^{st}$-order diffracted light wave 4b and the $-1^{st}$-order diffracted light wave 4c are subject to Doppler shift by the acoustic wave 1. Having undergone the Doppler shift, the frequency of the $+1^{st}$-order diffracted light wave 4b is $f_0+f$, and the frequency of the $-1^{st}$-order diffracted light wave 4c is $f_0-f$. The frequency of the $0^{th}$-order diffracted light wave 4a remains $f_0$.

The diffraction angle $\theta$ of the $+1^{st}$-order diffracted light wave 4b and the $-1^{st}$-order diffracted light wave 4c, the intensity $I_0$ of the $0^{th}$-order diffracted light wave 4a, and the intensity $I_1$ of the $+1^{st}$-order diffracted light wave 4b and the $-1^{st}$-order diffracted light wave 4c are expressed as shown in Expressions (1), (2) and (3) below.

[Expression 1]
$$\sin\theta = \frac{\lambda}{\Lambda} = \frac{\lambda \cdot f}{V_n} \tag{1}$$

[Expression 2]
$$I_0 = I_{in} \cdot J_0^2\left(\frac{2\pi \Delta n P l}{\lambda}\right) \tag{2}$$

[Expression 3]
$$I_1 = I_{in} \cdot J_1^2\left(\frac{2\pi \Delta n P l}{\lambda}\right) \tag{3}$$

Here, $\lambda$ denotes the wavelength of the light wave 4, $\Lambda$ the wavelength of the acoustic wave 1, f the frequency of the acoustic wave 1, $V_n$ the propagation speed of the acoustic wave 1 through the propagation medium portion 2, $I_{in}$ the intensity of the light wave 4, $\Delta n$ the amount of change in refractive index of the propagation medium portion 2 caused by the propagation of the acoustic wave 1 of 1 Pa, P the sound pressure of the acoustic wave 1, l the distance over which the light wave 4 propagates through the propagation medium portion 2, $J_0$ the $0^{th}$-order Bessel function, and $J_1$ the $1^{st}$-order Bessel function. It can be seen from Expression (1) that the diffraction angle $\theta$ increases as the frequency f of the acoustic wave 1 increases.

Figure 12:
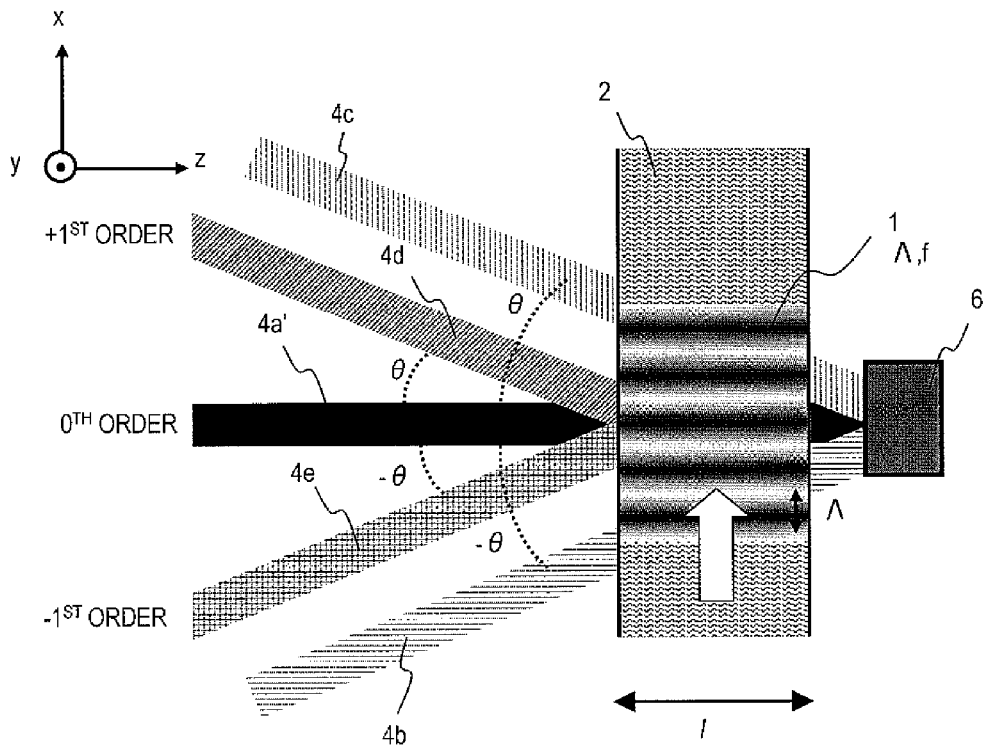
FIG. 12 is a diagram showing diffracted light waves produced or measured on the light wave return path in the optical microphone shown in FIG. 1A.

As described above, the light wave 4 having passed through the propagation medium portion 2 is reflected by the reflecting section 6, and enters the propagation medium portion 2 again. In this process, the positional relationship between the $+1^{st}$-order diffracted light wave 4b and the $-1^{st}$-order diffracted light wave 4c is reversed with respect to the $0^{th}$-order diffracted light wave 4a. FIG. 12 schematically shows how the light wave 4 interacts with the acoustic wave 1 in the propagation medium portion 2 on the return path. As in FIG. 11, $\Lambda$ denotes the wavelength of the acoustic wave 1 propagating through the propagation medium portion 2, f the frequency of the acoustic wave 1, $\lambda$ the wavelength of the light wave 4, and $f_0$ the frequency of the light wave 4. The light wave 4 propagates in the opposite direction in the z axis direction.

As shown in FIG. 12, the $0^{th}$-order diffracted light wave 4a having been reflected by the reflecting section 6 interacts with the acoustic wave 1, thereby outputting, as in FIG. 11, the $0^{th}$-order diffracted light wave 4a' propagating as it is in the opposite direction along the z axis without being diffracted, the $+1^{st}$-order diffracted light wave 4d which has been diffracted in the x-axis positive direction, which is the propagation direction of the acoustic wave 1, with respect to the $0^{th}$-order diffracted light wave 4a', and the $-1^{st}$-order diffracted light wave 4e which has been diffracted in the x-axis negative direction, which is the opposite direction to the propagation of the acoustic wave 1, with respect to the $0^{th}$-order diffracted light wave 4a'. The frequencies of the $+1^{st}$-order diffracted light wave 4d and the $-1^{st}$-order diffracted light wave 4e are subject to Doppler shift by the acoustic wave 1. Having undergone the Doppler shift, the frequency of the diffracted light wave 4d is $f_0+f$, and the frequency of the diffracted light wave 4e is $f_0-f$. The frequency of the $0^{th}$-order diffracted light wave 4a' remains $f_0$.

The diffraction angle $\theta$ of the $+1^{st}$-order diffracted light wave 4d and the $-1^{st}$-order diffracted light wave 4e is represented by Expression (1). The intensity $I_0'$ of the $0^{th}$-order diffracted light wave 4a', and the intensity $I_1'$ of the $+1^{st}$-order diffracted light wave 4d and the −1$^{st}$-order diffracted light wave 4e are represented by Expressions (4) and (5) below.

[Expression 4]

$$I'_0 = I_{in} \cdot J_0^2\left(\frac{2\pi \Delta n Pl}{\lambda}\right) \quad (4)$$

[Expression 5]

$$I'_1 = I_{in} \cdot J_1^2\left(\frac{2\pi \Delta n Pl}{\lambda}\right) \quad (5)$$

The +1$^{st}$-order diffracted light wave 4b and the −1$^{st}$-order diffracted light wave 4c, which have been reflected by the reflecting section 6, also enter the propagation medium portion 2. It is believed that diffracted light waves are produced by the interaction between these diffracted light waves and the acoustic wave 1, as with the 0$^{th}$-order diffracted light wave 4a. However, for the acoustic wave 1 of a sound pressure within the measurable range, the ±1$^{st}$-order diffracted light waves produced by the diffraction of the +1$^{st}$-order diffracted light wave 4b and the −1$^{st}$-order diffracted light wave 4c have very small intensities and can be ignored. Therefore, the +1$^{st}$-order diffracted light wave 4b and the −1$^{st}$-order diffracted light wave 4c propagate through the propagation medium portion 2 with no change to their angles. In this process, the frequency of the +1$^{st}$-order diffracted light wave 4b is $f_0+f$, and the frequency of the −1$^{st}$-order diffracted light wave 4c remains $f_0-f$.

FIG. 6 shows the positional relationship between the diffracted light waves. As described above, the +1$^{st}$-order diffracted light wave 4b on the outward path and the −1$^{st}$-order diffracted light wave 4e on the return path overlap and interfere with each other, and the −1$^{st}$-order diffracted light wave 4c on the outward path and the +1$^{st}$-order diffracted light wave 4d on the return path overlap and interfere with each other. More specifically, the +1$^{st}$-order diffracted light wave 4b or the +1$^{st}$-order diffracted light wave 4d having a frequency of $f_0+f$ and the −1$^{st}$-order diffracted light wave 4c or the −1$^{st}$-order diffracted light wave 4e having a frequency of $f_0-f$ interfere with each other, thereby producing interference light whose intensity changes with a frequency of 2f.

With the optical microphone 101 of the present embodiment, the diffraction angle θ of the +1$^{st}$-order diffracted light wave 4b on the outward path and that of the −1$^{st}$-order diffracted light wave 4e on return path are both represented by Expression (1). Similarly, the diffraction angle θ of the −1$^{st}$-order diffracted light wave 4c on the outward path and that of the +1$^{st}$-order diffracted light wave 4d on the return path are also both represented by Expression (1). This means that even if the frequency f of the acoustic wave 1 changes, the diffraction angle θ of the +1$^{st}$-order diffracted light wave 4b on the outward path and the diffraction angle θ of the −1$^{st}$-order diffracted light wave 4e on the return path change similarly in accordance with Expression (1), and the area over which the two diffracted light waves overlap and interfere with each other does not change. Similarly, the diffraction angle θ of the −1$^{st}$-order diffracted light wave 4c on the outward path and the diffraction angle θ of the +1$^{st}$-order diffracted light wave 4d on the return path also change similarly in accordance with the change in the frequency f of the acoustic wave 1. Thus, the area over which the two diffracted light waves overlap with each other is substantially constant, irrespective of the change in the frequency f of the acoustic wave 1, and the intensity of the interference light produced is substantially constant, irrespective of the change in the frequency f of the acoustic wave 1. Therefore, the optical microphone 101 is realized, having a generally constant detection sensitivity even if the frequency f of the acoustic wave 1 changes.

Figure 13:
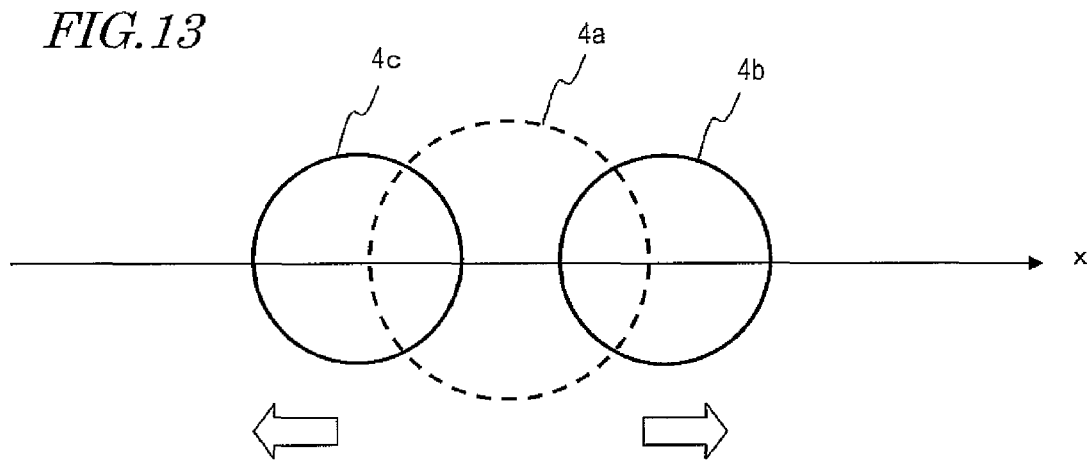
FIG. 13 is a diagram showing the positional relationship where the $0^{th}$-order diffracted light wave and the $1^{st}$-order diffracted light waves interfere with each other.

The optical microphone of Patent Document No. 1 utilizes the interference between the 0$^{th}$-order diffracted light wave 4a and the +1$^{st}$-order diffracted light wave 4b or the −1$^{st}$-order diffracted light wave as shown in FIG. 13. Since the change in the frequency of the acoustic wave only changes the diffraction angle of the +1$^{st}$-order diffracted light wave 4b or the −1$^{st}$-order diffracted light wave but does not change the position of the 0$^{th}$-order diffracted light wave 4a, the area over which the two diffracted light waves overlap with each other changes, and thus the detection sensitivity also changes, depending on the frequency of the acoustic wave. Such a problem is solved with the optical microphone 101 of the present embodiment.

As can be seen from Expression (3) and Expression (5), the intensities of the +1$^{st}$-order diffracted light waves 4b and 4d and the −1$^{st}$-order diffracted light waves 4c and 4e change depending on the sound pressure P of the acoustic wave 1. Thus, since the amount of light of the interference portion received by the photoelectric conversion section 5 changes depending on the sound pressure P of the acoustic wave 1, it is possible to obtain an output signal associated with the change in the sound pressure P of the acoustic wave 1.

Figure 14:
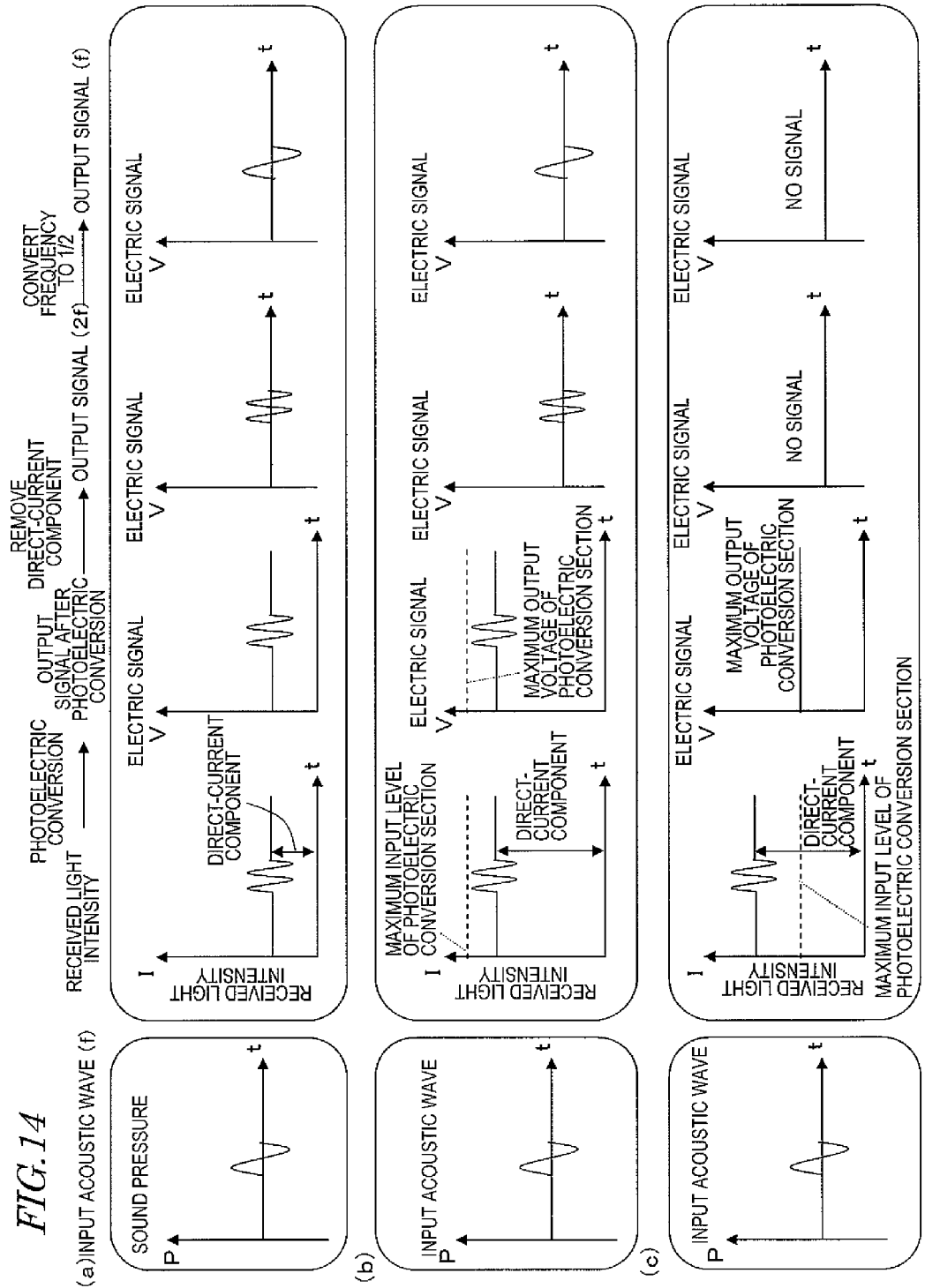
FIGS. 14A to 14C are diagrams each showing an incident acoustic wave, a light wave detected by a photoelectric detection section, an electric signal output from the photoelectric detection section, and the waveform of an electric signal output from a frequency conversion section, in the optical microphone shown in FIG. 1A, in a case where the light waves contain direct-current components of different magnitudes.

FIGS. 14A to 14C schematically show the relationship between the sound pressure of the input acoustic wave 1, the intensity of the light wave 4 entering, the photoelectric conversion section 5, and the electric signal detected by the photoelectric conversion section 5, with the optical microphone 101.

As shown in FIG. 14A, when the acoustic wave 1 of the frequency f is input to the propagation medium portion, the +1$^{st}$-order diffracted light wave 4b on the outward path and the −1$^{st}$-order diffracted light wave 4e on the return path (or the −1$^{st}$-order diffracted light wave 4c on the outward path and the +1$^{st}$-order diffracted light wave 4d on the return path) interfere with each other, thereby obtaining a light wave which is an interference component whose intensity changes with a frequency of 2f. The interference component contains a direct-current component having a certain intensity that is not associated with the change in the intensity of the acoustic wave 1 because the diffracted light waves on the outward path and on the return path have different intensities or because two diffracted light waves contain components that do not interfere with each other.

By removing the direct-current component from the interference component with a high-pass filter, or the like, after photoelectric conversion through the photoelectric conversion section 5, an electric signal is obtained having a frequency of 2f, which is the differential frequency component. This is twice the frequency f of the acoustic wave 1 which is intended to be detected. In order to detect the acoustic wave 1 with the original frequency f, the frequency of the signal output from the photoelectric conversion section 5 is converted to ½ through the frequency conversion section 21, before the signal is output. Thus, the acoustic wave 1 is converted to an electric signal.

FIG. 14B shows an example where the interference component of the light wave is contaminated with a large amount of a direct-current component because of insufficient separation of the 0$^{th}$-order diffracted light wave 4a'. Even in this case, as long as the maximum intensity of the light wave to be detected does not exceed the maximum input level of the photoelectric conversion section 5, it is possible to obtain an electric signal having the same frequency as the acoustic wave 1 by removing the direct-current component with a high-pass filter, or the like, after it is converted to an electric signal. Note however that since the proportion of the component of the acoustic wave 1, of the optical signal detected by the photoelectric conversion section 5, will be relatively small with respect to the entire optical signal detected, the measurement precision decreases as compared with the case of FIG. 14A.

As shown in FIG. 14C, when the maximum intensity of the interference component of the light wave exceeds the maximum input level of the photoelectric conversion section 5, the output of the photoelectric conversion section 5 is saturated, failing to detect the acoustic wave 1. In this case, it is possible to detect the acoustic wave 1, by arranging an optical system for attenuating the amount of light of the light wave containing the interference component, e.g., arranging an attenuator on the light-receiving surface of the photoelectric conversion section 5. Note however that in this case, the component of the acoustic wave 1 also attenuates, thereby decreasing the measurement precision as compared with the case of FIG. 14B. Therefore, for the detection of the acoustic wave 1 with a high sensitivity, it is possible to detect the acoustic wave 1 with a high sensitivity as shown in FIG. 14A by decreasing the direct-current component of the light wave containing the interference component due to the diffracted light waves obtained on the outward path and the return path, and inputting, to the photoelectric conversion section 5, the light wave having a sufficient intensity that does not exceed the maximum input level of the photoelectric conversion section 5.

Thus, with the optical microphone of the present embodiment, an acoustic wave is propagated through propagation medium portion through which a light wave is passing, and the light wave having passed therethrough is retroreflected to be passed through the propagation medium portion again. Thus, the $+1^{st}$-order diffracted light wave or the $-1^{st}$-order diffracted light wave produced through interaction with the acoustic wave on the outward path of the light wave and the $1^{st}$-order diffracted light wave or the $+1^{st}$-order diffracted light wave produced through interaction with the acoustic wave on the return path interfere with each other, and it is possible to detect the interference component of the light wave having a frequency twice that of the acoustic wave. By retroreflecting the transmitted light wave, the $+1^{st}$-order diffracted light wave (or the $-1^{st}$-order diffracted light wave) on the outward path and the $-1^{st}$-order diffracted light wave (or the $+1^{st}$-order diffracted light wave) on the return path can be output in the same direction, irrespective of the change in the frequency of the acoustic wave, the area over which the two diffracted light waves overlap with each other can be kept substantially constant, and an optical microphone is realized which is capable of obtaining a constant sensitivity irrespective of the frequency of the acoustic wave 1 to be detected. Since the light wave obtained through interference of the $+1^{st}$-order diffracted light wave and the $-1^{st}$-order diffracted light wave is detected, it is possible to realize an optical microphone that is small and has a simple configuration without using a special measuring tool such as a laser Doppler vibrometer or an optical interferometer.

Second Embodiment

A second embodiment of an optical microphone according to the present invention will now be described with reference to the drawings. With the optical microphone of Patent Document No. 1 and the method of Patent Document No. 2, it is possible to detect an acoustic wave, but it is not possible to identify the propagation direction of the acoustic wave or to separately detect the acoustic wave based on frequency. In contrast, the optical microphone of the present embodiment is capable of at least one of the identification of the propagation direction of the acoustic wave and the isolation of the acoustic wave based on frequency.

With the optical microphone of the present embodiment, at least one of the first interference light wave and the second interference light wave is detected by using a photoelectric conversion element array including a plurality of photoelectric conversion elements. Therefore, it is possible to detect the azimuthal directions of these interference light waves with respect to the detection position of the $0^{th}$-order diffracted light wave on the photoelectric conversion element array, and it is possible to identify the propagation direction of the acoustic wave. It is possible to isolate the acoustic wave in accordance with the frequency by independently detecting at least one of the first interference light wave and the second interference light wave with two or more photoelectric conversion elements arranged at different distances from the detection position of the $0^{th}$-order diffracted light wave.

Since it is possible to form an optical microphone without using a complicated optical system such as a laser Doppler vibrometer or an interferometer, it is possible to realize an optical microphone that is small and has a simple configuration.

It is also possible to realize a flaw detection device capable of detecting the position of a flaw in a subject.

Figure 15:
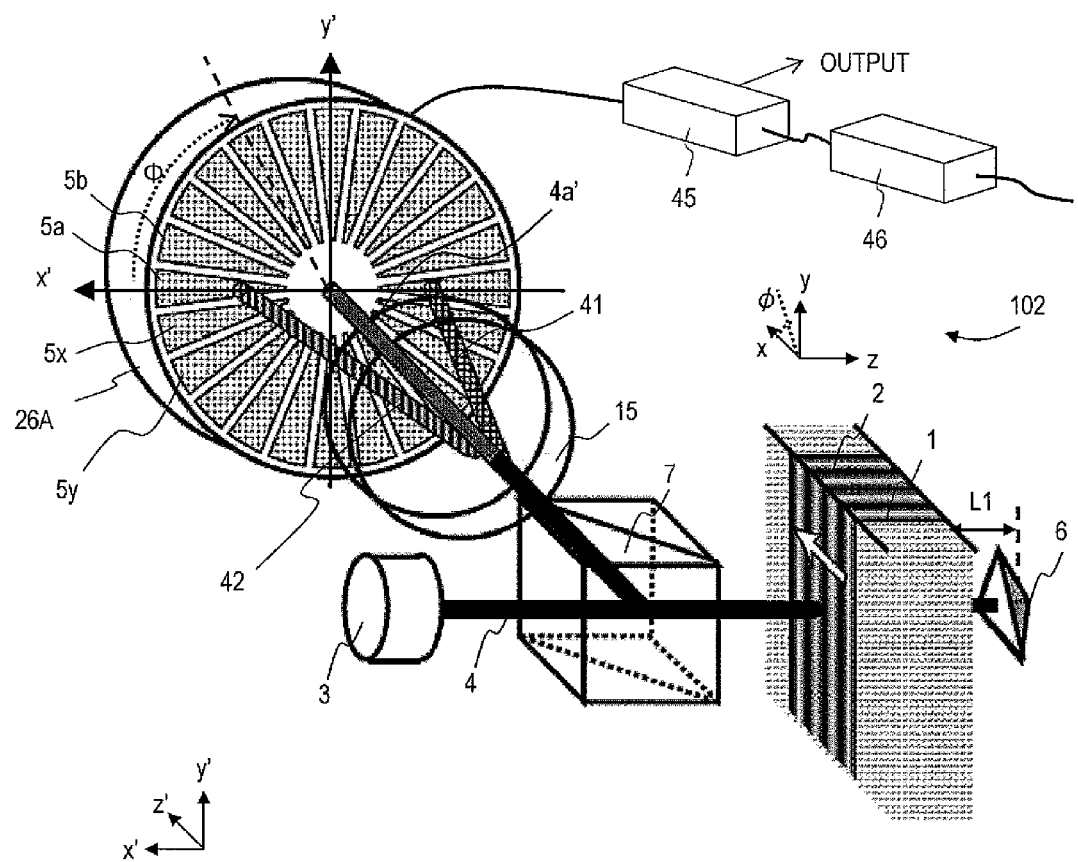
FIG. 15 is a diagram showing a configuration of a second embodiment of an optical microphone according to the present invention.

FIG. 15 shows a configuration of a main part of an optical microphone 102 of the second embodiment. The optical microphone 102 identifies the propagation direction of the acoustic wave 1 using the light wave 4. The acoustic wave 1 may be detected as an electric signal. The acoustic wave 1 propagates through an environment fluid such as the air or a solid existing in the outside space around the optical microphone 102.

The optical microphone 102 includes the propagation medium portion 2, the light source 3, a photoelectric conversion element array 26A, and the reflecting section 6. The acoustic wave 1 enters the propagation medium portion 2. The light wave 4 output from the light source 3 enters the propagation medium portion 2, and interacts with the acoustic wave 1 while passing through the propagation medium portion 2, before reaching the reflecting section 6. The light wave is reflected by the reflecting section 6 to enter the propagation medium portion 2 again. The light wave 4 having entered the propagation medium portion 2, interacts with the acoustic wave 1 again while passing through the propagation medium portion 2, and travels toward the light source 3. As in the first embodiment, the optical path along which the light wave 4 travels from the light source 3 toward the reflecting section 6 will be referred to as the outward path, and the optical path along which the light wave 4 travels from the reflecting section 6 toward the light source 3 will be referred to as the return path.

The optical microphone 102 may include the beam splitter 7 between the light source 3 and the propagation medium portion 2 in order to detect the light wave 4, which has passed through the propagation medium portion 2 twice, with the photoelectric conversion element array 26A. In such a case, the light wave 4 enters the propagation medium portion 2 from the light source 3 via the beam splitter 7, and is reflected by the reflecting section 6, before it passes through the propagation medium portion 2 again to reach the beam splitter 7. The light wave 4 having reached the beam splitter 7 is reflected by the beam splitter 7 to enter the photoelectric conversion element array 26A. Using the beam splitter 7, the optical path along which the light wave 4 output from the light source 3 reaches the propagation medium portion 2 and the optical path along which the light wave 4 having reached the beam splitter 7 reaches the photoelectric conversion element array 26A can be adjusted to be in different directions. Therefore, the photoelectric conversion element array 26A can be arranged in a different direction from the light source 3, thereby making the detection of the light wave 4 easier.

As will be described below in detail, the acoustic wave 1 propagating through the propagation medium portion 2 produces a density distribution across the propagation medium portion 2 that proceeds in the direction (the solid-white arrow) in which the acoustic wave 1 propagates. The density distribution serves as a diffraction grating for the light wave 4 passing through the propagation medium portion 2, producing $\pm 1^{st}$-order diffracted light waves on the outward path and on the return path of the light wave 4. The $\pm 1^{st}$-order diffracted light waves are produced on a plane that contains the propagation direction of the light wave 4 and the propagation direction of the acoustic wave 1. There is also produced a $0^{th}$-order diffracted light wave that is not diffracted through the propagation medium portion 2. By the reflecting section 6, the $0^{th}$-order diffracted light wave enters the propagation medium portion 2 again, thereby producing $\pm 1^{st}$-order diffracted light waves again. The $\pm 1^{st}$-order diffracted light waves produced on the outward path and on the return path of the light wave 4 interfere with each other, producing a first interference light wave 41 and a second interference light wave 42. Thus, it is possible to identify the propagation direction of the acoustic wave by detecting, using the photoelectric conversion element array 26A, the azimuthal directions in which the first interference light wave 41 and the second interference light wave 42 are produced around the $0^{th}$-order diffracted light wave 4a.

Now, the optical microphone 102 will be described component-by-component. The coordinate system is defined as shown in FIG. 15, for the sake of simplicity. Specifically, the direction in which the acoustic wave 1 propagates is defined as the x axis, and the direction in which the light wave 4 propagates is defined as the z axis. The plane on the light-receiving section of the photoelectric conversion element array 26A is defined as the x' axis and the y' axis.

(Acoustic Wave 1)

The acoustic wave 1 that can be detected by the optical microphone 102 of the present embodiment is an audible wave or an ultrasonic wave of about 20 Hz or more and about 20 MHz or less. The acoustic wave 1 may be a continuous wave whose frequency changes over time, such as sound or music, or a continuous wave which is a sinusoidal wave of a single frequency. It may also be an acoustic wave that is not continuous over time, such as a single-pulse burst signal.

(Propagation Medium Portion 2)

The acoustic wave 1 in the present embodiment enters the propagation medium portion 2 from an environment medium outside the optical microphone 102, and propagates through the propagation medium portion 2. FIG. 15 shows how the acoustic wave 1 propagates in the x-axis positive direction. As the acoustic wave 1 propagates, the density of the substance forming the propagation medium portion 2 changes, thereby causing a change to the refractive index. Since the acoustic wave 1 is a longitudinal wave, the refractive index distribution occurs in the propagation direction (the x axis) of the acoustic wave 1. Substantially no distribution occurs across a plane perpendicular to the propagation direction of the acoustic wave 1. The refractive index distribution of the propagation medium portion produced by the acoustic wave 1 serves as a diffraction grating.

The propagation medium portion 2 is formed by a solid propagation medium, and may have a sonic velocity smaller than that of the air. Moreover, it may be transparent to the light wave 4 output from the light source 3. Specifically, the sonic velocity of the propagation medium portion 2 may be smaller than 340 m/sec, which is the sonic velocity of the air. By using a solid material as the propagation medium, there is produced a large density distribution, i.e., refractive index distribution, of the propagation medium portion 2, and it is possible to obtain a significant diffracting effect. Since a material of a small sonic velocity typically also has a relatively small density, the reflection at the interface between the environment fluid such as the air and the propagation medium portion 2 will be small, and it is possible to take in the acoustic wave into the propagation medium portion 2 with a relatively high efficiency.

Particularly, a dry silica gel may be used as the propagation medium of the propagation medium portion 2. A dry silica gel has a property that it has a small acoustic impedance difference from the air, and the acoustic wave 1 propagating through the air can be efficiently taken in into the inside of the propagation medium portion 2 formed by a dry silica gel. Specifically, the sonic velocity of a dry silica gel is 50 m/sec or more and 150 m/sec or less, smaller than 340 m/sec, the sonic velocity of the air, and the density is also small at about 70 kg/m$^3$ or more and about 280 kg/m$^3$ or less. Therefore, the difference is small from the acoustic impedance of the air, and the reflection at the interface is small, whereby it is possible to efficiently take in the acoustic wave in the air into the inside. For example, when a dry silica gel having a sonic velocity of 50 m/sec and a density of 101 kg/m$^3$ is used, the reflection at the interface with the air will be 70%, and about 30% of the energy of the acoustic wave is taken in into the inside without being reflected at the interface. The dry silica gel also has a property that the amount of change on in refractive index for light wave is large. The amount of change $\Delta n$ in refractive index of the air is $2.0 \times 10^{-9}$ for a sound pressure change of 1 Pa, the amount of change $\Delta n$ in refractive index of the dry silica gel for a sound pressure change of 1 Pa is large at about $1.0 \times 10^{-7}$. Therefore, it is possible to obtain a sufficient sensitivity without preparing a large propagation medium that is over 10 cm.

(Light Source 3)

The light source 3 outputs the light wave 4, and the output light wave 4 passes through the propagation medium portion 2. There is no particular limitation on the wavelength and the intensity of the light wave 4, and a wavelength and an intensity are selected such that the photoelectric conversion element array 26A can detect the light wave 4 with a desirable sensitivity. Note however that one may select a wavelength such that it is not so much absorbed by the propagation medium portion 2. Coherent light or incoherent light may be used as the light wave 4. However, if coherent light such as a laser beam is used, diffracted light waves are more likely to interfere, and it is easier to extract a signal. The diameter of the light wave 4 is 0.01 mm or more and 20 mm or less, for example.

(Outward Path of Light Wave 4)

Figure 16A:
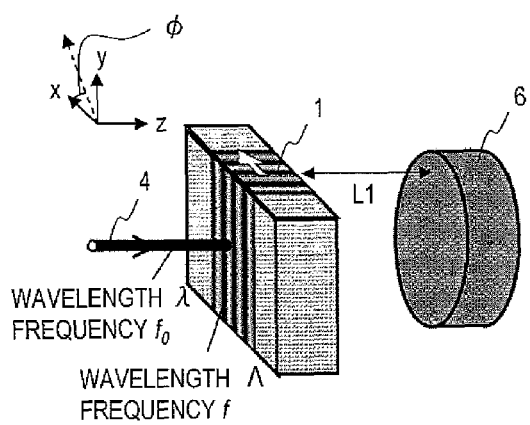
FIGS. 16A to 16D are diagrams showing how diffracted light waves are produced when a light wave passes through a propagation medium portion in the optical microphone shown in FIG. 15.

The light wave 4 output from the light source 3 enters the propagation medium portion 2, and interacts with the acoustic wave 1 in the propagation medium portion 2 on the outward path, as shown in FIG. 16A. Specifically, as the acoustic wave 1 propagates, a propagation medium density distribution is produced across the propagation medium portion 2, thereby producing a refractive index distribution across the propagation medium. The refractive index distribution across the propagation medium serves as a diffraction grating for the light wave 4, diffracting the light wave 4.

Figure 17:
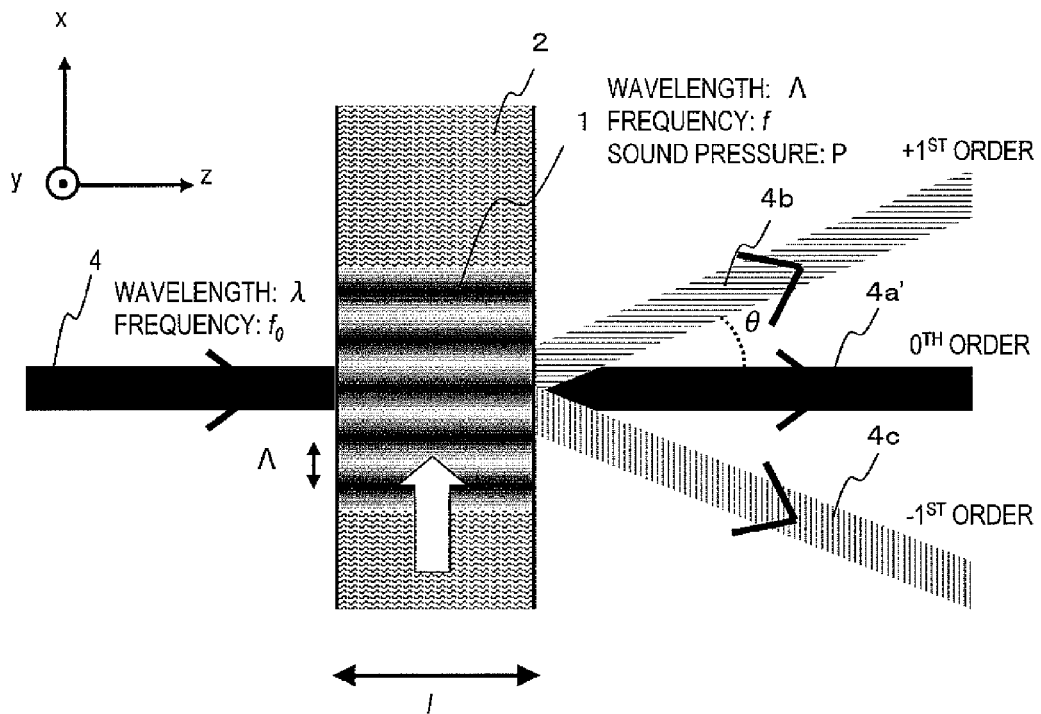
FIG. 17 is a diagram illustrating the generation of diffracted light waves on the outward path of the optical microphone shown in FIG. 15.

FIG. 17 schematically shows how the light wave 4 interacts with the acoustic wave 1 in the propagation medium portion 2 on the outward path. In FIG. 17, the acoustic wave 1 propagates in the direction indicated by an arrow. Black portions representing the acoustic wave 1 indicate those portions where the propagation medium is densified as the propagation medium is displaced by the acoustic wave 1, and white portions indicate those portions where the propagation medium is sparse. In FIG. 17, $\Lambda$ represents the wavelength of the acoustic wave 1 propagating through the propagation medium portion 2, f the frequency of the acoustic wave 1, $\lambda$ the wavelength of the light wave 4, and $f_0$ the frequency of the light wave 4. The light wave 4 propagates in the z axis direction and the acoustic wave 1 propagates in the x-axis direction, and the direction in which the acoustic wave 1 propagates is defined as the x-axis positive direction. The distance over which the light wave 4 propagates through the propagation medium portion 2 is denoted as 1.

As the acoustic wave 1 propagates through the inside of the propagation medium portion 2, the density of the propagation medium portion 2 changes. As a result, the optical refractive index through the propagation medium portion 2 changes. For example, as the acoustic wave 1, which is a planar wave having a wavelength of $\lambda$, propagates, there is formed a pattern of refractive index changes with a period of $\Lambda$. That is, the propagation medium portion 2 becomes a diffraction grating having a pattern of refractive index changes with a period of $\Lambda$.

When the light wave 4 enters the propagation medium portion 2 in such a state, diffracted light waves are produced. For the acoustic wave 1 having a sound pressure within the measurable range, diffracted light components of the second or higher order are small and can therefore be ignored.

Figure 16B:
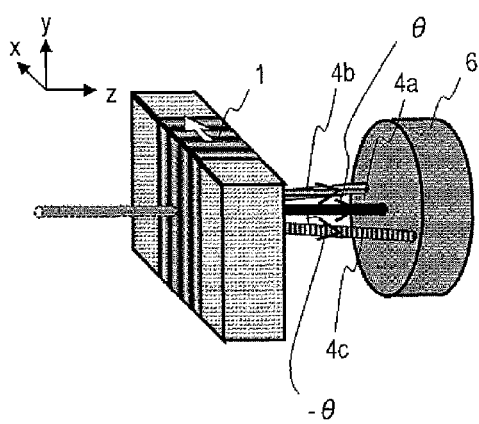

As shown in FIGS. 16B and 17 FIG. 11, when the light wave 4 enters the propagation medium portion 2, three diffracted light waves are output, including: the $0^{th}$-order diffracted light wave 4a which propagates in the z axis direction as it is without being diffracted; the +$1^{st}$-order diffracted light wave 4b which is diffracted in the x-axis positive direction, which is the propagation direction of the acoustic wave 1, with respect to the $0^{th}$-order diffracted light wave 4a; and the −$1^{st}$-order diffracted light wave 4c which is diffracted in the x-axis negative direction, which is the opposite direction to the propagation, of the acoustic wave 1, with respect to the $0^{th}$-order diffracted light wave 4a.

The frequencies of the +$1^{st}$-order diffracted light wave 4b and the −$1^{st}$-order diffracted light wave 4c are subject to Doppler shift by the acoustic wave 1. Having undergone the Doppler shift, the frequency of the +$1^{st}$-order diffracted light wave 4b is $f_0+f$, and the frequency of the −$1^{st}$-order diffracted light wave 4c is $f_0-f$. The frequency of the $0^{th}$-order diffracted light wave 4a remains $t_o$.

The diffraction angle θ of the +$1^{st}$-order diffracted light wave 4b and the −$1^{st}$-order diffracted light wave 4c, the intensity $I_0$ of the $0^{th}$-order diffracted light wave 4a, and the intensity $I_1$ of the +$1^{st}$-order diffracted light wave 4b and the −$1^{st}$-order diffracted light wave 4c are expressed as shown in Expressions (1), (2) and (3) below.

[Expression 1]

$$\sin\theta = \frac{\lambda}{\Lambda} = \frac{\lambda \cdot f}{V_n} \quad (1)$$

[Expression 2]

$$I_0 = I_{in} \cdot J_0^2\left(\frac{2\pi\Delta nPl}{\lambda}\right) \quad (2)$$

[Expression 3]

$$I_1 = I_{in} \cdot J_1^2\left(\frac{2\pi\Delta nPl}{\lambda}\right) \quad (3)$$

Here, $\lambda$ denotes the wavelength of the light wave 4, $\Lambda$ the wavelength of the acoustic wave 1, f the frequency of the acoustic wave 1, $C_s$ the propagation speed of the acoustic wave 1 through the propagation medium portion 2, $I_{in}$ the intensity of the light wave 4, $\Delta n$ the amount of change in refractive index of the propagation medium portion 2 caused by the propagation of the acoustic wave 1 of 1 Pa, P the sound pressure of the acoustic wave 1, l the distance over which the light wave 4 propagates through the propagation medium portion 2, $J_0$ the $0^{th}$ order Bessel function, and $J_1$ the $1^{st}$-order Bessel function. It can be seen from Expression (1) that the diffraction angle θ increases as the frequency f of the acoustic wave 1 increases. It can also be seen from Expression (3) that the light intensity of the ±$1^{st}$-order diffracted light waves 4b and 4c changes in accordance with the sound pressure of the acoustic wave 1.

The directions in which the +$1^{st}$-order diffracted light wave 4b and the −$1^{st}$-order diffracted light wave 4c are produced are determined by the propagation direction of the acoustic wave 1 through the propagation medium portion 2. If the propagation direction of the acoustic wave 1 is the x-axis direction, the diffracted light waves 4b and 4c are produced in the x-axis direction as described above. For example, as shown in FIG. 16A, when the acoustic wave 1 propagates in a direction that is off the x axis by an angle of ϕ in the x-y plane, which is perpendicular to the propagation direction z of the light wave 4, the diffracted light waves 4b and 4c are also produced in directions that are off the x axis by an angle of ϕ.

(Reflecting Section 6)

The light wave 4, including the $0^{th}$-order diffracted light wave 4a, the +$1^{st}$-order diffracted light wave 4b and the −$1^{st}$-order diffracted light wave 4c, having passed through the propagation medium portion 2 reaches the reflecting section 6. The reflecting section 6 retroreflects the light wave 4. As also described above in the first embodiment, retroreflection refers to reflection of incident light in the same direction as the direction of incidence. That is, the direction of incidence of the light wave entering the reflecting section 6 is parallel to the exiting direction of the exiting light wave 4 after being reflected by the reflecting section 6. Using the reflecting section 6 capable of retroreflection, it is possible to reflect the light wave 4 so that the light wave 4 passes through the propagation medium portion 2 twice. Moreover, with retroreflection, the +$1^{st}$-order diffracted light wave (or the −$1^{st}$-order diffracted light wave) which has been produced when passing through the propagation medium portion 2 for the first time (on the outward path) can be reflected in the same direction as the direction of incidence. Therefore, the diffraction direction of the +$1^{st}$-order diffracted light wave (or the −$1^{st}$-order diffracted light wave) produced on the outward path and the diffraction direction of the −$1^{st}$-order diffracted light wave (or the +$1^{st}$-order diffracted light wave) produced when passing through the propagation medium portion 2 for the second time can be made to coincide with each other, and it is possible to obtain an interference light wave of generally a constant intensity from the two diffracted light waves, irrespective of changes of the frequency of the acoustic wave.

The optical axis of the $0^{th}$-order diffracted light wave 4a coming off the reflecting section 6 may coincide with the optical axis of the $0^{th}$-order diffracted light wave 4a passing through the propagation medium portion 2 and entering the reflecting section 6. That is, the reflecting section 6 may be retroreflective in a point-symmetric manner with respect to the point at which the $0^{th}$-order diffracted light wave 4a is incident upon the reflecting section 6. This makes it possible that the light wave 4 on the outward path and the $0^{th}$-order diffracted light wave 4a on the return path receive interactions at the same position from the acoustic wave 1 in the propagation medium portion 2. Therefore, it is possible to suppress the time gap between contacts with the acoustic wave 1 on the outward path and on the return path, and the light wave 4 and the acoustic wave 1 can be made to contact (interact) with each other twice at substantially the same time.

Figure 16C:
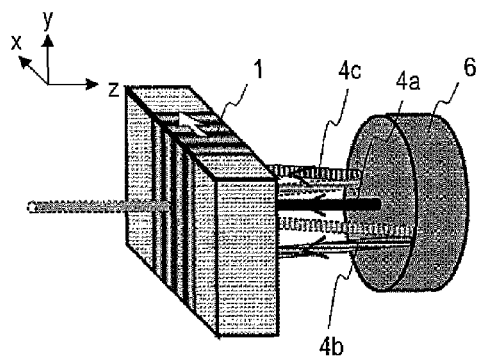

As shown in FIGS. 16B and 16C, due to the retroreflective function of the reflecting section 6, the positions of the $+1^{st}$-order diffracted light wave 4b and the $-1^{st}$-order diffracted light wave 4c coming off the reflecting section 6 are reverse from each other with respect to the $0^{th}$-order diffracted light wave 4a coming off the reflecting section 6. Specifically, the $+1^{st}$-order diffracted light wave 4b entering the reflecting section 6 is located on the positive side along the x axis with respect to the light wave 4 entering the reflecting section 6, whereas the $+1^{st}$-order diffracted light wave 4b coming off the reflecting section 6 is located on the negative side along the x axis with respect to the $0^{th}$-order diffracted light wave 4a coming off the reflecting section 6. Similarly, the $-1^{st}$-order diffracted light wave 4c entering the reflecting section 6 is located on the negative side along the x axis with respect to the light wave 4 entering the reflecting section 6, whereas the $-1^{st}$-order diffracted light wave 4c coming off the reflecting section 6 is located on the positive side along the x axis with respect to the $0^{th}$-order diffracted light wave 4a coming off the reflecting section 6.

When the $0^{th}$-order diffracted light wave 4a is incident upon the origin along the x axis, the $+1^{st}$-order diffracted light wave 4b entering the reflecting section 6 propagates through the x-axis positive area, and the $+1^{st}$-order diffracted light wave 4b coming off the reflecting section 6 propagates through the x-axis negative area. The $-1^{st}$-order diffracted light wave 4c entering the reflecting section 6 propagates through the x-axis negative area, and the $-1^{st}$-order diffracted light wave 4c coming off the reflecting section 6 propagates through the x-axis positive area.

Figure 18:
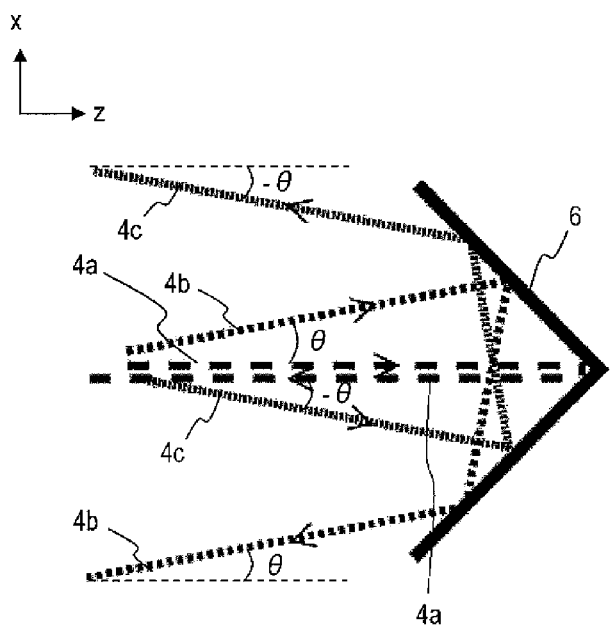
FIG. 18 is a diagram showing the reflection at the reflecting section of the optical microphone shown in FIG. 15.

The reflecting section 6 may be a corner cube mirror. The corner cube mirror includes three plane mirrors assembled together at right angles, where an incident light wave is reflected by the plane mirrors three times, outputting in a light wave in a direction parallel to the direction of incidence. FIG. 18 shows how the light wave 4 is reflected by the reflecting section 6 formed by a corner cube mirror along the x-z cross section. In FIG. 18, the corner cube mirror forming the reflecting section 6 is shown to have two orthogonal reflective surfaces at the x-z cross section.

The $0^{th}$-order diffracted light wave 4a, the $+1^{st}$-order diffracted light wave 4b and the $-1^{st}$-order diffracted light wave 4c incident upon the corner cube mirror (the reflecting section 6) are each reflected in an exiting direction parallel to the direction of incidence. That is, as shown in FIG. 18, the $+1^{st}$-order diffracted light wave 4b entering the corner cube mirror has an angle of θ with respect to the $0^{th}$-order diffracted light wave (the z axis), and the $+1^{st}$-order diffracted light wave 4b exiting the corner cube mirror also has an angle of θ with respect to the z axis. The $-1^{st}$-order diffracted light wave 4c entering the corner cube mirror has an angle of −θ with respect to the z axis, and the $-1^{st}$-order diffracted light wave 4c exiting the corner cube mirror also has an angle of −θ with respect to the z axis.

The positional relationship between the $+1^{st}$-order diffracted light wave 4b and the $-1^{st}$-order diffracted light wave 4c with respect to the $0^{th}$-order diffracted light wave 4a is reversed in the x-axis direction; that is, the light wave 4 is reflected while being reversed in the x-axis direction. When the corner cube mirror is used as the reflecting section 6 as shown in FIG. 18, the $0^{th}$-order diffracted light wave 4a may be incident upon a vertex 6a of the three plane mirrors assembled together of the corner cube mirror at an angle of 45° with respect to the three ridges converging to the vertex 6a. Then, the optical axis of the $0^{th}$-order diffracted light wave 4a entering the corner cube mirror and the optical axis of the $0^{th}$-order diffracted light wave 4a exiting the corner cube mirror can be made to coincide with each other.

When the $0^{th}$-order diffracted light wave 4a is incident upon the origin along the x axis, the $+1^{st}$-order diffracted light wave 4b entering the corner cube mirror 8 propagates through the x-axis positive area, and the $+1^{st}$-order diffracted light wave 4b coming off the corner cube mirror 8 propagates through the x-axis negative area. The $-1^{st}$-order diffracted light wave 4c entering the corner cube mirror 8 propagates through the x-axis negative area, and the $-1^{st}$-order diffracted light wave 4c coming off the corner cube mirror 8 propagates through the x-axis positive area.

The corner cube mirror has two orthogonal reflective surfaces at any cross sections, such as the y-z cross section, as it does at the x-z cross section. Thus, the light wave 4 incident upon the corner cube mirror in any direction exits the corner cube mirror in a direction parallel to the direction of incidence. The positional relationship between the $+1^{st}$-order diffracted light wave 4b and the $-1^{st}$-order diffracted light wave 4c with respect to the $0^{th}$-order diffracted light wave 4a is reversed. Therefore, where the corner cube mirror is used as the reflecting section 6, not only when the acoustic wave 1 is propagating in the x direction but whichever direction it is propagating on the x-y plane, the $+1^{st}$-order diffracted light wave 4b and the $-1^{st}$-order diffracted light wave 4c can be reflected in such a relationship that they are reversed with respect to the $0^{th}$-order diffracted light wave 4a, on a plane containing the propagation direction of the light wave 4 entering the reflecting section 6 and the propagation direction of the acoustic wave 1.

(Return Path of Light Wave 4)

The light wave 4 having been reflected by the reflecting section 6 enters the propagation medium portion 2 again, and interacts with the acoustic wave 1 in the propagation medium portion 2, producing diffracted light waves. The light wave 4 coming off the reflecting section 6 contains the $0^{th}$-order diffracted light wave 4a, the $+1^{st}$-order diffracted light wave 4b and the $-1^{st}$-order diffracted light wave 4c, and these light waves each interact with the acoustic wave 1, producing diffracted light waves. However, the intensities of the $+1^{st}$-order diffracted light wave 4b and the $-1^{st}$-order diffracted light wave 4c are small as compared with the $0^{th}$-order diffracted light wave 4a, and the intensities of diffracted light waves of the $+1^{st}$-order diffracted light wave 4b and the $-1^{st}$-order diffracted light wave 4c are even smaller. Thus, the diffracted light waves of the $1^{st}$-order diffracted light wave 4b and the $-1^{st}$-order diffracted light wave 4c can be ignored, taking into account only the diffracted light waves of the $0^{th}$-order diffracted light wave 4a.

Figure 16D:
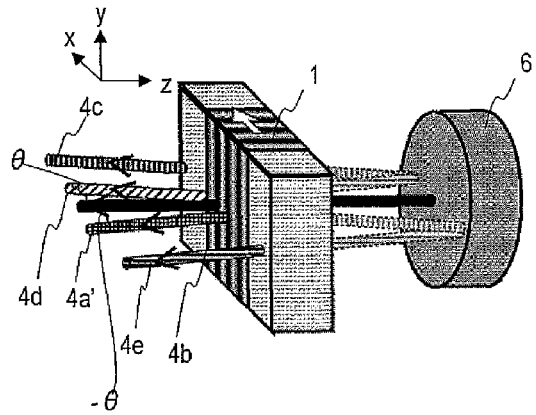

As shown in FIG. 16(d), the $0^{th}$-order diffracted light wave 4a having been reflected by the reflecting section 6 interacts with the acoustic wave 1 in the propagation medium portion 2, thereby producing a +$1^{st}$-order diffracted light wave 4d and a −$1^{st}$-order diffracted light wave 4e. The +$1^{st}$-order diffracted light wave 4d is diffracted in the x-axis positive direction, and the −$1^{st}$-order diffracted light wave 4e is diffracted in the x-axis negative direction. An undiffracted $0^{th}$-order diffracted light wave 4a" also exits the propagation medium portion 2.

Figure 19:
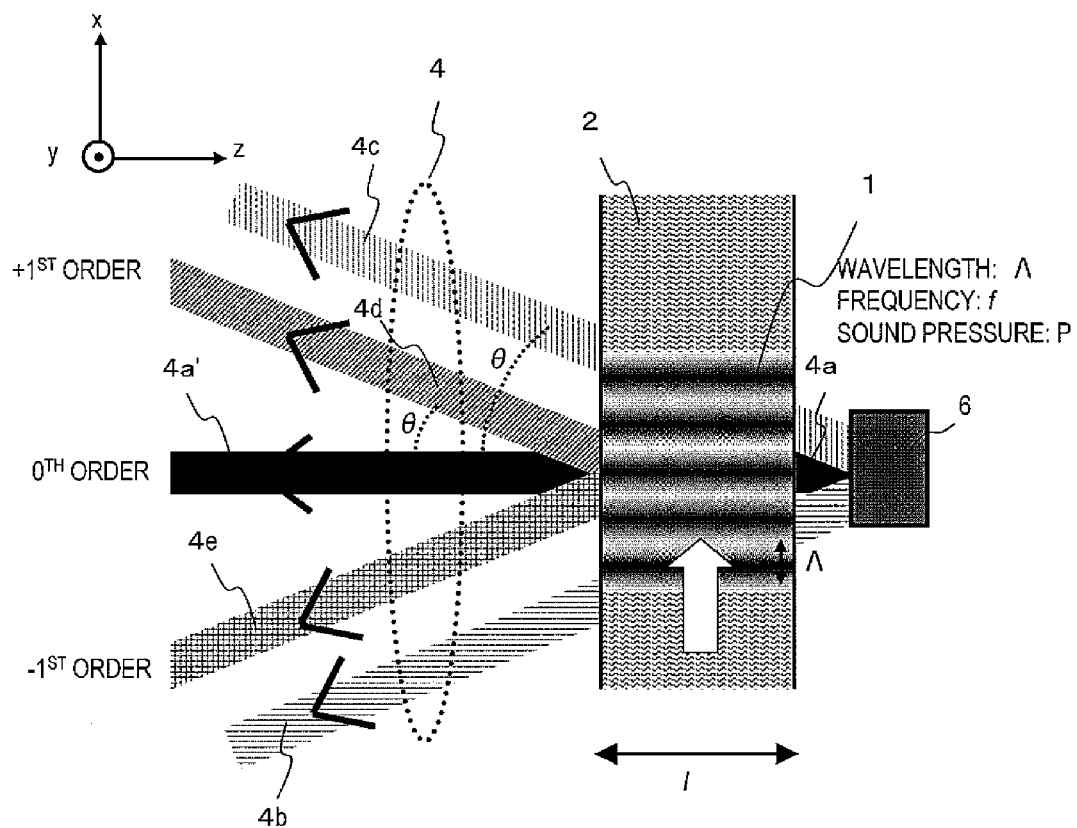
FIG. 19 is a diagram illustrating the generation of diffracted light waves on the return path of the optical microphone shown in FIG. 15.

As described above, the light wave 4 having passed through the propagation medium portion 2 is reflected by the reflecting section 6, and enters the propagation medium portion 2 again. In this process, the positional relationship between the +$1^{st}$-order diffracted light wave 4b and the −$1^{st}$-order diffracted light wave 4c is reversed with respect to the $0^{th}$-order diffracted light wave 4a. FIG. 19 schematically shows how the light wave 4 interacts with the acoustic wave 1 in the propagation medium portion 2 on the return path. As in FIG. 17, Λ denotes the wavelength of the acoustic wave 1 propagating through the propagation medium portion 2, f the frequency of the acoustic wave 1, λ the wavelength of the light wave 4, and $f_0$ the frequency of the light wave 4. The light wave 4 propagates in the opposite direction in the z axis direction.

As shown in FIG. 19, the $0^{th}$-order diffracted light wave 4a having been reflected by the reflecting section 6 interacts with the acoustic wave 1, thereby outputting, as in FIG. 17, the $0^{th}$-order diffracted light wave 4a' propagating as it is in the opposite direction along the z axis without being diffracted, the +$1^{st}$-order diffracted light wave 4d which has been diffracted in the x-axis positive direction, which is the propagation direction of the acoustic wave 1, with respect to the $0^{th}$-order diffracted light wave 4a', and the −$1^{st}$-order diffracted light wave 4e which has been diffracted in the x-axis negative direction, which is the opposite direction to the propagation of the acoustic wave 1, with respect to the $0^{th}$-order diffracted light wave 4a'. The frequencies of the +$1^{st}$-order diffracted light wave 4d and the −$1^{st}$-order diffracted light wave 4e are subject Doppler shift by the acoustic wave 1. Having undergone the Doppler shift, the frequency of the diffracted light wave 4d is $f_0$+f, and the frequency of the diffracted light wave 4e is $f_0$−f. The frequency of the $0^{th}$-order diffracted light wave 4a' remains $f_0$.

The diffraction angle of the +$1^{st}$-order diffracted light wave 4d and the −$1^{st}$-order diffracted light wave 4e is represented by Expression (1). Since the wavelength λ of the $0^{th}$-order diffracted light wave 4a, the wavelength Λ of the acoustic wave 1, the frequency f of the acoustic wave 1, and the propagation speed $C_s$ of the acoustic wave 1 through the propagation medium portion 2 do not change before and after the reflection by the reflecting section 6, the +$1^{st}$-order diffracted light wave 4d and the −$1^{st}$-order diffracted light wave 4e are diffracted by diffraction angles of θ and −θ of the same magnitude with respect to the $0^{th}$-order diffracted light wave 4a'. That is, the diffraction angle of the +$1^{st}$-order diffracted light wave 4b and the −$1^{st}$-order diffracted light wave 4c produced on the outward path, and the diffraction angle of the +$1^{st}$-order diffracted light wave 4d and the −$1^{st}$-order diffracted light wave 4e produced on the return path change in accordance with the frequency of the acoustic wave 1, and they coincide with each other irrespective of the frequency of the acoustic wave 1.

The intensity $I_0'$ of the $0^{th}$-order diffracted light wave 4a', and the intensity $I_1'$ of the +$1^{st}$-order diffracted light wave 4d and the −$1^{st}$-order diffracted light wave 4e are represented by Expressions (4) and (5) below.

[Expression 4]
$$I_0' = I_{in} \cdot J_0^2\left(\frac{2\pi \Delta n Pl}{\lambda}\right) \quad (4)$$

[Expression 5]
$$I_1' = I_{in} \cdot J_1^2\left(\frac{2\pi \Delta n Pl}{\lambda}\right) \quad (5)$$

The +$1^{st}$-order diffracted light wave 4b and the −$1^{st}$-order diffracted light wave 4c, which have been reflected by the reflecting section 6, also enter the propagation medium portion 2. It is believed that diffracted light waves are produced by the interaction between these diffracted light waves and the acoustic wave 1, as with the $0^{th}$-order diffracted light wave 4a. However, for the acoustic wave 1 of a sound pressure within the measurable range, the ±$1^{st}$-order diffracted light waves produced by the diffraction of the +$1^{st}$-order diffracted light wave 4b and the −$1^{st}$-order diffracted light wave 4c have very small intensities and can be ignored. Therefore, the +$1^{st}$-order diffracted light wave 4b and the −$1^{st}$-order diffracted light wave 4c propagate through the propagation medium portion 2 with no change to their angles. In this process, the frequency of the +$1^{st}$-order diffracted light wave 4b is $f_0$+f, and the frequency of the −$1^{st}$-order diffracted light wave 4c remains $f_0$−f.

(Light-Receiving Lens System 15)

Figure 20:
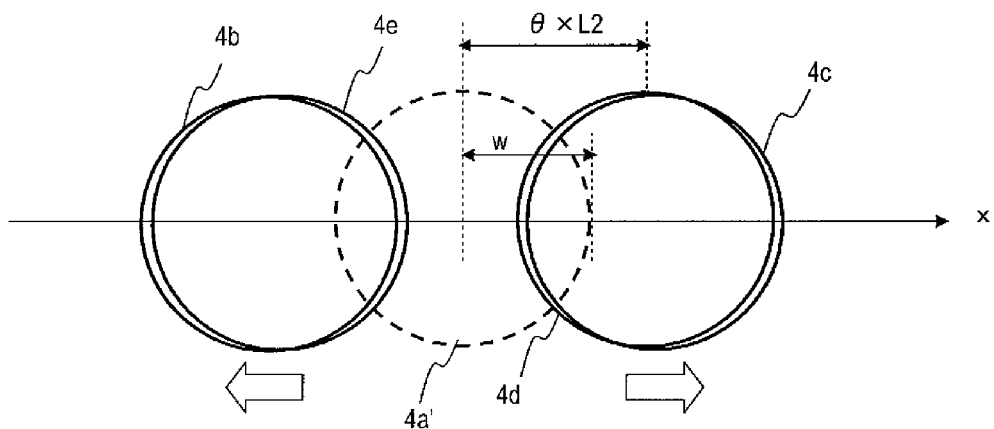
FIG. 20 is a diagram showing the positional relationship between diffracted light waves reflected by a beam splitter.

The light wave 4, which has passed through the propagation medium portion 2 again, propagates in a direction different from that of the light wave 4 on the outward path due to the beam splitter 7. FIG. 20 shows the positional relationship between the +$1^{st}$-order diffracted light waves 4b and 4d, the −$1^{st}$-order diffracted light waves 4c and 4e, and the $0^{th}$-order diffracted light wave 4a' contained in the light wave 4, as seen on a cross section perpendicular to the propagation direction of the light wave 4. Where L2 denotes the distance of the cross section from the propagation medium portion 2 and θ the diffraction angle, the positional shift distance of the +$1^{st}$-order diffracted light wave 4d and the −$1^{st}$-order diffracted light wave 4e on the return path from the $0^{th}$-order diffracted light wave 4a' can be expressed as sin θ×L2. The $0^{th}$-order diffracted light wave 4a' partially overlaps with the +$1^{st}$-order diffracted light waves 4b and 4d and the −$1^{st}$-order diffracted light waves 4c and 4e in the range of sin θ×L2<w, where w denotes the beam radius of the $0^{th}$-order diffracted light wave 4a'. As will be described below, the optical microphone 101 identifies at least one of the propagation direction of the acoustic wave 1 and the frequency of the acoustic wave 1 by detecting interference light waves produced in the area where the +$1^{st}$-order diffracted light wave 4b and the −$1^{st}$-order diffracted light wave 4e overlap with each other and the area where the +$1^{st}$-order diffracted light wave 4d and the −$1^{st}$-order diffracted light wave 4c overlap with each other. Therefore, in one embodiment, the +$1^{st}$-order diffracted light waves 4b and 4d and the −$1^{st}$-order diffracted light waves 4c and 4e do not overlap with the $0^{th}$-order diffracted light wave 4a', i.e., sin θ×L2>w, on the light-receiving surface of the photoelectric conversion element array 26A.

This can be achieved by setting the distance L2 sufficiently long. However, when L2 is long, the optical microphone 101 will be large in size. Where a small-sized optical microphone 101 is desired, the optical microphone 102 may include the light-receiving lens system 15 having a diverging function. With the provision of the light-receiving lens system 15, the +$1^{st}$-order diffracted light waves 4b and 4d and the −$1^{st}$-order diffracted light waves 4c and 4e can be separated from the $0^{th}$-order diffracted light wave 4a' without making L2 long.

(Photoelectric Conversion Element Array 26A)

Figure 21:
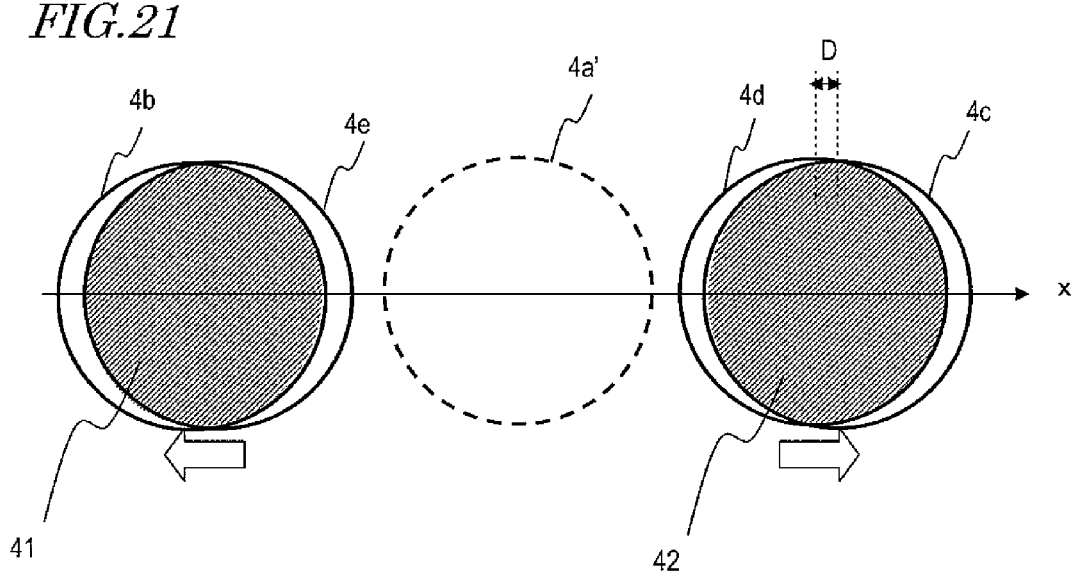
FIG. 21 is a diagram illustrating the positional relationship between diffracted light waves at the light-receiving surface of a photoelectric conversion element array.

FIG. 21 shows the positional relationship between the $+1^{st}$-order diffracted light waves 4b and 4d, the $-1^{st}$-order diffracted light waves 4c and 4e and the $0^{th}$-order diffracted light wave 4a' contained in the light wave 4, on the light-receiving surface of the photoelectric conversion element array 26A.

With respect to the $0^{th}$-order diffracted light wave 4a', the $-1^{st}$-order diffracted light wave 4c on the outward path and the $+1^{st}$-order diffracted light wave 4d on the return path are located in the x-axis positive direction overlapping each other, and the $+1^{st}$-order diffracted light wave 4b on the outward path and the $-1^{st}$-order diffracted light wave 4e on the return path are located in the x-axis negative direction overlapping each other. In overlapping areas (hatched), the light waves interfere with each other, thereby producing the first interference light wave 41 and the second interference light wave 42 whose light intensity changes in accordance with the signal of the acoustic wave 1. By receiving the first interference light wave 41 and the second interference light wave 42 with the photoelectric conversion element array 26A, there is obtained an electric signal in accordance with the change in light intensity, thus detecting the acoustic wave 1. The interference light wave has a frequency that is twice the acoustic wave 1 $((f_0+f)-(f_0-f))$.

As described above, the diffraction angle of the $+1^{st}$-order diffracted light wave 4b produced on the outward path and the $-1^{st}$-order diffracted light wave 4c produced on the return path, and the diffraction angle of the $+1^{st}$-order diffracted light wave 4d produced on the return path and the $-1^{st}$-order diffracted light wave 4e produced on the outward path change in accordance with the frequency of the acoustic wave 1, and they coincide with each other irrespective of the frequency of the acoustic wave 1. Therefore, the area over which the $+1^{st}$-order diffracted light wave 4b and the $-1^{st}$-order diffracted light wave 4c overlap with each other, and the area over which the $+1^{st}$-order diffracted light wave 4d and the $-1^{st}$-order diffracted light wave 4e overlap with each other do not change even when the frequency of the acoustic wave 1 changes, and therefore the intensities of the first interference light wave 41 and the second interference light wave 42 are substantially constant, irrespective of the frequency of the acoustic wave 1. Note however that since the diffraction angle θ changes in accordance with the frequency f of the acoustic wave 1 as shown in Expression (1), the positions of the first interference light wave 41 and the second interference light wave 42 also change.

Note that the distance D of position shift between the $+1^{st}$-order diffracted light wave 4b produced on the outward path and the $-1^{st}$-order diffracted light wave 4c produced on the return path (the distance between the optical axes of the diffracted light waves), and the distance D of position shift between the $+1^{st}$-order diffracted light wave 4d produced on the return path and the $-1^{st}$-order diffracted light wave 4e produced on the outward path can be approximately expressed as 2×sin θ×L1, using the diffraction angle θ and the distance L1 (FIG. 16A) between the propagation medium portion 2 and the reflecting section 6. The larger L1 is, the greater the distance D of position shift between the $+1^{st}$-order diffracted light wave 4b produced on the outward path and the $-1^{st}$-order diffracted light wave 4c produced on the return path (the distance between the optical axes of the diffracted light waves), and the distance D of position shift between the $+1^{st}$-order diffracted light wave 4d produced on the return path and the $-1^{st}$-order diffracted light wave 4e produced on the outward path. Thus, the cross-sectional areas of the first interference light wave 41 and second interference light wave perpendicular to the propagation directions thereof reduce, thereby decreasing the intensities of the first interference light wave 41 and the second interference light wave 42. This also decreases the sensitivity of the microphone 101. Moreover, if the position shift D is larger than the spot diameter of the light wave 40, no interference light waves are produced, and it is therefore not possible to detect the acoustic wave. Since the distance D is dependent also on the diffraction angle θ, it also increases depending on the wavelength of the light wave 4 and the wavelength of the acoustic wave 1. Therefore, the distance D may be decreased by decreasing the distance L1 between the propagation medium portion 2 and the reflecting section 6 as much as possible.

Figure 22A:
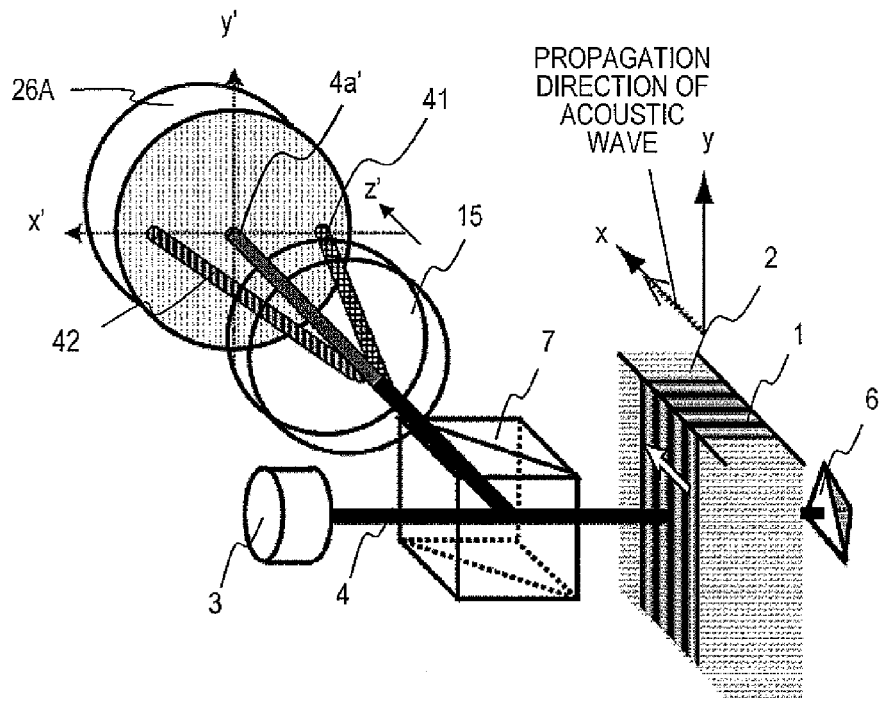
FIGS. 22A and 22B are diagrams showing the relationship between the propagation direction of the acoustic wave and the diffraction direction of the light wave.
Figure 22B:
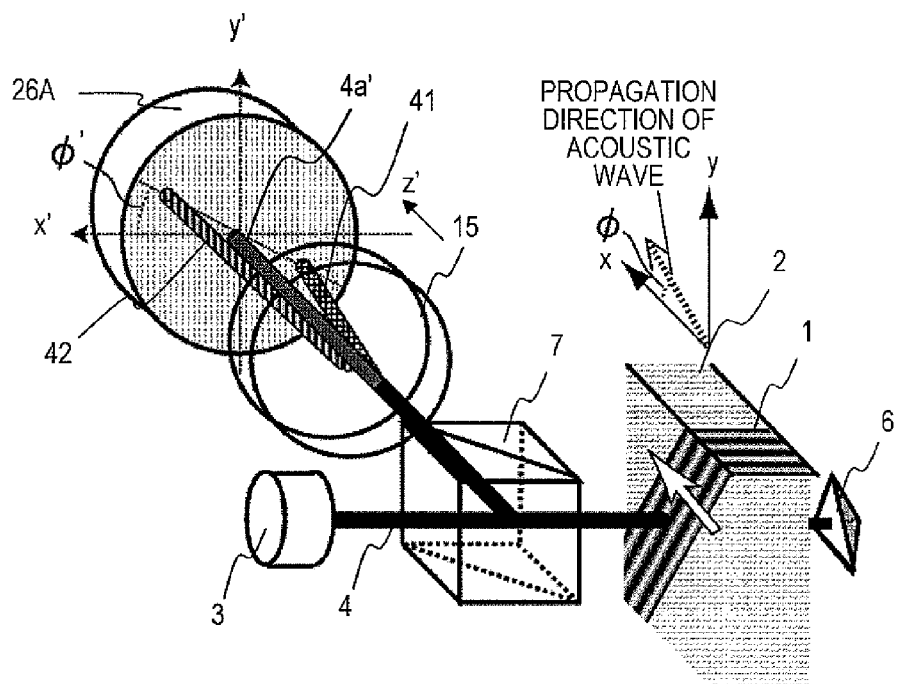

The optical microphone 102 of the present embodiment identifies the propagation direction of the acoustic wave 1 by detecting, using the photoelectric conversion element array 26A, the azimuthal directions in which the first interference light wave 41 and the second interference light wave 42 are output around the $0^{th}$-order diffracted light wave 4a'. Now, referring to FIG. 22, a method for identifying the propagation direction of the acoustic wave 1 will be described. As shown in FIGS. 22A and 22B, on the light-receiving surface of the photoelectric conversion element array 26A, the direction in which the light wave 4 propagates is defined as the z' axis, and the x' axis and the y' axis are defined in the plane perpendicular to z'. The x' axis and the y' axis are directions obtained by mapping the x axis and the y axis onto the light-receiving surface via the beam splitter 7.

As described earlier, the directions in which the $+1^{st}$-order diffracted light waves 4b and 4d and the $-1^{st}$-order diffracted light waves 4c and 4e are produced are determined by the propagation direction of the acoustic wave 1. Therefore, when the acoustic wave 1 is propagating in the x-axis direction, the first interference light wave 41 obtained by the $+1^{st}$-order diffracted light wave 4b and the $-1^{st}$-order diffracted light wave 4e and the second interference light wave 42 obtained by the $+1^{st}$-order diffracted light wave 4d and the $-1^{st}$-order diffracted light wave 4c are output at positions shifted in the x'-axis negative direction and the x'-axis positive direction, respectively, with respect to the $0^{th}$-order diffracted light wave 4a, as shown in FIG. 22A. When the acoustic wave 1 is propagating on the xy plane in a direction that is at an angle of φ from the x axis, the first interference light wave 41 and the second interference light wave 42 appear at positions shifted in the direction that is at an angle of φ from the x' axis, as shown in FIG. 22B. Therefore, it is possible to identify the angle/direction in which the acoustic wave 1 is propagating by detecting, using the photoelectric conversion element array 26A, the azimuthal directions in which the first interference light wave 41 and the second interference light wave 42 are output around the $0^{th}$-order diffracted light wave 4a'.

Therefore, the photoelectric conversion element array 26A includes a plurality of photoelectric conversion elements 5a, 5b, . . . , 5y, 5x. In the present embodiment, the number of the photoelectric conversion elements 5a, 5b, . . . , 5y, 5x is 24, for example, as shown in FIG. 15. The photoelectric conversion elements each include a fan-shaped light-receiving section, and are arranged in different azimuthal directions so as to be centered about the position at which the $0^{th}$-order diffracted light wave 4a' is incident. Where the central angle of the fan shape of each light-receiving section is 15°, the photoelectric conversion element array 26A can have a circular light-receiving surface as a whole by arranging the photoelectric conversion elements in different azimuthal directions shifted by 15° from one another so as to be centered about the position at which the $0^{th}$-order diffracted light wave $4a'$ is incident.

When the first interference light wave 41 and the second interference light wave 42 are incident upon the photoelectric conversion element array 26A, some of the plurality of photoelectric conversion elements $5a, 5b, \ldots, 5y, 5x$ that have received the first interference light wave or the second interference light wave 42 output an electric signal. That is, some of the plurality of photoelectric conversion elements detect the first interference light wave 41 or the second interference light wave 42. Therefore, it is possible to identify, using the photoelectric conversion element array 26A, the azimuthal directions in which the first interference light wave 41 and the second interference light wave 42 are output around the $0^{th}$-order diffracted light wave $4a'$, based on where the photoelectric conversion elements that have detected the first interference light wave 41 or the second interference light wave 42 are located in the circular light-receiving surface of the photoelectric conversion element array 26A.

As shown in FIGS. 22A and 22B, the x-y coordinate system of the propagation medium portion 2 corresponds to the x'-y' coordinate system on the light-receiving surface of the photoelectric conversion element array 26A. Since the $+1^{st}$-order diffracted light waves $4b$ and $4d$ and the $-1^{st}$-order diffracted light waves $4c$ and $4e$ are diffracted in the propagation direction of the acoustic wave 1 on the x-y coordinate system of the propagation medium portion 2, as described above, exiting directions, with respect to the $0^{th}$-order diffracted light wave $4a'$, of the first interference light wave 41 and the second interference light wave 42 produced by these diffracted light waves also coincide with the propagation direction of the acoustic wave 1.

Therefore, the detected azimuthal direction of the first interference light wave 41 and the second interference light wave 42 around the $0^{th}$-order diffracted light wave $4a'$ on the x'-y' coordinate system on the light-receiving surface of the photoelectric conversion element array 26A coincides with the propagation direction of the acoustic wave 1, with the light wave 4 being an axis, on the x-y coordinate system of the propagation medium portion 2. The azimuthal direction of the first interference light wave 41 and the second interference light wave 42 around the $0^{th}$-order diffracted light wave $4a'$ detected by the photoelectric conversion element array 26A coincides with the propagation direction of the acoustic wave 1 through the propagation medium portion 2. Thus, it is possible to determine the propagation direction of the acoustic wave based on the azimuthal directions of the photoelectric conversion elements that have detected the first interference light wave 41 and the second interference light wave 42.

With an actual optical microphone 102, for example, the x axis is determined in an arbitrary direction on a plane perpendicular to the light wave 4 incident upon the propagation medium portion 2, and the acoustic wave 1 is propagated in the direction of the x axis determined, determining, as the x' axis, the straight line connecting between the first interference light wave 41 and the second interference light wave 42, irradiating the light-receiving surface of the photoelectric conversion element array 26A. The x'-y' coordinate system on the light-receiving surface of the photoelectric conversion element array 26A is obtained simply by reflecting the x-y coordinate system in the propagation medium portion 2 by the beam splitter 7 and mapping the x-y coordinate system. Therefore, by properly adjusting the propagation path of the light wave 4, the horizontal direction in the propagation medium portion 2 can be defined as the x axis and the horizontal direction of the light-receiving surface of the photoelectric conversion element array 26A as the x' axis, for example.

Note however that it is not possible to distinguish whether the first interference light wave 41 is being detected or the second interference light wave 42 is being detected based on electric signals detected by the photoelectric conversion elements of the photoelectric conversion element array 26A. This is because these interference light waves have generally an equal intensity. Thus, the photoelectric conversion element array 26A outputs the same detection results when the acoustic wave 1 propagates through the propagation medium portion 2 in the x-axis positive direction and when it propagates therethrough in the x-axis negative direction.

Figure 23:
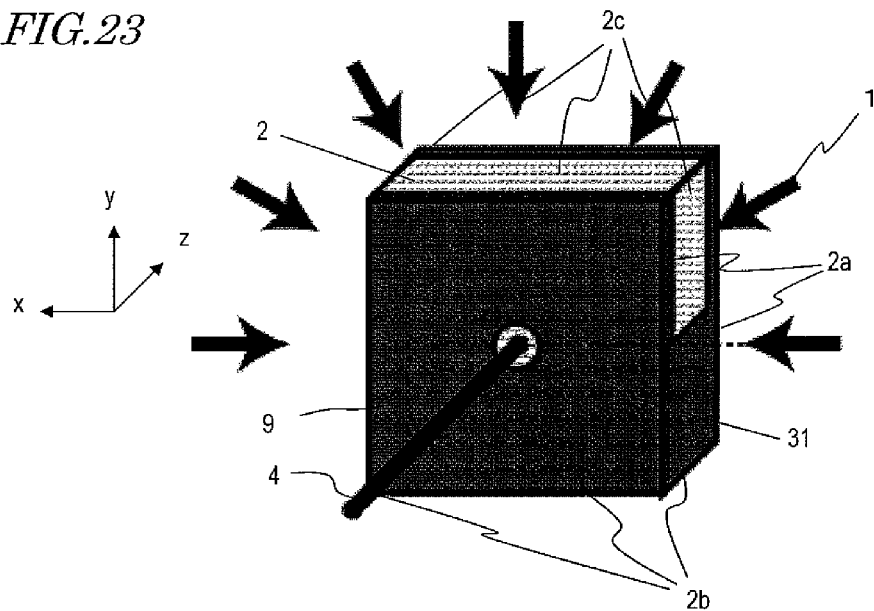
FIG. 23 is a diagram showing a propagation medium portion in which the propagation direction of the acoustic wave is limited.

If one wishes to also identify the direction in which the acoustic wave propagates, the direction in which the acoustic wave 1 propagates can be limited, in advance, to 180° or less. For example, consider a case where the acoustic wave 1 in the air is taken in into the propagation medium portion 2, and the propagation direction of the acoustic wave 1 is identified. As shown in FIG. 23, of the all the surfaces of the propagation medium portion 2, the sound blocking section 9 for blocking the acoustic wave 1 is provided on two surfaces $2a$ perpendicular to the z axis direction and portions $2b$ of surfaces parallel to the z axis that are located in the y-axis negative direction with respect to the position where the light wave 4 propagates. Thus, an opening through which the acoustic wave 1 enters is formed in portions $2c$ of surfaces parallel to the z axis on the surface of the propagation medium portion 2 that are located in the y-axis positive direction with respect to the position where the light wave 4 propagates.

Thus, the direction of propagation of the acoustic wave 1 at a position in the propagation medium portion where it interacts with the light wave 4 has a vector in the y-axis negative direction. Therefore, the propagation direction of the acoustic wave 1 can be limited to 180°. Note that in this case, since the light wave 4 needs to enter the propagation medium portion 2, the sound blocking section 9 may be formed by a transparent material such as a glass or an acrylic resin, or a light-transmitting hole 31 may be provided in a portion where the light wave 4 propagates, so that the light wave 4 can pass therethrough.

(Propagation Direction Determining Section 45)

The optical microphone 102 may further include the propagation direction determining section 45. The propagation direction determining section 45 receives electric signals from the photoelectric conversion elements $5a$ to $5x$ of the photoelectric conversion element array 26A, and outputs a signal that represents the propagation direction of the acoustic wave 1 in terms of the angle $\phi$ from the reference direction.

For example, as shown in FIG. 15 and Table 1, the photoelectric conversion elements $5b$ to $5x$ are associated with azimuthal directions that are arranged with 15° intervals therebetween, where $\phi'=0$ for the photoelectric conversion element $5a$ located in the x'-axis positive area. Specifically, photoelectric conversion elements and azimuthal directions are associated with each other, e.g., $\phi'=0$ for the photoelectric conversion element $5a$, $\phi'=15°$ for the photoelectric conversion element $5b$, and $\phi'=30°$ for the photoelectric conversion element $5c$. The propagation direction determining section 45 includes a memory storing such data where photoelectric conversion elements and azimuthal directions are associated with each other.

TABLE 1

| | Photoelectric conversion element | | | | | |
|---|---|---|---|---|---|---|
| | 5a | 5b | 5c | ... | 5w | 5x |
| Azimuthal direction φ' | 0 | 15 | 30 | ... | 330 | 345 |

The propagation direction determining section 45 receives the output from the photoelectric conversion element array 26A and, with reference to the memory, outputs the azimuthal direction φ' associated with one of the photoelectric conversion elements 5a to 5x that has output an electric signal whose intensity is greater than or equal to a predetermined intensity. Thus, the azimuthal directions φ' of the first interference light wave 41 and the second interference light wave 42 around the $0^{th}$-order diffracted light wave 4a' are output. Since the x-y coordinate system in the propagation medium portion 2 and the x'-y' coordinate system on the light-receiving surface of the photoelectric conversion element array 26A correspond to each other as described above, the azimuthal direction φ' in the x'-y' coordinate system coincides with the azimuthal direction φ in the x-y coordinate system. Therefore, the azimuthal direction φ' output from the propagation direction determining section 45 represents the propagation direction p of the acoustic wave 1 propagating through the propagation medium portion 2.

Note that depending on the positions at which the first interference light wave 41 and the second interference light wave 42 are incident upon the light-receiving surface of the photoelectric conversion element array 26A, output signals due to the first interference light wave 41 or the second interference light wave 42 may be obtained from two or more photoelectric conversion elements. This occurs when, for example, the first interference light wave 41 or the second interference light wave 42 is incident upon the boundary between the photoelectric conversion element 5a and the photoelectric conversion element 5b or the vicinity thereof.

In such a case, the propagation direction determining section 45 may obtain the mean based on the magnitudes of the electric signals obtained from the photoelectric conversion elements, thereby determining the azimuthal direction φ' of the first interference light wave 41 or the second interference light wave 42. For example, the azimuthal direction of the first interference light wave 41 or the second interference light wave 42 can be determined through calculation shown in the expression below, where Ia and Ib are the intensities of the electric signals from the photoelectric conversion element 5a and the photoelectric conversion element 5b.

$$\phi'=(0 \times Ia+15 \times Ib)/(Ia+Ib)$$

Alternatively, φ' may be determined using the outputs from the photoelectric conversion elements 5a to 5x. For example, the mean $\phi'_m$ between the azimuthal direction $\phi'_1$ of the first interference light wave 41 and the azimuthal direction $\phi'_2$ of the second interference light wave 42 can be obtained through calculation shown in the expression below.

$$\phi'_m=(0 \times Ia+15 \times Ib+\ldots+345 \times Ix)/(Ia+Ib+\ldots+Ix)$$

In this case, the azimuthal direction φ' of the first interference light wave 41 and the azimuthal direction $\phi'_2$ of the second interference light wave 42 are $\phi'_m+90$ and $\phi'_m-90$.

Note that the photoelectric conversion elements 5a to 5x forming the photoelectric conversion element array 26A do not need to receive the $0^{th}$-order diffracted light wave 4a'. This is because the $0^{th}$-order diffracted light wave 4a' does not contribute to the determination of the propagation direction of the acoustic wave 1.

The angular resolution of the optical microphone 102 specific to the propagation direction of the acoustic wave 1 is determined based on the central angle of the fan shape of the light-receiving sections of the photoelectric conversion elements 5a to 5x, the capabilities of the light-receiving lens system 15, the distance of the photoelectric conversion element array 26A, etc. It is possible to obtain a high angular resolution by increasing the number of the photoelectric conversion elements 5a to 5x while reducing the central angle of the fan shape of the light-receiving sections, or by enlarging the light wave 4 by adjusting the positions of the light-receiving lens system 15 and the photoelectric conversion element array 26A.

Each of the fan-shaped light-receiving sections shown in FIG. 15 may be formed by a plurality of photoelectric conversion elements. In such a case, the outputs from the plurality of plurality of photoelectric conversion elements forming a single fan-shaped light-receiving section may be added together to be used for the detection of the first interference light wave 41 and the second interference light wave 42.

(Frequency Conversion Section 46)

The optical microphone 102 may further include a frequency conversion section 46. The frequency conversion section 46 receives outputs of the photoelectric conversion elements 5a to 5x from the photoelectric conversion element array 26A or from the propagation direction determining section 45, and converts the frequency of the received electric signal to ½. The frequency conversion section 46 may be, for example, a frequency divider, or the like, formed by an electronic circuit, or the like. Then, an electric signal corresponding to the acoustic wave 1 is output from the frequency conversion section 46.

Thus, with the optical microphone of the present embodiment, at least one of the first interference light and the second interference light is detected by the photoelectric conversion element array, and it is possible to identify the propagation direction of the acoustic wave based on the position, in the photoelectric conversion element array, of the detecting photoelectric conversion element. Since the light wave obtained through interference of the $+1^{st}$-order diffracted light wave and the $-1^{st}$-order diffracted light wave is detected, it is possible to realize an optical microphone that is small and has a simple configuration without using a special measuring tool such as a laser Doppler vibrometer or an optical interferometer.

Third Embodiment

Figure 24:
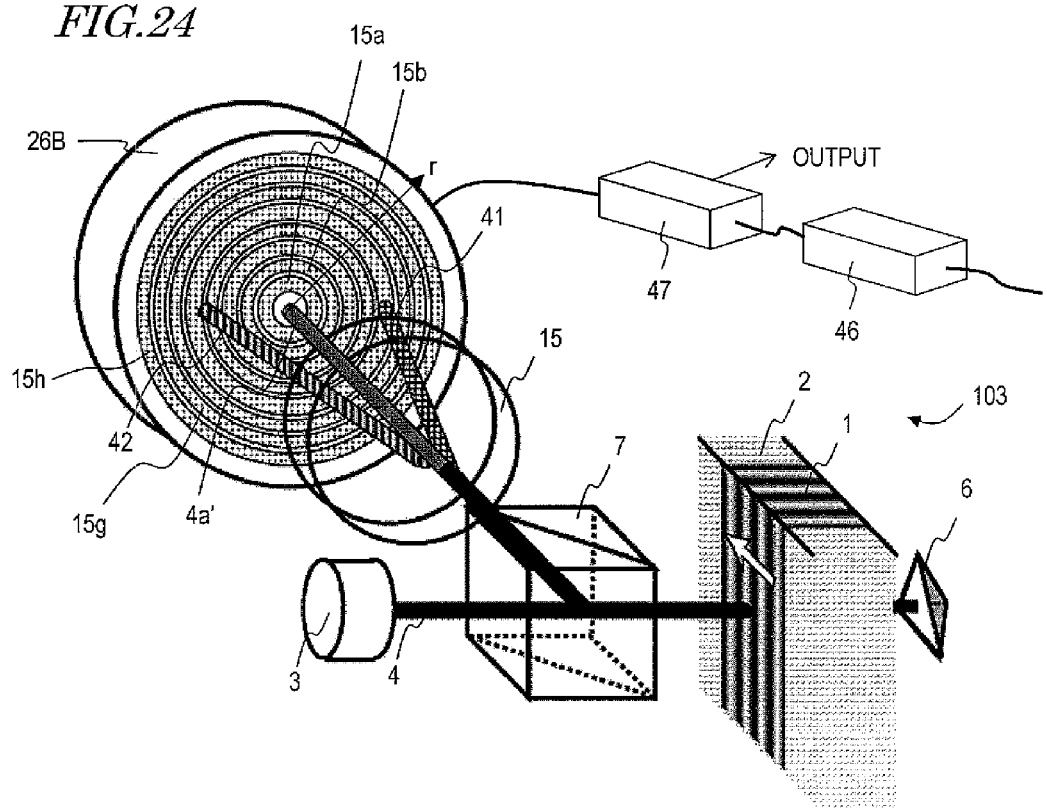
FIG. 24 is a diagram showing a configuration of a third embodiment of an optical microphone according to the present invention.

FIG. 24 shows a configuration of a main part of an optical microphone 103 of the present embodiment. The optical microphone 103 separately detects the acoustic wave 1 based on the frequency thereof by using the light wave 4. For this, the optical microphone 103 includes the propagation medium portion 2, the light source 3, a photoelectric conversion element array 26B, the reflecting section 6, the beam splitter 7, and the light-receiving lens system 15. Components other than the photoelectric conversion element array 26B are the same as those of the optical microphone 102 of the second embodiment.

The photoelectric conversion element array 26B includes a plurality of photoelectric conversion elements 15a, 15b, ..., 15h. The photoelectric conversion elements include a plurality of ring-shaped light-receiving sections having different inner diameters and outer diameters, and the light-receiving sections are arranged in a concentric pattern centered about a position at which the $0^{th}$-order diffracted light wave 4a' is incident. The distances from the position at which the $0^{th}$- order diffracted light wave 4a' is incident to the light-receiving sections of the photoelectric conversion elements are different from each other.

As described above, the diffraction angle θ of the $+1^{st}$-order diffracted light wave 4b and the $-1^{st}$-order diffracted light wave 4c on the outward path and the $+1^{st}$-order diffracted light wave 4d and the $-1^{st}$-order diffracted light wave 4e on the return path can be expressed as shown in Expression (1). Herein, λ denotes the wavelength of the light wave 4, Λ the wavelength of the acoustic wave 1, f the frequency of the acoustic wave 1, and Cs the sonic velocity through the propagation medium portion 2. When the frequency of the acoustic wave 1 increases, the diffraction angle θ increases in accordance with the frequency f of the acoustic wave 1. Herein, where L2 denotes the propagation distance of the light wave 4 from the propagation medium portion 2 to the light-receiving lens system 15, the distance between the $0^{th}$-order diffracted light wave 4a and the $+1^{st}$-order diffracted light waves 4b and 4d and the $-1^{st}$-order diffracted light waves 4c and 4e can be expressed as sin θ×L2. Thus, it can be seen that the distance between the position of the $0^{th}$-order diffracted light wave 4a' and the positions of the first interference light wave 41 and the second interference light wave 42 increases as the frequency of the acoustic wave 1 increases.

The light wave 4 incident upon the photoelectric conversion element array 26B has been enlarged through the light-receiving lens system 15, and the distance between the $0^{th}$-order diffracted light wave 4a and the first interference light wave 41 and the second interference light wave 42 is also dependent on the frequency. Where the light-receiving lens system 15 enlarges the light wave 4 with a constant magnifying power irrespective of the positional relationship, the distance r between the $0^{th}$-order diffracted light wave 4a" and the first interference light wave 41 and the second interference light wave 42 can be expressed as shown in Expression (6) below.

[Expression 6]

$$r \propto \sin^{-1}\left(\frac{\lambda \cdot f}{C_s}\right) \quad (6)$$

Therefore, depending on the frequency f of the acoustic wave 1, the first interference light wave 41 and the second interference light wave 42 are detected by one of the plurality of photoelectric conversion elements 15a, 15b, . . . , 15h having the light-receiving sections at different radial positions. As can be seen from Expression (6), as the frequency f of the acoustic wave 1 increases, the distance r between the $0^{th}$-order diffracted light wave 4a' and the first interference light wave 41 and the second interference light wave 42 increases. Where the acoustic wave 1 contains a plurality of different frequency components, it is possible to separately detect components of the acoustic wave 1 for each different frequency by independently detecting the first interference light wave 41 and the second interference light wave 42 with two or more of the photoelectric conversion elements 15a, 15b, . . . , 15h.

By associating frequencies f or frequency bands of the acoustic wave 1 with the photoelectric conversion elements 15a, 15b, . . . , 15h, or with distances r from the position at which the $0^{th}$-order diffracted light wave 4a' is incident upon the light-receiving sections of the photoelectric conversion elements 15a, 15b, . . . , 15h, it is possible to identify the frequency f or the frequency band of the acoustic wave 1 based on which ones of the photoelectric conversion elements 15a, 15b, . . . , 15h have detected the first interference light wave 41 and the second interference light wave 42. Since each photoelectric conversion element has a light-receiving section that is uniform in the circumferential direction, it is possible to identify the frequency irrespective of the propagation direction of the acoustic wave 1. The association of the frequencies may be done through calculation or by inputting acoustic waves having known frequencies and recording the intensity distribution among the output signals obtained from the photoelectric conversion elements 15a, 15b, . . . , 15h.

The optical microphone 103 of the present embodiment may include a frequency identifying section 47 for receiving an electric signal from the photoelectric conversion element array 26B, and outputting a signal that represents the frequency or the frequency band of the acoustic wave 1. For example, the frequency identifying section 47 includes a memory storing how frequencies f or frequency bands of the acoustic wave 1 are associated with the photoelectric conversion elements 15a, 15b, . . . , 15h (or the distances r from the position at which the $0^{th}$-order diffracted light wave 4a' is incident upon the light-receiving sections).

For example, the photoelectric conversion elements 15h, 15g, 15f, . . . , are associated with the frequency bands f1-f2, f2-f3, f3-f4 (f4>f3>f2>f1), . . . , of the acoustic wave 1, as shown in Table 2, and the association is stored in a memory.

TABLE 2

| | Photoelectric conversion element | | | | | |
|---|---|---|---|---|---|---|
| | 15a | 15b | 15c | . . . | 15g | 15h |
| Frequency band | f1-f2 | f2-f3 | f3-f4 | . . . | f7-f8 | f8-f9 |

The frequency identifying section 47 receives the output from the photoelectric conversion element array 26B and, with reference to the memory, outputs a frequency band, such as f2-f3, that is associated with one of the photoelectric conversion elements 5a to 5x that has output an electric signal whose intensity is greater than or equal to a predetermined intensity.

Alternatively, the frequency band may be determined through calculation using all the electric signals from the photoelectric conversion elements 5a to 5x, as described above in the first embodiment.

Note that the acoustic wave 1 may contain plurality of components of different frequencies. In this case, the photoelectric conversion element array 26B can separately detect, for each different one of the frequency bands described above, two or more components of the acoustic wave 1 contained in the first interference light wave 41 and the second interference light wave 42. Moreover, in this case, the photoelectric conversion element array 26B can separately detect components of different frequencies of the acoustic wave 1 contained in the first interference light wave 41 and the second interference light wave 42.

The optical microphone 103 may further include the frequency conversion section 46. The frequency conversion section 46 receives outputs of the photoelectric conversion elements 5a to 5x from the photoelectric conversion element array 26B or from the frequency identifying section 47, and converts the frequency of the received electric signal to ½. Where the acoustic wave 1 contains a plurality of different frequency components, the components are separated for different frequency bands described above, and the frequencies thereof are converted.

Figure 25:
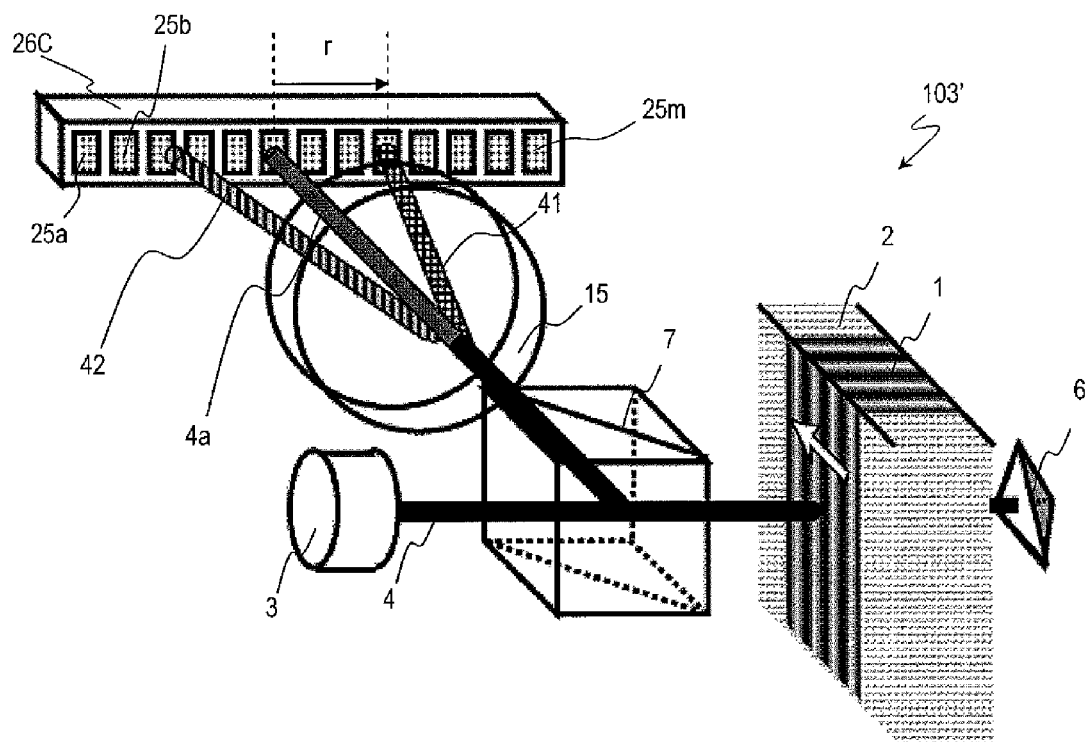
FIG. 25 is a diagram showing another configuration of the third embodiment of the optical microphone according to the present invention.

Note that where it is important to separate components of different frequencies contained in the acoustic wave 1, there may be arranged a plurality photoelectric conversion elements or a single photoelectric conversion element designed with an arbitrary radius/width suitable for a frequency band to be separated. Then, it is possible not only to separately detect the acoustic wave 1 for each different frequency component, but also to provide the function as a frequency filter by not receiving signals of unnecessary frequency components. Note that it is also possible to set an arbitrary frequency range of the acoustic wave 1 to be detected by each photoelectric conversion element by distributing the magnifying power of the light-receiving lens system 15 in the radial direction from the center of the light wave 4.

Where the propagation direction of the acoustic wave 1 is constant, the photoelectric conversion element array 26B may include a plurality of photoelectric conversion elements arranged one-dimensionally. An optical microphone 103' shown in FIG. 25 includes a photoelectric conversion element array 25C including a plurality of photoelectric conversion elements 25 with light-receiving sections arranged one-dimensionally, instead of the photoelectric conversion element array 26B. With the optical microphone 103', it is possible to identify the frequency band of the acoustic wave 1, as described above, based on the position r of the photoelectric conversion elements that have detected the first interference light wave 41 and the second interference light wave 42 with respect to the position at which the $0^{th}$-order diffracted light wave 4a' is incident. Where the acoustic wave 1 contains a plurality of frequency components, it is possible to separately detect a frequency component of the acoustic wave 1 for each different frequency band.

As described above, with the optical microphone of the present embodiment, it is possible to identify the frequency of the acoustic wave based on which photoelectric conversion element has detected the first interference light wave or the second interference light wave, without analyzing the frequency of the electric signal produced by the photoelectric conversion element. Therefore, it is possible to identify the frequency of the acoustic wave with a simple configuration. Where a plurality of frequency components are contained, they can be detected separately.

Fourth Embodiment

Figure 26A:
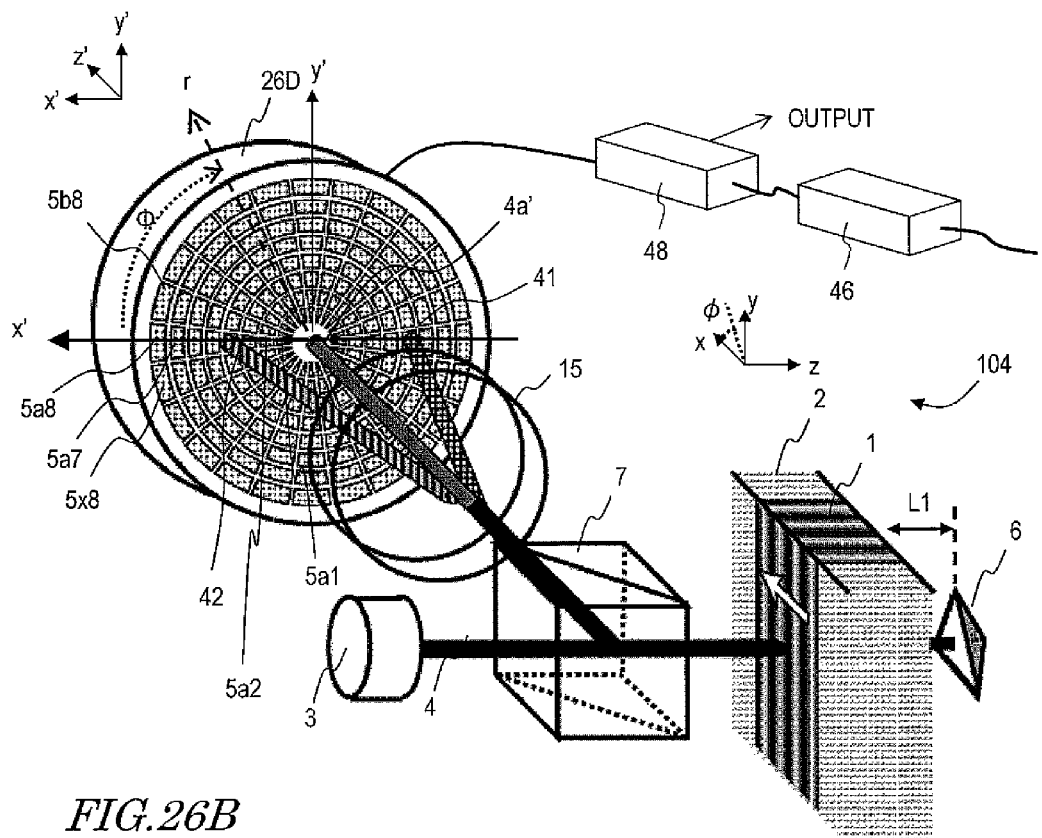
FIG. 26A is a diagram showing a configuration of a fourth embodiment of an optical microphone according to the present invention.

FIG. 26A shows a configuration of a main part of an optical microphone 104 of the present embodiment. The optical microphone 104 identifies the propagation direction of the acoustic wave 1 using the light wave 4, and separately detects the acoustic wave 1 based on the frequency thereof. For this, the optical microphone 103 includes the propagation medium portion 2, the light source 3, a photoelectric conversion element array 26D, the reflecting section 6, the beam splitter 7, and the light-receiving lens system 15. Components other than the photoelectric conversion element array 26D are the same as those of the optical microphone 102 of the first embodiment.

The photoelectric conversion element array 26D includes a plurality of photoelectric conversion elements 5a1, 5a2, . . . , 5a8, 5b1, 5b2, . . . , 5b8, . . . , 5x1, 5x2, . . . , 5x8. The photoelectric conversion elements each include a partial-ring-shaped light-receiving section, and the light-receiving sections are arranged two-dimensionally in a radial direction and in a circumferential direction in a circle centered about a position at which the $0^{th}$-order diffracted light wave 4a' is incident. That is, the photoelectric conversion elements 5a1, 5a2, . . . , 5a8, or the photoelectric conversion elements 5b1, 5b2, . . . , 5b8, or the like, are arranged at different radial positions in the same azimuthal direction, whereas the photoelectric conversion elements 5a1, 5b1, 5c1, . . . , 5x1, the photoelectric conversion elements 5a2, 5b2, 5c2, . . . , 5x2, or the like, are arranged along the circumferential direction at the same radial position. The photoelectric conversion elements 5a1, 5a2, . . . , 5a8 are arranged in the same azimuthal direction φ' with respect to the position at which the $0^{th}$-order diffracted light wave 4a' is incident. Similarly, the photoelectric conversion elements 5b1, 5b2, . . . , 5b8 are arranged in the same azimuthal direction φ'.

The photoelectric conversion elements 5a1, 5b1, 5c1, . . . , 5x1 are arranged in a concentric pattern at a radial position closest to the position at which the $0^{th}$-order diffracted light wave 4a' is incident, and the photoelectric conversion elements 5a8, 5b8, 5c8, . . . , 5x8 are arranged in a concentric pattern at a radial position farthest away from the position at which the $0^{th}$-order diffracted light wave 4a' is incident.

Using such a photoelectric conversion element array 26D, it is possible to identify the frequency of the acoustic wave based on the distance r of the light-receiving sections of the photoelectric conversion elements that have detected the first interference light 41 and the second interference light 42 in the radial direction about the position at which the $0^{th}$-order diffracted light wave 4a' is incident, and it is possible to identify the propagation direction of the acoustic wave from the azimuthal direction φ' about the center, as described above in the second embodiment and the third embodiment.

For example, the optical microphone 104 may include a propagation direction/frequency identifying section 48 for receiving an electric signal from the photoelectric conversion element array 26D, and outputting a signal representing the propagation direction of the acoustic wave 1 and the frequency band. The propagation direction/frequency identifying section 48 includes a memory storing how the frequency bands and azimuthal directions φ' of propagation of the acoustic wave 1 are associated with photoelectric conversion elements as shown in Table 3.

The propagation direction/frequency identifying section 48 receives an output from the photoelectric conversion element array 26D and, with reference to the memory, outputs an azimuthal direction and a frequency band associated with the photoelectric conversion element that has output an electric signal greater than or equal to a predetermined intensity.

TABLE 3

| Photoelectric conversion element | Azimuthal direction φ' | Frequency band |
|---|---|---|
| 5a1 | 0 | f1-f2 |
| 5a2 | 0 | f2-f3 |
| . | . | . |
| . | . | . |
| . | . | . |
| 5a8 | 0 | f8-f9 |
| 5b1 | 15 | f1-f2 |
| . | . | . |
| . | . | . |
| . | . | . |
| 5b8 | 15 | f8-f9 |
| . | . | . |
| . | . | . |
| . | . | . |
| 5x8 | 345 | f8-f9 |

Figure 27:
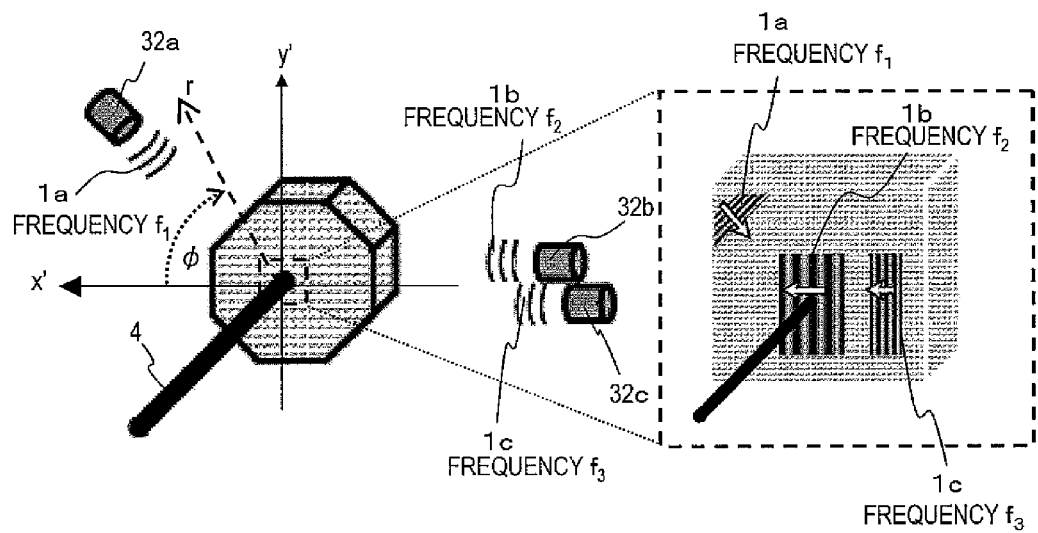
FIG. 27 is a diagram illustrating sound source localization using the optical microphone of the fourth embodiment.

Using the optical microphone 104, it is possible to detect acoustic waves 1a, 1b and 1c output from a plurality of sound sources 32a, 32b and 32c and at the same time to localize the sound sources, as shown in FIG. 27, for example. Since the acoustic wave 1a output from the sound source 32a and the acoustic wave 1b output from the sound source 32b differ from each other in propagation direction, the first interference light wave 41 and the second interference light wave 42 appear at different positions in the <p' direction on the light-receiving surface of the photoelectric conversion element array 26D for the two acoustic waves 1a and 1b. Therefore, the first interference light wave 41 and the second interference light wave 42 are received by photoelectric conversion elements of different azimuthal directions, thereby identifying the propagation directions thereof and realizing sound source localization. The acoustic waves 1b and 1c output from the sound source 32b and the sound source 32c are in the same propagation direction but have different frequencies of f2 and f3. Therefore, the first interference light wave 41 and the second interference light wave 42 are received by photoelectric conversion elements of the same azimuthal direction ϕ' but of different distances r in the radial direction, and therefore these two acoustic waves can be distinctly detected if the frequencies f2 and f3 of the two acoustic waves 1b and 1c are known in advance.

Figure 26B:
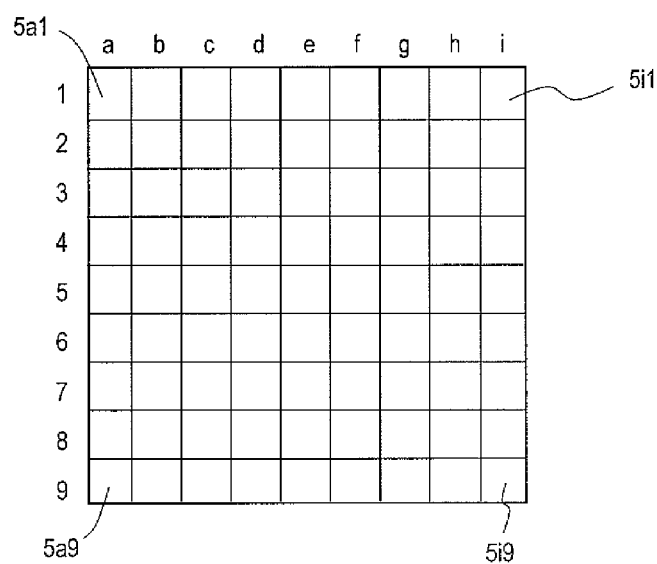
FIG. 26B is a schematic diagram showing another embodiment of the photoelectric conversion element array.

While the photoelectric conversion element array 26D has a structure in which photoelectric conversion elements having partial-ring-shaped light-receiving sections are arranged in the radial direction and in the circumferential direction in the embodiment above, a different structure may be used. For example, as shown in FIG. 26B, a photoelectric conversion element array may be used in which a plurality of photoelectric conversion elements having rectangular light-receiving sections are arranged in two non-parallel directions, e.g., two orthogonal directions. FIG. 26B schematically shows an arrangement of light-receiving surfaces of such a photoelectric conversion element array. The photoelectric conversion element array includes a plurality of photoelectric conversion elements $5a1, 5a2, \ldots, 5a9, 5b1, 5b2, \ldots, 5b9, \ldots, 5i1, 5i2, \ldots, 5i9$. Each photoelectric conversion element includes a rectangular light-receiving section, and the photoelectric conversion element array has an arrangement such that the $0^{th}$-order diffracted light wave 4a' is incident upon the light-receiving section of the photoelectric conversion element 5e5. Since the photoelectric conversion elements of this photoelectric conversion element array are not arranged in the circumferential direction and the radial direction, they differ from each other, except for particular positional relationships, in terms of the azimuthal direction about the position at which the $0^{th}$-order diffracted light wave 4a' is incident and the distance from the center thereof to the light-receiving section. Therefore, the azimuthal direction of each photoelectric conversion element about the position the position at, which the $0^{th}$-order diffracted light wave 4a' is incident and the distance from the center to the light-receiving section may be calculated or measured in advance, and stored in a memory, or the like, as shown in Table 3.

With the optical microphone of the present embodiment, it is possible to identify a plurality acoustic waves propagating from different directions. Where the frequencies of the acoustic waves are known in advance, it is possible to identify a plurality of acoustic waves propagating from the same direction.

Fifth Embodiment

Figure 28:
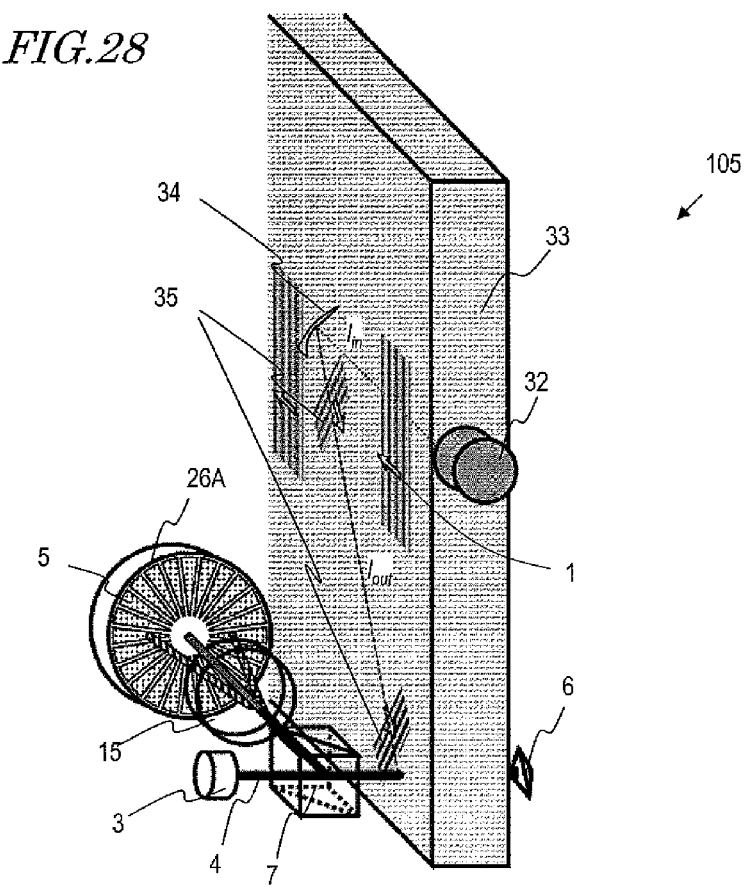
FIG. 28 is a diagram showing a configuration of an embodiment of a flaw detection device according to the present invention.
Figure 29:
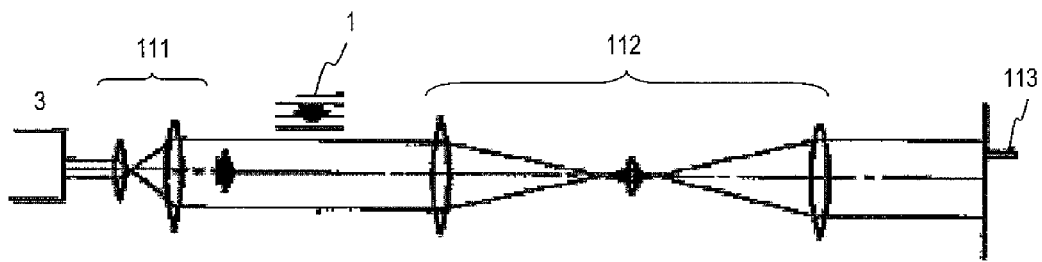
FIG. 29 is a diagram schematically showing a configuration of a conventional optical microphone.
Figure 30:
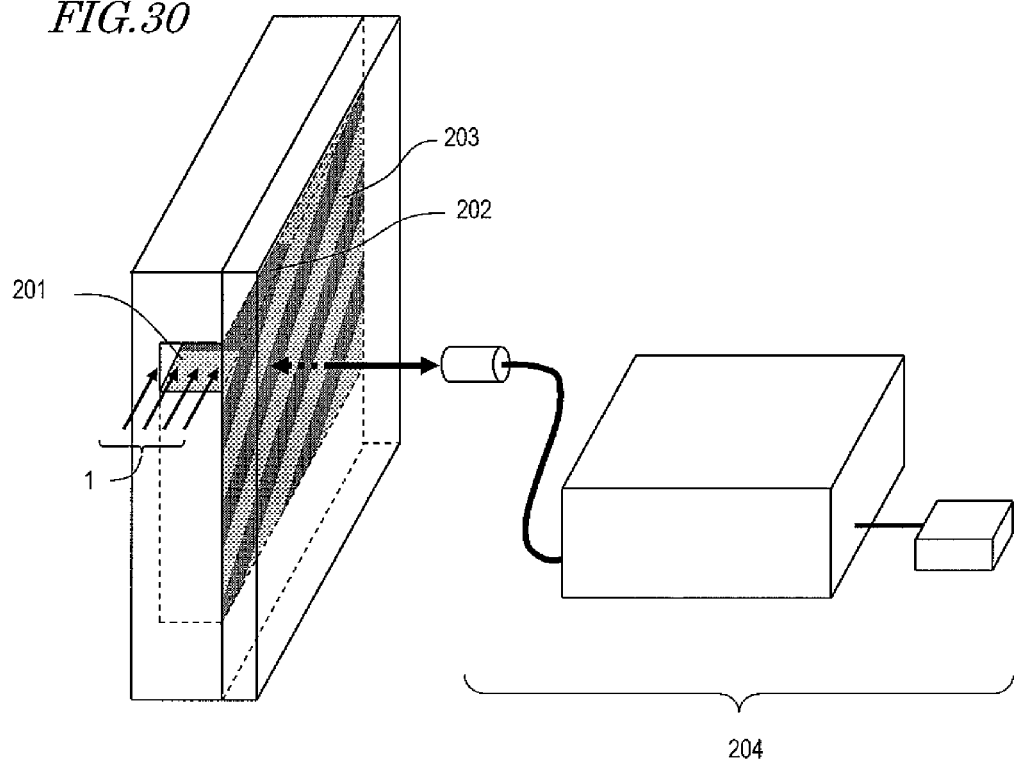
FIG. 30 is a diagram schematically showing a configuration of another conventional optical microphone.

An embodiment of a flaw detection device of the present invention will be described. FIG. 28 shows a configuration of a main part of a flaw detection device 105 of the present embodiment. The flaw detection device 105 is capable of finding a flaw in a subject such as a transparent material, without destructing the subject. The flaw detection device 105 has the same structure as that of the optical microphone 102 of the second embodiment, except that a subject 33 of flaw inspection is used in place of the propagation medium portion 2, and a sound source 32 for generating the acoustic wave 1 is provided.

The subject 33 may be transparent to the light wave 4 output from the light source 3. Where the light wave 4 is visible light, the subject 33 formed by a glass, an acrylic resin, or the like, can be inspected. It may also be a solid capable of propagating therethrough the acoustic wave 1 output from the sound source 32. If a high frequency such as an ultrasonic wave is used as the acoustic wave 1, it is possible to realize a high resolution and thus to identify a flaw 34 precisely. A piezoelectric element, or the like, may be used as the sound source 32 for outputting an ultrasonic wave.

The acoustic wave 1 is generated and propagated through the subject 33 by providing the sound source 32, for example, in contact with one end of the subject 33, as shown in FIG. 28, and driving the sound source 32. The light wave 4 output from the light source 3 may be incident upon the subject 33 at a position other than the propagation path of the acoustic wave 1 generated by the sound source 32.

If there is a flaw 34 in the subject 33 due to physical damage such as a scar or contamination with a foreign substance, a reflected wave 35 of the acoustic wave 1 is produced at the flaw 34. As the reflected wave 35 passes across the light wave 4 passing through the subject 33, it is possible to identify the direction in which the flaw 34 is present as described above in the second embodiment.

Comparing the time waveform of the detected output signal with the time waveform of the acoustic wave 1 input from the sound source 32, it is possible to know the propagation time $t_{prop}$ over which the acoustic wave 1 propagates through the subject 33. The relationship $l_{in}+l_{out}=t_{prop} \times V_n$ holds, where $V_n$ denotes the propagation speed of the acoustic wave 1 through the subject 33, $l_{in}$ the distance from the sound source 32 to the flaw 34, and $l_{out}$ the distance from the flaw 34 to the light wave 4. Therefore, if the propagation direction of the reflected wave 35 is identified, it is possible to calculate, from the propagation time $t_{prop}$, the distance from the position where the light wave 4 passes through to the flaw 34. Thus, it is possible to identify the position of the flaw 34.

Thus, with the flaw detection device of the present embodiment, it is possible to estimate the position of a flaw inside the subject 33 without destructing the subject 33. Particularly, since the reflection of the acoustic wave 1 occurs also when there exists a material different from that of the subject 33 or when there is a physical structural defect in the material of the subject 33, it is possible to detect, and estimate the position of, various flaws 34.

The optical microphone disclosed in the present application is applicable to small-sized ultrasonic sensors, and the like, and audible sound microphones, and the like. It is also applicable to ultrasonic wave receiving sensors, and the like, for use in a surrounding environment system using an ultrasonic wave.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical microphone for detecting an acoustic wave propagating through an environment fluid by using a light wave, the optical microphone comprising:
   a propagation medium portion through which the acoustic wave propagates;
   a light source configured to output a light wave passing through the propagation medium portion across the acoustic wave propagating through the propagation medium portion;
   a reflecting section configured to retroreflect the light wave having passed through the propagation medium portion; and
   a photoelectric conversion section configured to receive the light wave having been reflected by the reflecting section and passed through the propagation medium portion to output an electric signal, wherein:
   on an outward path along which the light wave output from the light source passes through the propagation medium portion, a $0^{th}$-order diffracted light wave, a $+1^{st}$-order diffracted light wave and a $-1^{st}$-order diffracted light wave are produced by virtue of a refractive index distribution across the propagation medium portion caused by the propagation of the acoustic wave therethrough;
   on a return path along which the $0^{th}$-order diffracted light wave having been produced on the outward path passes through the propagation medium portion after being reflected by the reflecting section, a $0^{th}$-order diffracted light wave, a $+1^{st}$-order diffracted light wave and a $-1^{st}$-order diffracted light wave are produced by virtue of a refractive index distribution across the propagation medium portion caused by the propagation of the acoustic wave therethrough; and
   the photoelectric conversion section detects at least one of interference light between the $+1^{st}$-order diffracted light wave produced on the outward path and the $-1^{st}$-order diffracted light wave produced on the return path, and interference light between the $-1^{st}$-order diffracted light wave produced on the outward path and the $+1^{st}$-order diffracted light wave produced on the return path.

2. The optical microphone according to claim 1, further comprising:
   a beam splitter located between the light source and the propagation medium portion,
   wherein the beam splitter causes the $+1^{st}$-order diffracted light waves and the $-1^{st}$-order diffracted light waves produced on the outward path and the return path to be output in a direction different from the light source.

3. The optical microphone according to claim 1, wherein the reflecting section is retroreflective at least on a plane that contains a propagation direction of the acoustic wave and a propagation direction of the light wave output from the light source in the propagation medium portion.

4. The optical microphone according to claim 3, wherein:
   the reflecting section is a reversal mirror; and
   an axis of symmetry of the reversal mirror is perpendicular to the propagation direction of the acoustic wave and the propagation direction of the light wave.

5. The optical microphone according to claim 3, wherein the reflecting section is a corner cube mirror.

6. The optical microphone according to claim 1, wherein:
   the photoelectric conversion section includes a light-receiving surface; and
   the optical microphone further comprises a light-blocking section for blocking the $0^{th}$-order diffracted light wave produced on the return path from entering the light-receiving surface so that the $0^{th}$-order diffracted light wave does not enter the light-receiving surface.

7. The optical microphone according to claim 6, further comprising a light-receiving lens system having a diverging function arranged on one side of the light-blocking section that is closer to the propagation medium along an optical path of the return path.

8. The optical microphone according to claim 1, wherein:
   the photoelectric conversion section is a photoelectric conversion element array including a plurality of photoelectric conversion elements for receiving the light wave having been reflected by the reflecting section and passed through the propagation medium portion to output an electric signal;
   the photoelectric conversion element array detects, using one or more of the plurality of photoelectric conversion elements, at least one of a first interference light wave obtained as a result of interference between the $+1^{st}$-order diffracted light wave produced on the outward path and the $-1^{st}$-order diffracted light wave produced on the return path, and a second interference light wave obtained as a result of interference between the $-1^{st}$-order diffracted light wave produced on the outward path and the $+1^{st}$-order diffracted light wave produced on the return path; and
   a propagation direction of the acoustic wave is identified based on a position or positions, in the photoelectric conversion element array, of the one or more of the photoelectric conversion elements that have detected at least one of the first interference light wave, and the second interference light wave.

9. The optical microphone according to claim 1, wherein:
   the photoelectric conversion section is a photoelectric conversion element array including a plurality of photoelectric conversion elements for receiving the light wave having been reflected by the reflecting section and passed through the propagation medium portion to output an electric signal;
   the photoelectric conversion element array detects, using one or more of the plurality of photoelectric conversion elements, at least one of a first interference light wave obtained as a result of interference between the $+1^{st}$-order diffracted light wave produced on the outward path and the $-1^{st}$-order diffracted light wave produced on the return path, and a second interference light wave obtained as a result of interference between the $-1^{st}$-order diffracted light wave produced on the outward path and the $+1^{st}$-order diffracted light wave produced on the return path; and
   the acoustic wave is isolated based on a frequency thereof by independently detecting at least one of the first interference light wave and the second interference light wave using the plurality of photoelectric conversion elements.

10. The optical microphone according to claim 9, wherein:
    the plurality of photoelectric conversion elements each include a light-receiving section;
    the light-receiving sections of the plurality of photoelectric conversion elements are centered about a position on the return path at which the $0^{th}$-order diffracted light wave is incident; and
    the acoustic wave is separately detected for each different frequency band based on sizes and distances from the center of the light-receiving sections of the plurality of photoelectric conversion elements.

11. The optical microphone according to claim 10, wherein:
the light-receiving sections of the plurality of photoelectric conversion elements are arranged two-dimensionally in a first arrangement direction and in a second direction non-parallel to the first arrangement direction;
a propagation direction of the acoustic wave is further identified based on an azimuthal direction, about the center, of the light-receiving section or sections of the one or more of the photoelectric conversion elements that have detected at least one of the first interference light wave and the second interference light wave.

12. The optical microphone according to claim 8, wherein:
the plurality of photoelectric conversion elements each include a partial-ring-shaped light-receiving section, and the light-receiving sections are arranged two-dimensionally in a radial direction and in a circumferential direction in a circle centered about a position on the return path at which the $0^{th}$-order diffracted light wave is incident;
the acoustic wave is isolated based on a frequency thereof by independently detecting at least one of the first interference light wave and the second interference light wave using two or more photoelectric conversion elements that are located in a same azimuthal direction of the circumferential direction and at different positions in the radial direction; and
a propagation direction of the acoustic wave is identified based on the circumferential azimuthal direction about the center.

13. The optical microphone according to claim 1, further comprising a light-receiving lens system having a diverging function provided on one side the photoelectric conversion section that is closer to the propagation medium portion.

14. The optical microphone according to claim 1, further comprising a light-receiving lens system arranged on an optical path of the return path and having a distribution such that a magnifying power thereof decreases from a center toward an outer edge thereof.

15. The optical microphone according to claim 1, wherein the propagation medium portion is formed by a dry silica gel.

16. The optical microphone according to claim 1, further comprising a frequency conversion section for converting a frequency of the electric signal obtained by the photoelectric conversion section to ½ the frequency.

17. A flaw detection device comprising:
a sound source configured to generate an acoustic wave in a subject;
a light source configured to output a light wave passing through the subject across a reflected wave of the acoustic wave caused by a flaw in the subject;
a reflecting section configured to retroreflect the light wave having passed through the subject; and
a photoelectric conversion element array including a plurality of photoelectric conversion elements for receiving the light wave having been reflected by the reflecting section and passed through the subject to output an electric signal, wherein:
on an outward path along which the light wave output from the light source passes through the subject, a $0^{th}$-order diffracted light wave, a $+1^{st}$-order diffracted light wave and a $-1^{st}$-order diffracted light wave are produced from the light wave by virtue of a refractive index distribution across the subject caused by the propagation of the reflected wave therethrough;
on a return path along which the $0^{th}$-order diffracted light wave having been produced on the outward path passes through the subject as a result of the reflection by the reflecting section, a $0^{th}$-order diffracted light wave, a $+1^{st}$-order diffracted light wave and a $-1^{st}$-order diffracted light wave are produced from the $0^{th}$-order diffracted light on the outward path by virtue of the refractive index distribution across the subject caused by the propagation of the reflected wave;
the photoelectric conversion element array detects, using one or more of the plurality of photoelectric conversion elements, at least one of a first interference light wave obtained as a result of interference between the $+1^{st}$-order diffracted light wave produced on the outward path and the $-1^{st}$-order diffracted light wave produced on the return path, and a second interference light wave obtained as a result of interference between the $-1^{st}$-order diffracted light wave produced on the outward path and the $+1^{st}$-order diffracted light wave produced on the return path;
a propagation direction of the reflected wave is identified based on a position or positions, in the photoelectric conversion element array, of the one or more of the photoelectric conversion elements that have detected at least one of the first interference light wave and the second interference light wave;
a distance over which the reflected wave propagates through the subject is calculated based on a time when at least one of the first interference light wave and the second interference light wave is detected by the photoelectric conversion element array and a time of generation of the acoustic wave in the subject; and
a position of the flaw in the subject is estimated from the identified propagation direction and the calculated distance.

18. An acoustic wave detection method for detecting an acoustic wave propagating through an environment fluid using a light wave, the method comprising the steps of:
(A) propagating an acoustic wave through a propagation medium portion;
(B) causing a light wave to pass across the acoustic wave propagating through the propagation medium portion, thereby producing a $0^{th}$-order diffracted light wave, a $+1^{st}$-order diffracted light wave and a $-1^{st}$-order diffracted light wave by virtue of a refractive index distribution across the propagation medium portion caused by the propagation of the acoustic wave therethrough;
(C) retroreflecting the $0^{th}$-order diffracted light wave, the $+1^{st}$-order diffracted light wave and the $-1^{st}$-order diffracted light wave produced in the step (B);
(D) causing the retroreflected $0^{th}$-order diffracted light wave to pass across the acoustic wave propagating through the propagation medium portion, thereby producing a $+1^{st}$-order diffracted light wave and a $-1^{st}$-order diffracted light wave by virtue of a refractive index distribution across the propagation medium portion caused by the propagation of the acoustic wave therethrough; and
(E) detecting at least one of interference light between the $+1^{st}$-order diffracted light wave having been produced in the step (B) and retroreflected and the $-1^{st}$-order diffracted light wave produced in the step (D), and interference light between the $-1^{st}$-order diffracted light wave having been produced in the step (B) and retroreflected and the $+1^{st}$-order diffracted light wave produced in the step (D).

19. An acoustic wave detection method for detecting an acoustic wave using a light wave, the method comprising the steps of:

(A) propagating an acoustic wave through a propagation medium portion;
(B) causing a light wave to pass across the acoustic wave propagating through the propagation medium portion, thereby producing a $0^{th}$-order diffracted light wave, a $+1^{st}$-order diffracted light wave and a $-1^{st}$-order diffracted light wave by virtue of a refractive index distribution across the propagation medium portion caused by the propagation of the acoustic wave therethrough;
(C) retroreflecting the $0^{th}$-order diffracted light wave, the $+1^{st}$-order diffracted light wave and the $-1^{st}$-order diffracted light wave produced in the step (B);
(D) causing the retroreflected $0^{th}$-order diffracted light wave to pass across the acoustic wave propagating through the propagation medium portion, thereby producing a $+1^{st}$-order diffracted light wave and a $-1^{st}$-order diffracted light wave by virtue of a refractive index distribution across the propagation medium portion caused by the propagation of the acoustic wave therethrough; and
(E) detecting, using a photoelectric conversion element array including a plurality of photoelectric conversion elements, at least one of a first interference light wave between the $+1^{st}$-order diffracted light wave having been produced in the step (B) and retroreflected and the $-1^{st}$-order diffracted light wave produced in the step (D), and a second interference light wave between the $-1^{st}$-order diffracted light wave having been produced in the step (B) and retroreflected and the $+1^{st}$-order diffracted light wave produced in the step (D), and identifying a propagation direction of the acoustic wave based on a position or positions, in the photoelectric conversion element array, of the one or more of the photoelectric conversion elements that have detected at least one of the first interference light wave and the second interference light wave.

20. An acoustic wave detection method for detecting an acoustic wave using a light wave, the method comprising the steps of:
(A) propagating an acoustic wave through a propagation medium portion;
(B) causing a light wave to pass across the acoustic wave propagating through the propagation medium portion, thereby producing a $0^{th}$-order diffracted light wave, a $+1^{st}$-order diffracted light wave and a $-1^{st}$-order diffracted light wave by virtue of a refractive index distribution across the propagation medium portion caused by the propagation of the acoustic wave therethrough;
(C) retroreflecting the $0^{th}$-order diffracted light wave, the $+1^{st}$-order diffracted light wave and the $-1^{st}$-order diffracted light wave produced in the step (B);
(D) causing the retroreflected $0^{th}$-order diffracted light wave to pass across the acoustic wave propagating through the propagation medium portion, thereby producing a $+1^{st}$-order diffracted light wave and a $-1^{st}$-order diffracted light wave by virtue of a refractive index distribution across the propagation medium portion caused by the propagation of the acoustic wave therethrough; and
(E) independently detecting, using a photoelectric conversion element array including a plurality of photoelectric conversion elements, at least one of a first interference light wave between the $+1^{st}$-order diffracted light wave having been produced in the step (B) and retroreflected and the $-1^{st}$-order diffracted light wave produced in the step (D), and a second interference light wave between the $-1^{st}$-order diffracted light wave having been produced in the step (B) and retroreflected and the $+1^{st}$-order diffracted light wave produced in the step (D), thereby isolating the acoustic wave based on a frequency thereof.

\* \* \* \* \*